US008650198B2

(12) United States Patent
Moitra et al.

(10) Patent No.: US 8,650,198 B2
(45) Date of Patent: Feb. 11, 2014

(54) SYSTEMS AND METHODS FOR FACILITATING THE GATHERING OF OPEN SOURCE INTELLIGENCE

(75) Inventors: Abha Moitra, Scotia, NY (US); David Brian Bracewell, Niskayuna, NY (US); Steven Matt Gustafson, Niskayuna, NY (US); T. Michael Baylor, Morgantown, PA (US); Tina H. Chau, Fairfax, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/210,116

(22) Filed: Aug. 15, 2011

(65) Prior Publication Data

US 2013/0046771 A1 Feb. 21, 2013

(51) Int. Cl.
*G06F 17/30* (2006.01)

(52) U.S. Cl.
USPC .............................. 707/749; 706/12

(58) Field of Classification Search
USPC ............................ 707/749; 706/12
See application file for complete search history.

(56) References Cited

U.S. PATENT DOCUMENTS

| | | | |
|---|---|---|---|
| 6,094,648 A | 7/2000 | Aalbersberg | |
| 6,151,585 A | 11/2000 | Altschuler et al. | |
| 7,262,772 B2 | 8/2007 | Ebert | |
| 7,296,021 B2 | 11/2007 | Malkin et al. | |
| 7,321,880 B2 | 1/2008 | Gosby | |
| 7,356,761 B2 | 4/2008 | Karadimitriou et al. | |
| 7,752,557 B2 | 7/2010 | Hoeber et al. | |
| 7,774,456 B1 | 8/2010 | Lownsbrough et al. | |
| 7,788,261 B2 | 8/2010 | Hoeber et al. | |
| 2002/0016801 A1 | 2/2002 | Reiley et al. | |
| 2002/0062368 A1* | 5/2002 | Holtzman et al. | 709/224 |
| 2003/0182310 A1 | 9/2003 | Charnock et al. | |
| 2003/0225763 A1 | 12/2003 | Guilak et al. | |
| 2005/0021531 A1 | 1/2005 | Wen et al. | |
| 2006/0242190 A1 | 10/2006 | Wnek | |
| 2007/0050708 A1 | 3/2007 | Gupta et al. | |
| 2007/0214097 A1* | 9/2007 | Parsons et al. | 706/12 |
| 2007/0214137 A1 | 9/2007 | Gloor | |
| 2008/0097994 A1 | 4/2008 | Teramoto et al. | |

(Continued)

FOREIGN PATENT DOCUMENTS

WO 2009023865 2/2009

OTHER PUBLICATIONS

U.S. Appl. No. 13/045,128, entitled "Systems and Methods for Facilitating Open Source Intelligence Gathering", and filed Mar. 10, 2011.

(Continued)

*Primary Examiner* — Monica Pyo
(74) *Attorney, Agent, or Firm* — Marsh Fischmann & Breyfogle LLP

(57) ABSTRACT

Systems and methods (e.g., utilities) for use in providing automated, lightweight collection of online, open source data which may be content-based to reduce website source bias. In one aspect, a utility is disclosed for use in extracting content of interest from at least one website or other online data source (e.g., where the extracted content can be used in a subsequent search query). In other aspects, utilities are disclosed that are operable to perform various types of analyses on such extracted content and present graphical representations of such analyses on a display of a client device.

12 Claims, 34 Drawing Sheets

(56) References Cited

U.S. PATENT DOCUMENTS

| | | |
|---|---|---|
| 2009/0119173 A1 | 5/2009 | Parsons et al. |
| 2009/0306967 A1 | 12/2009 | Nicolov et al. |
| 2010/0070485 A1 | 3/2010 | Parsons et al. |
| 2010/0121707 A1 | 5/2010 | Goeldi |
| 2010/0121849 A1 | 5/2010 | Goeldi |
| 2010/0145940 A1 | 6/2010 | Chen et al. |
| 2010/0150393 A1 | 6/2010 | Ni et al. |
| 2010/0162135 A1 | 6/2010 | Wanas et al. |
| 2010/0169159 A1 | 7/2010 | Rose et al. |
| 2010/0205550 A1 | 8/2010 | Chen et al. |
| 2010/0205663 A1 | 8/2010 | Ward et al. |
| 2010/0223581 A1 | 9/2010 | Manolescu et al. |
| 2010/0241498 A1 | 9/2010 | Chung et al. |
| 2010/0241620 A1 | 9/2010 | Manister et al. |
| 2010/0262454 A1 | 10/2010 | Sommer et al. |
| 2010/0268600 A1 | 10/2010 | Banko et al. |
| 2010/0275128 A1 | 10/2010 | Ward et al. |
| 2010/0312769 A1 * | 12/2010 | Bailey et al. ............ 707/740 |

OTHER PUBLICATIONS

Navigli, Word Sense Disambiguation: A Survey, ACM Computing Surveys, vol. 41, No. 2, Article 10, Publication date: Feb. 2009, XP007913614, 69 pages.

* cited by examiner

FIG. 6

SCENARIO GENERATOR

SCENARIO NAME

TEMPLATE NAME: REGIONAL CONFLICT

LOCATION — ENTER ONE WORD OR PHRASE PER LINE

CONFLICT TYPE — ENTER ONE WORD OR PHRASE PER LINE

ORGANIZATION TYPE — ENTER ONE WORD OR PHRASE PER LINE

ORGANIZATION NAME — ENTER ONE WORD OR PHRASE PER LINE

| TERMS | VALUE | PARENT | PARENT WEIGHT % | GRANDPARENT | GRANDPARENT WEIGHT % |
|---|---|---|---|---|---|
| PARIS | V1 | FRANCE | 80% | EUROPE | 50% |
| NICE | V1 | FRANCE | 60% | EUROPE | 20% |
| PISA | V1 | ITALY | 40% | EUROPE | 10% |
| MILAN | V1 | ITALY | 70% | EUROPE | 30% |
| FRANCE | V2 | EUROPE | 80% | — | — |
| ITALY | V2 | EUROPE | 70% | — | — |
| EUROPE | V3 | — | — | — | — |

SYSTEMS AND METHODS FOR FACILITATING THE GATHERING OF OPEN SOURCE INTELLIGENCE

FIELD OF THE INVENTION

The present invention relates generally to open source intelligence gathering, and more particularly to the automated collection and subsequent processing of open source data to extract meaningful information.

BACKGROUND OF THE INVENTION

Open source intelligence (OSINT) is a form of intelligence collection management that involves finding, selecting, and acquiring information from publicly available sources and analyzing it to produce actionable intelligence. In the intelligence community (IC), the term "open" refers to overt, publicly available sources (as opposed to covert or classified sources); it is not necessarily related to open-source software or public intelligence.

For example, American military professionals have collected, translated, and studied articles, books, and periodicals to gain knowledge and understanding of foreign lands and armies for over 200 years. The recent exponential growth in computer technology and the Internet has placed more public information and processing power at the finger tips of military personnel and other users than at any time in the past. Internet sites (i.e., websites) enable global users to participate in publicly accessible communications networks that connect computers, computer networks, and organizational computer facilities around the world. Through use of the Internet, users can locate, monitor and observe various websites to obtain any quantity of useful information (e.g., in the case of the military, enemy intentions, capabilities, activities, etc.). To name only a few, websites of news outlets, television stations, forums, and the like may be monitored and/or searched for particular terms or topics of interest during such OSINT gathering.

SUMMARY OF THE INVENTION

The speed of Internet activity has exceeded the pace of OSINT collection and analysis. As a result, open source intelligence gatherers have been presented with the basic trade-off of analysis quality versus production timeliness. Some existing systems merely collect an abundance of information and then leave it to the service subscribers to determine that which is of value. For instance, existing systems allow users to perform queries on one or more data sources and then return what may be thousands of results to the user based on the query parameters. Even valuable data collected in abundance presents the difficulty of amassing resources required to manually analyze the data for discovery of trends and anomalies of interest. However, many if not most of the results may be uninteresting to the user due to sub-optimal search engine technologies and automated collection processes.

Furthermore, much of the content making up a website or other data source and on which a query or analysis may be performed may be of a form that is not important to a user and/or which may skew search results and subsequent analyses. For instance, a particular page on nytimes.com including an article discussing the results of a recent major sporting event may also include a small advertisement directed to no fee checking with a major bank. As part of the same example, imagine a user interested in learning about any recent developments in relation to the loan fees charged by the World Bank to third world countries performs a search using any appropriate search tools utilizing the query parameters "world," "bank," "fees" and "loans." As the New York Times article about the sporting event happens to include an advertisement directed to "no fee checking" with a "major bank," the sporting article may be presented as one of the results to the user's search query, much to the user's dismay.

It has been determined that systems, apparatuses and methods (i.e., utilities) are needed that can both provide for automated, lightweight collection of online, open source data which may be content-based to reduce website source bias. In one aspect, a utility is disclosed for use in extracting content of interest from at least one website or other online data source (e.g., where the extracted content can be used in a subsequent query and/or analysis). Depending upon the particular objects or goals of a subsequent query or analysis, "interesting" content may be the actual text of a webpage (e.g., just the text of an article on the webpage, and not any text or other characters associated with advertisements or navigation sections). In another scenario, the interesting content may just be any HTML links (e.g., "inlinks") contained within the article on the webpage. For instance, a user may be interested in news articles or blog postings that have inlinks to a particular URL. For purposes of this discussion, the terms "query," "search," "filter" and the like (along with their respective variations) will be used interchangeably.

The utility may include obtaining source code used to generate the at least one website on a display, where the source code includes a plurality of elements and each element includes at least one tag comprising at least one tag type; parsing the source code using a processor to obtain a node tree including a plurality of nodes arranged in a hierarchical structure, where each node comprises one of the elements, and wherein one of the plurality of nodes comprises a root node; determining a tag type of a node under the root node; assigning a heuristic score to the node based at least in part on the tag type of the node; repeating the determining and assigning for one or more additional nodes of the node tree; and generating, using the processor, an object that includes content associated with nodes of the node tree having heuristic scores indicating that such content is of interest.

This utility allows any desired content to be extracted from a piece of data (e.g., the source code of a webpage) with little or no prior knowledge of the page and with little or no human interaction. For instance, any appropriate server and/or process may collect large volumes of website data on a scheduled basis, utilize this utility to extract interesting content, and then index such content in a data store for subsequent searching and/or analysis. Furthermore, the various details of the originally observable webpage (e.g., graphics, advertisements, etc.) may also be available to a user (e.g., by storing such original data in the data store).

In addition to the aforementioned utilities that allow for automated and lightweight collection of online, open source data, it has also been determined that various utilities that provide analytic visualizations of such collected open source data are needed to, for instance, allow for trending and discovery of interesting and/or important developments and occurrences. For example, the various utilities disclosed herein can act as early warning systems for emerging sentiments and ideologies that are adverse to U.S. interests. In this regard, and in another aspect, a utility is disclosed that allows for the determination (e.g., automated determination) of a sentiment of a term among a plurality of data sets. For instance, a user may initially define a "scenario" made up of one or more keywords and operators (collectively, "scenario parameters") that focus on attacks performed by Al Qaeda.

The scenario may then be used to perform a query of online, open source data in any appropriate manner to obtain a number of search results (e.g., a list of relevant websites). In addition to the search results, the user may be benefited by visually observing a sentiment (e.g., positive, negative, neutral) of one or more terms (e.g., Osama Bin Laden) of the scenario parameters and/or terms that are frequently used throughout the returned results over one or more time periods.

In this regard, the utility includes receiving the x most frequently disclosed terms (e.g., top five, top ten) among a plurality of data sets (e.g., plurality of objects including content extracted from websites using the above-discussed utility) during a time period (e.g., day, week), where x is a positive integer; for each of the x most frequently disclosed terms during the time period: determining, using a processing engine, a volume of the plurality of data sites disclosing the term; and obtaining, using the processing engine, a sentiment of the term among the plurality of data sites; and presenting, on a display, a first graphical representation illustrating the sentiment and volume of each of the x most frequently disclosed terms during the time period.

That is, as opposed to a user manually selecting those words or terms for which to determine a sentiment, the disclosed utility may automatically select (e.g., based on frequency of use in the returned search results or in other appropriate manners) which terms to perform a sentiment analysis on, and then may present the results of such sentiment analysis on a display (e.g., in the form of sparkcharts or other graphical representations that display the sentiment over a selected time period). Advantageously, a user need not manually review the search results for terms on which to perform sentiment and volume analyses. Furthermore, a user may be more interested in reviewing sentiment/volume analyses for terms that are more frequently disclosed (i.e., other than terms like "a," "or," etc.) than other terms as the mere fact that the term is frequently disclosed may indicate a greater relative importance of the term in relation to other terms.

Furthermore, the posts or websites that contain the particular terms that are automatically selected by the utility may be the posts for which sentiment is determined. Stated otherwise, the text of those websites (i.e., their extracted content) where the particular terms are found may be the text that is used to determine if the overall sentiment of the term is positive, negative or neutral. For example, if a website where one of the particular terms (e.g., Mubarak) for which a sentiment analysis is being performed contains 30 instances of "hate" but only 5 instance of "like," then the website may be labeled as a "negative" website/data site. A similar procedure may be performed on other websites of the search query results for the term Mubarak. Subsequently, an overall sentiment for the term Mubarak for a particular time period or time increment may be obtained by subtracting the number of "negative" sites where the term Mubarak is found from the number of "positive" sites where the term Mubarak is found to obtain a result, and then using the result to determine whether the term Mubarak should be indicated as having a positive, negative or neutral sentiment for the time increment/period. Other appropriate types of statistical analysis may be performed to obtain term sentiments as well.

In addition to the sentiment, the utility may also automatically determine a volume of use of such terms and additionally present graphical representations of such volumes on the display (e.g., alongside and/or integrated with the determined sentiments). Furthermore, the utility may allow for the manual and/or automatic selection of what will be referred to as "stop words," that is, words or terms that would not be used as part of the sentiment/volume analysis, even if such words were, for instance, one of the most frequently used words in the search query results (e.g., "a," "the," etc.).

In another aspect, a utility for creating a hierarchical signature for a website or other online data source is disclosed that can allow a user to, for instance, discern the ebb and flow of topics over any appropriate time period on individual websites as well as on automatically clustered sites (e.g., using any appropriate clustering methods or processes) that have similar signatures. More specifically, a "signature" of a website or other online data source may be obtained by determining a frequency or prevalence of particular terms on one or more pages of the website over a time period, and then appropriately presenting such signature on a display for visualization by a user. For instance, a frequency of each of the terms "counterterror," "government," "military," and "president" on each of a number of websites (e.g., those websites returned corresponding to a particular scenario) may be determined, the results may be normalized to "high," "medium" and "low," and then such normalized results may be presented for a user on a display in the form of a color coded chart (e.g., where darker colors represent higher frequency and lighter colors represent lower frequency). This utility may allow such signatures to be leveraged to track discussions, infer textual linkages among websites, discover communities of interest according to topic saliency, and the like.

This utility involves identifying at least one textual hierarchy including at least first and second levels, where the first level comprises at least one textual category and the second level comprises at least one term that describes the at least one textual category; determining a number of occurrences of the at least one term from a number of pages of at least one website during a time period; first obtaining, using a processing engine, a hierarchical signature of the at least one term that represents a prevalence of the at least one term on the at least one website; second obtaining, from the first obtaining step, a hierarchical signature of the at least one textual category that represents a prevalence of the at least one textual category on the at least one website; establishing a hierarchical signature of the at least one website utilizing the hierarchical signature of one or more of the at least one term and the at least one textual category; and presenting, on a display, a graphical representation of the hierarchical signature of the at least one website, where the graphical representation illustrates the prevalence of one or more of the at least one term and the at least one textual category.

Of note, this utility not only obtains a hierarchical signature of one or more terms for one or more websites (by determining a prevalence of such terms on such websites), but also obtains a "first level" signature of a category that represents or encompasses the one or more terms by, for instance, averaging (and/or performing other appropriate types of statistical analyses) the "second level" hierarchical signature(s) of the one or more terms. For instance, a "communications" category could be manually and/or automatically made up of the terms "audio," "propaganda," "statement," and "video". Numerous other categories could be manually and/or automatically determined (e.g., "government," "Congress"). In this regard, a "first level" hierarchical signature of a website may be made up of the particular frequencies of a number of categories and may be presented on a display in the form of, for instance, a number of adjacent graphical icons, where a color of each graphical icon represents the prevalence of one of the categories on the website. Furthermore, a "second level" hierarchical signature of a website may be made up of the particular frequencies of the terms making up one or more of the aforementioned categories on the website (e.g., in the case of the category "communications," the terms "audio," "propaganda," "statement," and "video").

The at least one textual hierarchy in this utility which forms the basis of the hierarchical signature determination may be identified in any appropriate way (e.g., manually, automatically). In one arrangement, scenario parameters used to perform a query that turned up the at least one website for which the hierarchical signature is being determined may be at least partially used in the textual hierarchy (e.g., as first-level categories and/or second-level terms). In another arrangement, a number of default categories with respective terms may be defined and which may be manually selected by a user as part of an analysis of search results. In a further arrangement, one or more "community" or "network" signatures may be determined. For instance, any appropriate standard tools or algorithms may be used to determine one or more communities of interest from the results of an open source search query (e.g., each community including a plurality of websites or online data sources having one or more common traits or characteristics, such as a number of websites taking a particular view of an important world event). The disclosed utility may then "roll up" or otherwise combine the "site signatures" (e.g, made up of first and/or second level signatures) of each of the websites to obtain a "community signature".

In another aspect, a utility is disclosed for use in inferring an information flow network that can allow information flows between and among websites and authors to be determined over time. The utility can capture relationships between people and entities in online discussion environments (e.g., forums, blogs) and enable a network of relationships between entities that are discussing topics of interest to be discovered and "verified" automatically. For instance, the utility can build connections by way of analyzing metrics such as frequency of posts or postings (e.g., blog entries), frequency of responses, context of posts, and the like to enhance identification of significant relationships.

The utility includes receiving information related to a plurality of portions of source code used to generate a plurality of online data sources (e.g., blog postings, news articles, web pages, etc), where the information allows a uniform resource locator (URL) to be obtained for at least one of the data sources; determining, from the information using a processor, whether any of the plurality of online data sources refers to another online data source during a first of a plurality of time periods (e.g., days), where any online data source that refers to another online data source comprises a "secondary data source", and where any online data source that is referred to by another online data source comprises a "primary data source"; in response to at least some of the plurality of online data sources referring to other online data sources, obtaining, from the information, a unique URL for each of the primary and secondary data sources; repeating the determining and obtaining for additional time periods; and presenting, on a display, a graphical representation of an information flow network that illustrates one or more information flow links connecting and representing information flows from primary data sources to secondary data sources over the plurality of time periods.

For instance, in the context of a news article on nytimes.com discussing President Obama's new education agenda that includes an HTML link to whitehouse.gov in the body of the article, the graphical representation may include a graphical icon representing the primary data source URL "whitehouse.gov," another graphical icon representing the secondary data source URL "nytimes.com," and another graphical icon (e.g., an arrow) representing an information flow from the whitehouse.gov icon to the nytime.com icon. In other words, the information flow may be determined by "reversing the inlinks" disposed within a particular online data source. In one arrangement, the source code corresponding to the primary and secondary data source URLs may have been previously harvested utilizing any appropriate search engine(s) and/or process(es) and stored in one or more data stores for retrieval by the utility.

In one arrangement, unique URLs may be constructed for online data sources. For instance, as each posting on a blog site has the same URL or IP address (i.e., the URL or IP address of the blog site), it may otherwise be difficult to establish online information flow networks and thereby map information flows among a number of postings. In this regard, one embodiment involves constructing a unique URL for each posting of a blog site (or other online data source) by utilizing the URL of the blog site or website along with one or more identifiers of or associated with the individual posting as inputs to any appropriate algorithm or logic operable to generate or create a unique URL for the particular posting.

In another arrangement, the utility may further include, in response to a user manipulable device or component (e.g., cursor, user's finger) being positioned over a primary data source graphical icon (e.g., the whitehouse.gov icon discussed above), modifying a feature of the primary data source graphical icon (e.g., to assume a first color), modifying a feature of any secondary data source graphical icons of the primary data source graphical icon (e.g., modifying the nytimes.com icon discussed above to a second color), and modifying a feature of the information flow link graphical icons connecting the primary data source graphical icons and the secondary data source graphical icons (e.g., to a third color). For instance, the three colors may be different from the colors of other graphical icons in the graphical representation of the online information flow network to allow a user visually observe the particular manner in which a particular post/blog entry affects or is affected by information flows in the network.

In another aspect, a utility is disclosed for use in extracting content of interest from a collection of webpages. This utility can limit off-topic or low value portions of the webpages from being extracted for use in subsequent analyses and manipulation. The utility includes acquiring source code used to generate each webpage of a collection of webpages on a display; obtaining a similarity matrix for the collection of webpages from the acquired source code using a text-based similarity measure; using the similarity matrix to determine a maximum dissimilarity score for each webpage in relation to the collection of webpages using a processor; and presenting, on a display, one or more lists of those webpages associated with maximum dissimilarity scores above a threshold dissimilarity score. For instance, the objects may be arranged in the one or more lists according to date of publication of the webpage associated with the object. Advantageously, a timeline may present objects (e.g., posts) in a manner that provides a particular breadth of coverage for each of a number of time periods (e.g., for each day of a particular time range). That is, the timeline may present a user with a variety of posts each day, all of which are encompassed within the parameters of a particular scenario, sub-scenario, etc. This arrangement allows a user or users to discover the full range of discussions for a particular scenario that may have been missed by a manual analysis owing to the sheer volume of popular topics.

The utility may also include first extracting a first portion of content from the source code of a first webpage of the collection of webpages using a first set of inquiries; first determining, for the extracted first portion of the first webpage, a maximum similarity score in relation to the similarity matrix using a processor; and generating an object with the extracted first portion responsive to the maximum similarity score being greater than a first threshold similarity score.

In the event that the maximum similarity score is not greater than a first threshold similarity score, the utility includes second extracting from the source code of the first webpage a second portion of content using a second set of inquiries different than the first set of inquiries, and second determining, for the extracted second portion of the first webpage, a maximum similarity score in relation to the similarity matrix using the processor. For instance, the first set of inquiries can be adjusted (e.g., adding or editing at least one inquiry) so that a second portion of content is extracted from the source code that is different than the first portion.

In one arrangement, the various steps of the utility (e.g., the first extracting, first determining, generating, and, if necessary, the second extracting and second determining) can be repeated for the source code of additional webpages of the collection of webpages to obtain a first group of objects corresponding to a plurality of extracted portions. Thereafter, a second group of objects may be obtained from the first group of objects, where the second group of objects is associated with extracted portions having maximum similarity scores above a second threshold similarity score that is greater than the first threshold similarity score.

In another aspect, a utility is provided for use in automatically extracting a textual hierarchy from one or more webpages of a website for use in creating a hierarchical signature for the website. Advantageously, this utility may substantially generate one or more textual hierarchies and may be used as an alternative to and/or at least partially in conjunction with the manual selection of one or more portions of one or more textual hierarchies. The utility includes receiving the x most frequently disclosed terms among one or more pages of a website, where x is a positive integer; first clustering, using a processor, the x most frequently disclosed terms into two or more sets of terms as a function of semantic similarity between the terms in each subset; second clustering, using the processor, the two or more sets of terms into two or more subsets of terms utilizing contextual information located proximate each of the terms, where each of the terms in the subsets comprises a lower level term; and ascertaining, for each of the two or more subsets, an upper level term that semantically encompasses each of the lower level terms in the subset.

As examples, the first clustering could include agglomerative clustering, the second clustering may utilize at least one of a bag-of-words model and Dice's coefficient, the contextual information for each term may include a window of adjacent terms around the term, and/or the ascertaining may include finding a deepest common root in a general purpose ontology including the lower level terms of the subset. In any case, one embodiment envisions determining a prevalence of each of the lower level terms on the one or more pages of the website to obtain hierarchical signatures of the lower level terms; using the hierarchical signatures of the lower level terms to establish hierarchical signatures for each of the upper level terms; and presenting, on a display, a graphical representation of a hierarchical signature of the website, where the hierarchical signature of the website include the hierarchical signatures of the upper level terms.

In another aspect, a utility is provided for use in determining an influence of sentiment expressed in a post of an author of an online information flow network on the posts of one or more other authors in the network. For instance, the determined sentiment influences of the various posts and/or authors of the information flow network may be used to determine one or more "online roles" for the various authors of the network (e.g., such as provocateurs). This utility includes receiving information related to a plurality of online posts, wherein each of the online posts is associated with at least one author; obtaining, from the information, a listing of online posts that refer to one or more other online posts, wherein any online post that refers to another online post comprises a "secondary post" and wherein any online post that is referred to by another online post comprises a "primary post"; building an information flow network that includes a plurality of information flow links that connect and represent information flows from primary posts to secondary posts; first determining, using a processor, a sentiment of each of a primary post and one or more secondary posts of the primary post; second determining, using the processor, a sentiment influence of the at least one author of the primary post in the information flow network using the sentiment of the primary post and one or more secondary posts; and presenting, on a display, a graphical representation of the sentiment influence of the at least one author of the primary post in the information flow network.

In one arrangement, the second determining may include determining a first average sentiment of the one or more secondary posts; determining a second average sentiment of other posts in the information flow network initiated by the at least one author of the primary post; and determining a quotient of the first average sentiment and the second average sentiment to obtain the sentiment influence of the at least one author of the primary post in the information flow network. For instance, the primary post, one or more secondary posts, and other posts in the information flow network associated with the at least one author of the primary post relate to a common topic or discussion. Any appropriate manner of normalizing the post sentiments may be utilized. For instance, the post sentiments may be normalized by way of identifying a quantity of at least one of positively or negatively charged terms in the post; identifying a total number of terms in the post; and dividing the quantity of the at least one of positively or negatively charged terms in the post by the total number of terms in the post to obtain a normalized sentiment of the post.

The various aspects discussed herein may be implemented via any appropriate number and/or type of platforms, modules, processors, memory, etc., each of which may be embodied in hardware, software, firmware, middleware, and the like. Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which:

FIG. 3 illustrates a functional block diagram of a client device of the system of FIG. 1, and showing a dashboard that may be run on or accessible by the client device to allow a user to administer scenarios for online searches, observe search results, perform one or more analyses on such results, and the like.

FIG. 6 illustrates another screenshot of the dashboard of FIG. 4.

FIG. 8 illustrates another screenshot of the dashboard of FIG. 4.

FIG. 13 illustrates an object including content extracted from an online data source using the content extraction module of FIG. 9.

FIG. 16 illustrates another screenshot of the dashboard of FIG. 4.

FIG. 26 illustrates another screenshot of the dashboard of FIG. 4.

DETAILED DESCRIPTION

Reference will now be made to the accompanying drawings, which assist in illustrating the various pertinent features of the various novel aspects of the present disclosure. While the various disclosed utilities will be described primarily in relation to OSINT, these utilities may also be used in other environments where it would be useful to efficiently navigate through and/or harvest large volumes of information and/or data (e.g., data that is internal to an organization and not publically accessible) and perform numerous types of analytical visualizations on such harvested data. In this regard, the following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
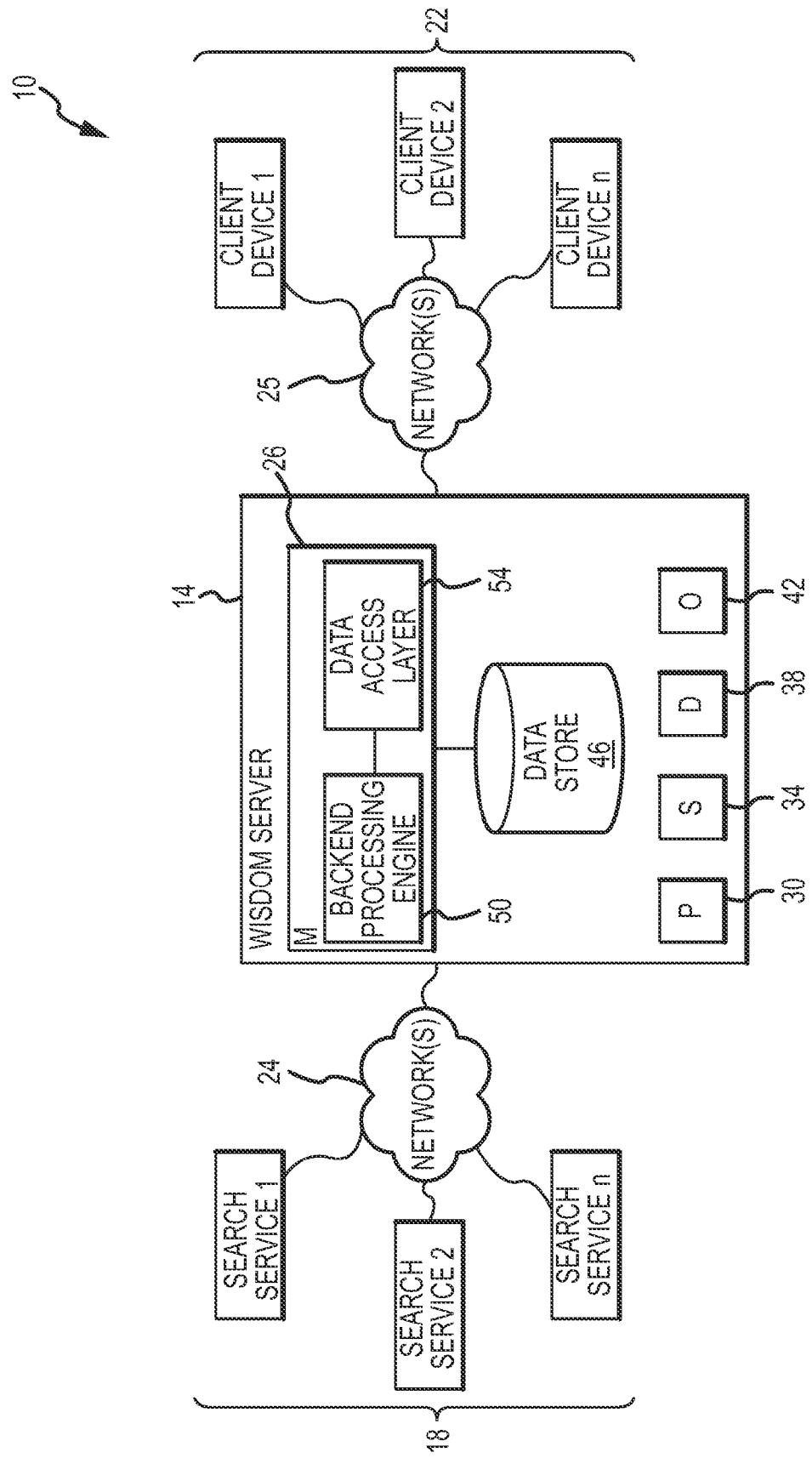
FIG. 1 illustrates a functional block diagram of a system that may be used to perform open source intelligence gathering and related analytical visualizations.

FIG. 1 illustrates a functional block diagram of a system 10 that may be used to perform data gathering (e.g., for open source intelligence) and related analytics and subsequently present such gathered data and analytics to one or more users via one or more client devices 22. At the heart of the system 10 may be what will be referred to as the "WISDOM" server 14 which, as will be appreciated with reference to the ensuing discussion, is generally operable to obtain open source intelligence information from one or more web resources or search services 18 (e.g., by querying a number of search services 18 according to any user-defined schedule, such as each morning) over at least one wired or wireless network 24 (e.g., Internet, WANs, LANs), store such information in at least one data store 46, perform one or more types of processing and analyses on such obtained information, and make such information and analyses available to users via client devices 22 over a network 25 (e.g., Internet, WANs, LANs) via a "dashboard" or other type of console or user interface running on and/or accessible by the one or more client devices 22. In contrast to previous OSINT systems, the present system 10 is lightweight for enhanced intelligence retrieval and may be "content-based" (i.e., focuses on the substantive content of a webpage, e.g., the text of the article, instead of extraneous portions of the webpage, e.g., advertisements, navigation sections, etc.). It should be appreciated that the terms "post," "website," "webpage," "data site," "online data source," and the like will be used interchangeably herein, unless otherwise specified.

The WISDOM server 14 may include at least one memory module 26 (e.g., RAM or other volatile memory), at least one processing module or processor 30 for executing computer readable instructions from the memory module 26, at least one storage module 34 (e.g., hard disk or other non-volatile memory), at least one monitor or display 38, and/or other peripheral devices or components 42. The data store 46 may store retrieved open source information (e.g., original source code, objects 94, discussed below) in addition to the results of any analyses performed on the information according to any appropriate structured arrangement that allows for efficient input and retrieval of data (e.g., RDBMS). While the data store 46 is shown as being separate from the memory module 26 and storage module 34, the data store 46 may be at least partially implemented within one or more of the memory module 26, storage module 34, and the like. In any event, the various components may be logically connected by any appropriate bus (not shown).

Furthermore, although the WISDOM server 14 has been illustrated as being a single device (e.g., server, laptop, desktop, mobile device, and/or other computing device), one or more functionalities or processes of the WISDOM server 14 may be allocated among a number of machines or devices which may or may not be embodied in a single housing. For instance, it is contemplated that the data collection process that will be discussed could be handled by a first machine or group of machines or processes while the subsequent analyses performed on such collected open source data could be handled or performed by a second machine or group of machines or processes.

Figure 2:
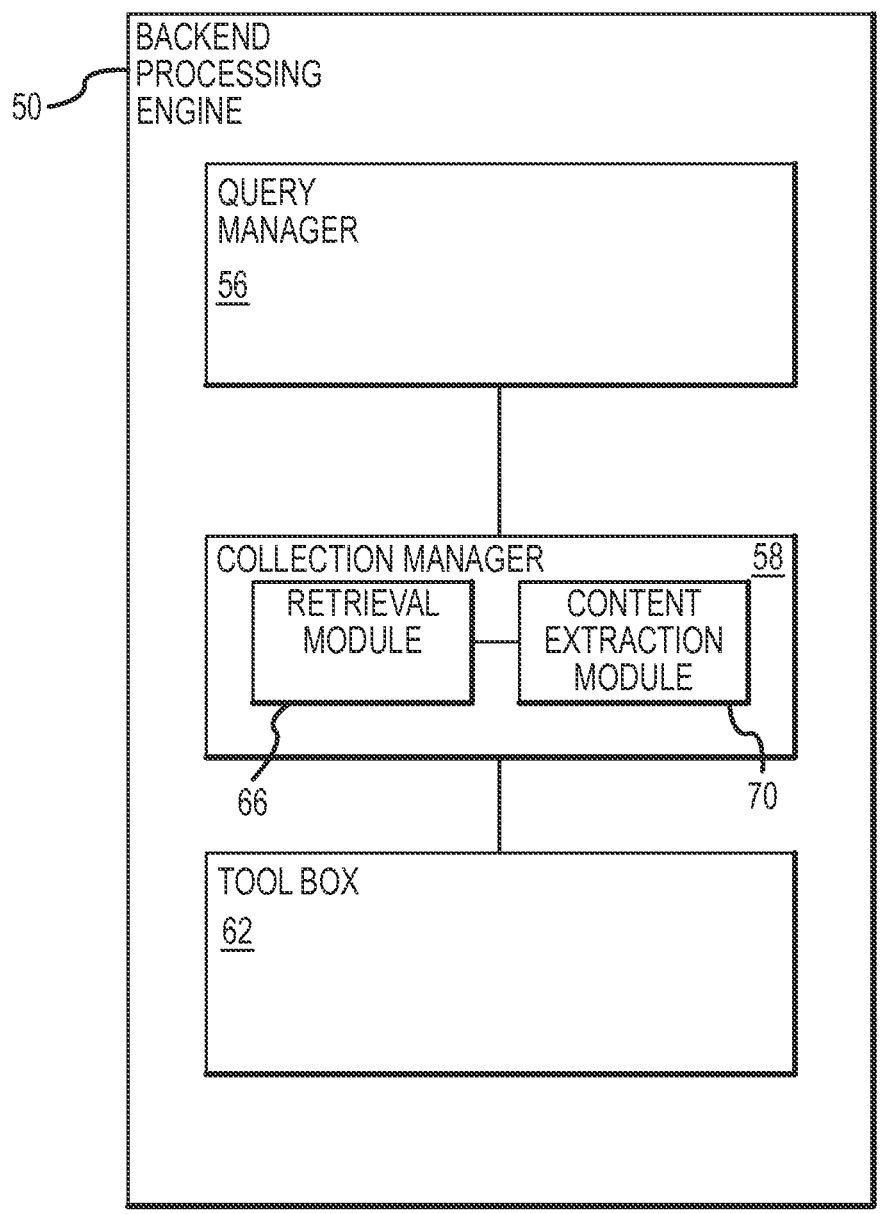
FIG. 2 illustrates a functional block diagram of a backend processing engine of the system of FIG. 1.

The WISDOM server 14 may include a backend processing engine 50 that generally coordinates the querying, retrieval and subsequent filtering and analyses of open source intelligence information to extract and present meaningful information to users. The WISDOM server 14 may also include a data access layer 54 that facilitates storage and retrieval of information and data in relation to the data store 46. As shown in FIG. 2, the backend processing engine 50 may include a query manager 56 for executing queries of search services 18 based on one or more "scenarios" defined by a user, a collection manager 58 for retrieving the source code and/or content of search results (e.g., posts) returned by the query manager 56, and a toolbox 62 for performing one or more analyses on the collected source code and/or content.

Figure 3:
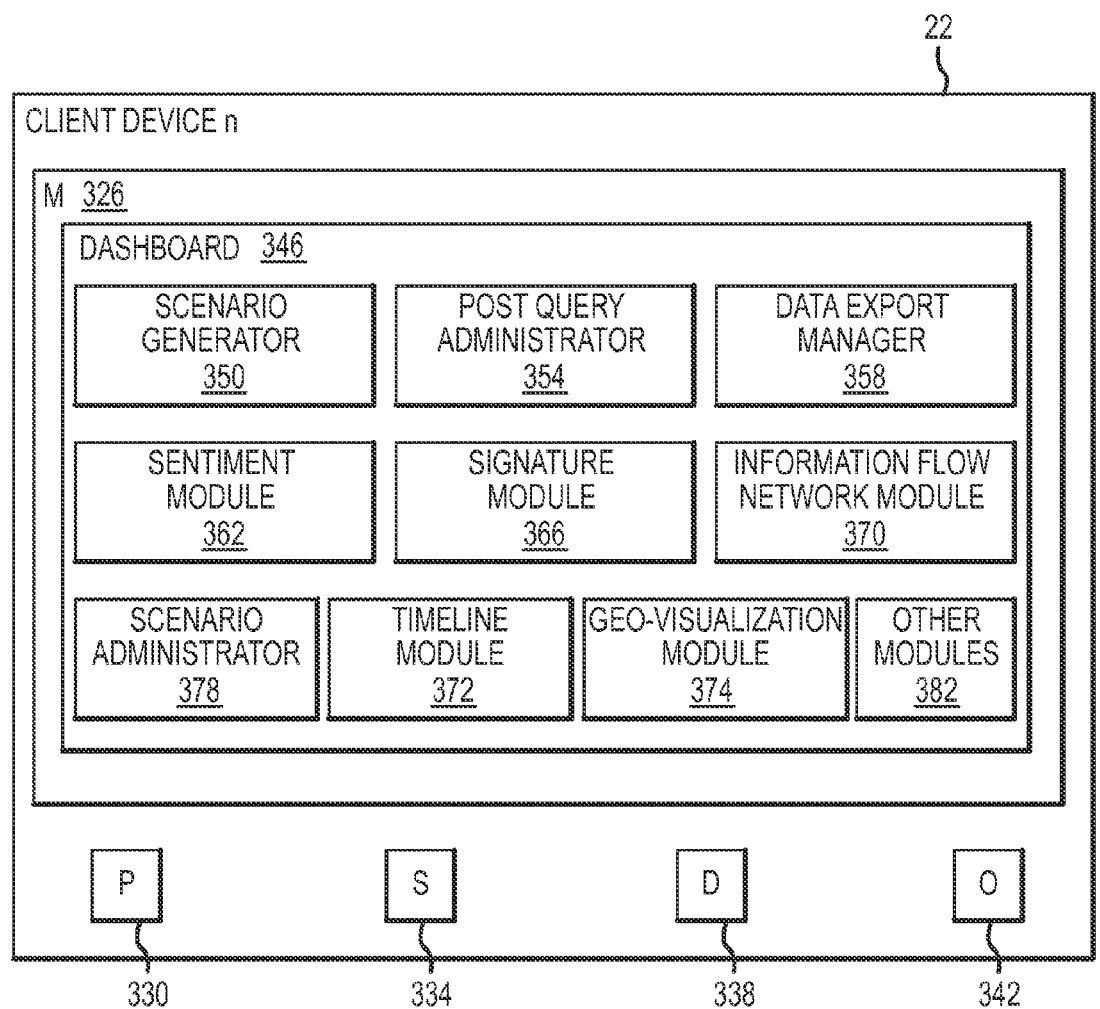

Before discussing the query manager 56, collection manager 58 and toolbox 60 of the backend processing engine 50 of the WISDOM server 14 in more detail, a brief discussion of a client device 22 will now be presented. Turning to FIG. 3, a representative client device 22 (for use with the system 10 of FIG. 1) may include at least one memory module 326 (e.g., RAM or other volatile memory), at least one processing module or processor 330 for executing computer readable instructions from the memory module 326, at least one storage module 334 (e.g., hard disk, flash memory card or stick, other non-volatile memory, etc.), at least one monitor or display 338, and/or other peripheral devices or components 342, all of which may be logically connected by a bus in a conventional manner.

Running on the client device 22 (and/or running on the WISDOM server 14 and accessible by the client device 22 by any appropriate web interface) may be a console or dashboard 346 (e.g., software application) that is broadly operable to allow a user to define one or more scenarios and/or sub-scenarios (each made up of one or more key words and/or operators) to be used by query manager 56 as part of a query of one or more search service 18, perform filtering (e.g., via key words and/or operators) according to the content of returned posts corresponding to one or more of the scenarios (i.e., define one or more "sub-scenarios"), manage and observe a number of visual analytics (e.g., term sentiments, website hierarchical signatures, etc.) related to search results, and the like. Stated otherwise, the dashboard 346 may allow a user to perform a more targeted and/or "on the fly" analysis of previously obtained and stored open source information. For instance, upon a user modifying and/or redefining scenarios, filter queries, and the like, the various visual analytics may be automatically re-determined or updated and then re-presented on the user's display.

As discussed previously, client device 22 may be in appropriate communication with WISDOM server 14 (e.g., via data access layer 54) over network(s) 25. Among other modules, managers and the like that will be discussed in more detail later in this discussion, the dashboard 346 may include a scenario generator 350 that accepts scenario parameters from a user (e.g., key words, Boolean operators) for defining one or more scenarios. The scenario generator 350 may then coordinate with the query manager 56 to execute periodic queries for open source information from one or more search services 18 via network(s) 24 based on such scenarios and their associated scenario parameters.

Figure 4:
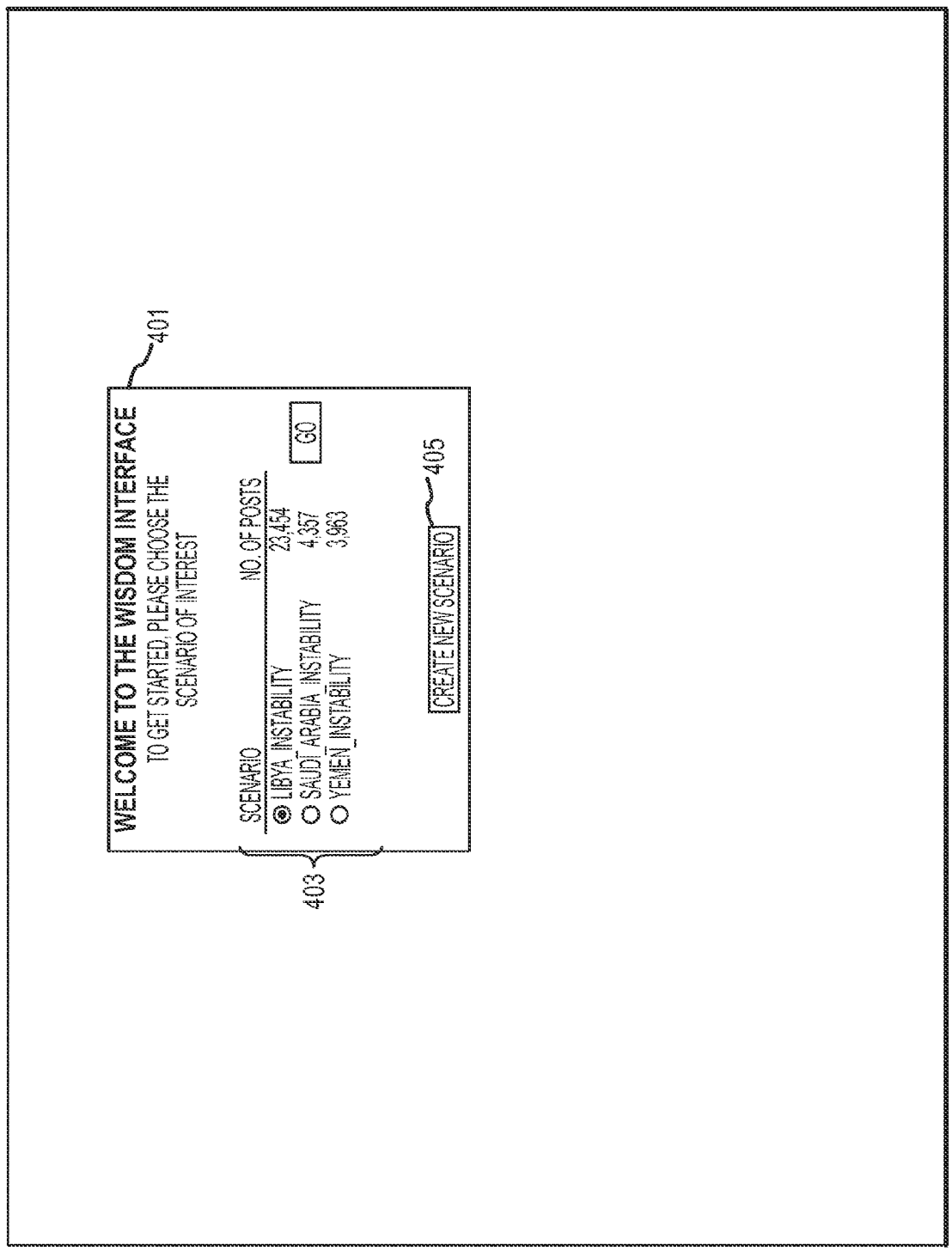
FIG. 4 illustrates a screenshot of a dashboard that may be used to expose and manipulate the various utilities disclosed herein.

Turning to FIG. 4, a screenshot 400 (e.g., splash screen) of dashboard 346 is illustrated as may be presented to a user on a display (e.g., display 338 of client device 22) upon starting or running dashboard 346. The dashboard 346 may, for example, be displayed via a web browser application executing on the client device 22. The screenshot 400 may include an area 401 (e.g., a welcome box) that allows a user to choose whether to observe and/or analyze posts from scenarios 403 (e.g., "Libya_Instability," "Saudi_Arabia_Instability," "Yemen_Instability," etc.) previously generated and run by the scenario generator 350 and/or to create or configure one or more new scenarios via the scenario generator 350 by manipulating (e.g., clicking, tapping) a button 405 (or other user manipulable feature). For a user's reference, the area 401 may include a current number of posts available (e.g., stored on data store 46 of WISDOM server 14) for each respective scenario 403.

Figure 5:
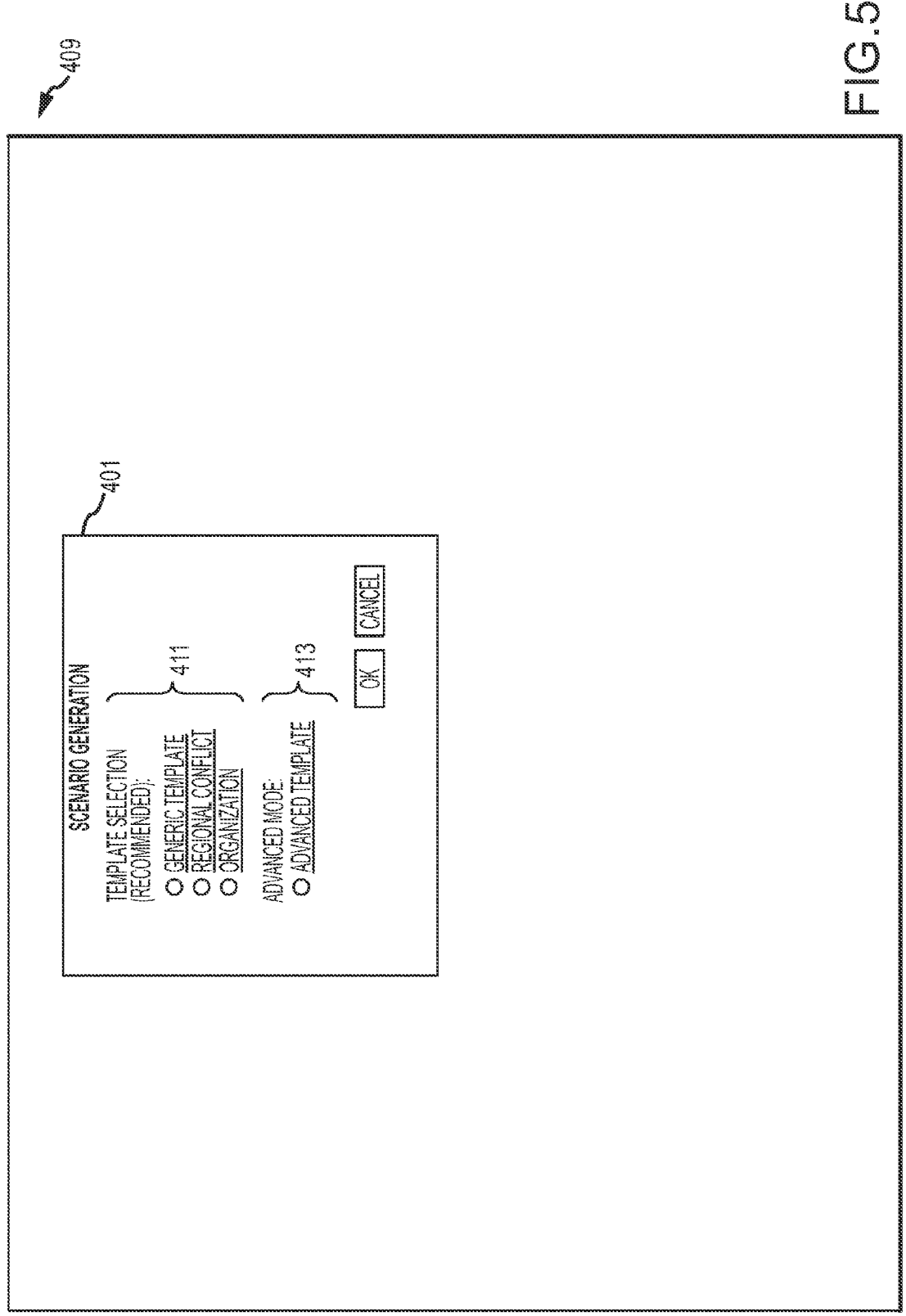
FIG. 5 illustrates another screenshot of the dashboard of FIG. 4.

FIG. 5 illustrates another screenshot 409 of the dashboard 346 upon a user choosing to create a new scenario by manipulating button 405. As shown, the area 401 may include one portion 411 that allows a user to choose one of a number of templates (e.g., "Generic Template," "Regional Conflict," "Organization," etc.) with which to build or create a scenario and another portion 413 (e.g., "Advanced Mode") that provides a user with more flexibility in customizing a scenario. Turning to FIG. 6, another screenshot 415 of the dashboard 346 may be presented on a display upon a user choosing to build a scenario from a template (e.g., the "Regional Conflict" template). Each template may include a number of pre-defined cells 417 (or other types of features such as drop down menus and the like) that allow for the entry and/or selection of a scenario name, a template name (e.g., for creating and saving a new template), and one or more keywords and/or phrases (e.g., parameters) according to keyword or phrase type or classification (e.g., location, conflict type, organization type, organization name, etc.) upon which a scenario query will be run by the query manager 56.

In one embodiment, the scenario generator 350 may automatically embed operators (e.g., and, or, not, etc.) among, within and/or between the various classifications as appropriate. In one arrangement, "and" operators may be automatically embedded between each of the classifications and "or" operators may be automatically embedded between each of the keywords/phrases within a particular classification before the collective scenario parameters are passed to the query manager 56. For instance, entering "Afghanistan" and "Yemen" in the "Location" cell 417 and "Hezbollah" and "al-Qa'ida" in the "Organization Name" cell 417 would result in the search string ((Afghanistan or Yemen) and (Hezbollah or al-Qa'ida)) being used by the query manager 56 for a query of search services 18 based on the particular scenario. Such search strings may be stored in data store 46 according to scenario name, user name, etc. Of course, numerous other types of templates are envisioned for use in configuring a scenario, where each may have one or more different types of cell classifications and/or embedded operators. For instance, and returning to the screenshot 409 of FIG. 5, a user's selection of a "Generic Template" in portion 411 may result in different classification cells 417 and/or embedded operators in the screenshot 415 of FIG. 6.

Figure 7:
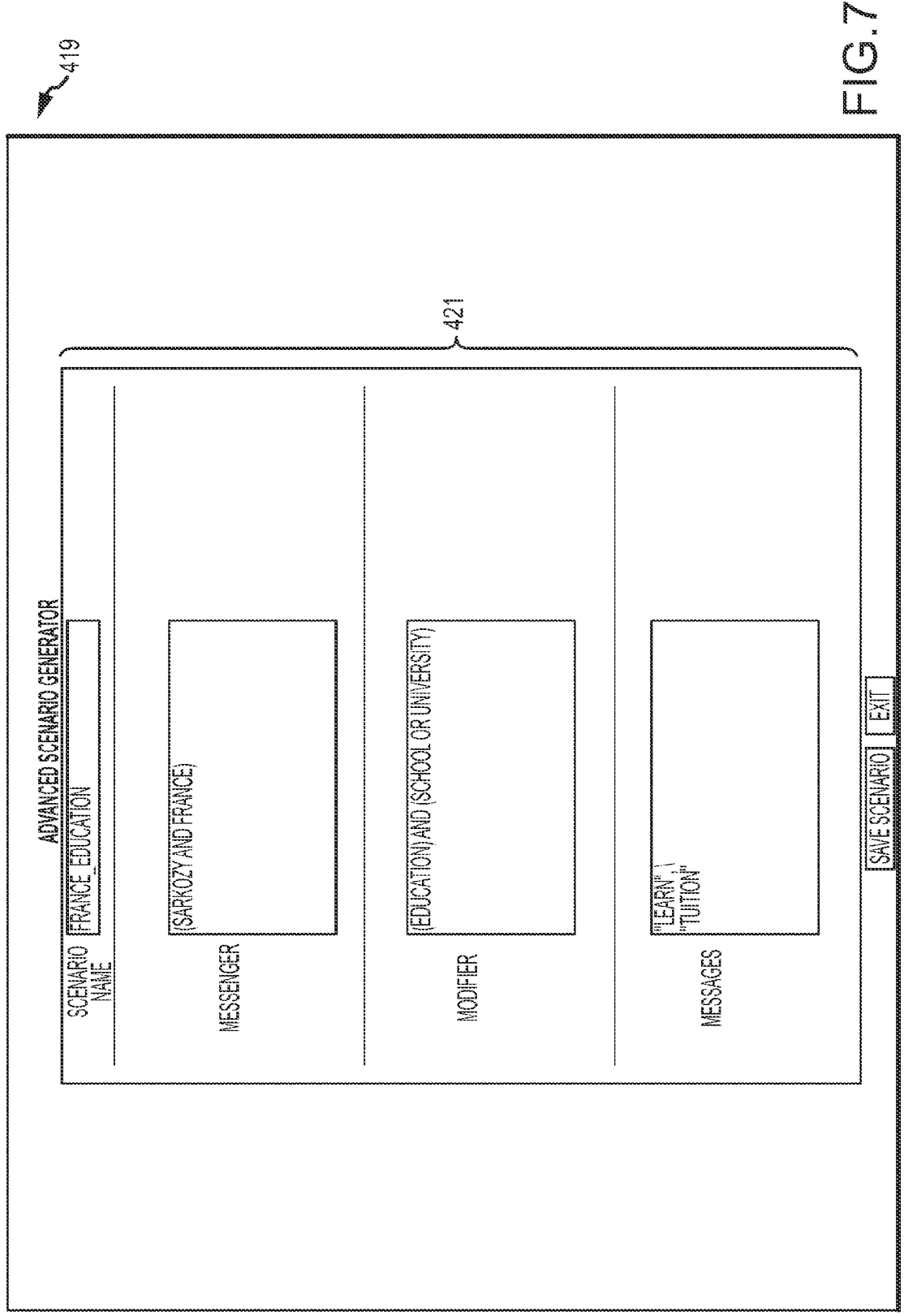
FIG. 7 illustrates another screenshot of the dashboard of FIG. 4.

FIG. 7 illustrates another screenshot 419 that may be presented on a user's display for use in building a scenario upon the user choosing to enter the "Advanced Mode" in portion 413 of FIG. 5. Similar to the screenshot 415 of FIG. 6, this screenshot 419 may include a number of pre-defined cells 421 (or other types of features such as drop down menus and the like) that allow for the entry and/or selection of a scenario and one or more keywords and/or phrases (e.g., parameters) according to keyword or phrase type or classification (e.g., messenger, modifier, messages, etc.) upon which a scenario query will be run by the query manager 56. However, this screenshot 419 allows a user to manually embed operators within each of the cells 421 as appropriate. In any event, a user may choose to save a created scenario (e.g., by manipulating the "save" button shown in FIG. 7 which may also be presented to a user in the screenshot 415 of FIG. 6) which may then be used by the query manager 56 in performing periodic queries (e.g., each morning, twice a day, etc.) of one or more search services 18 for posts matching the scenario parameters.

Figure 8:
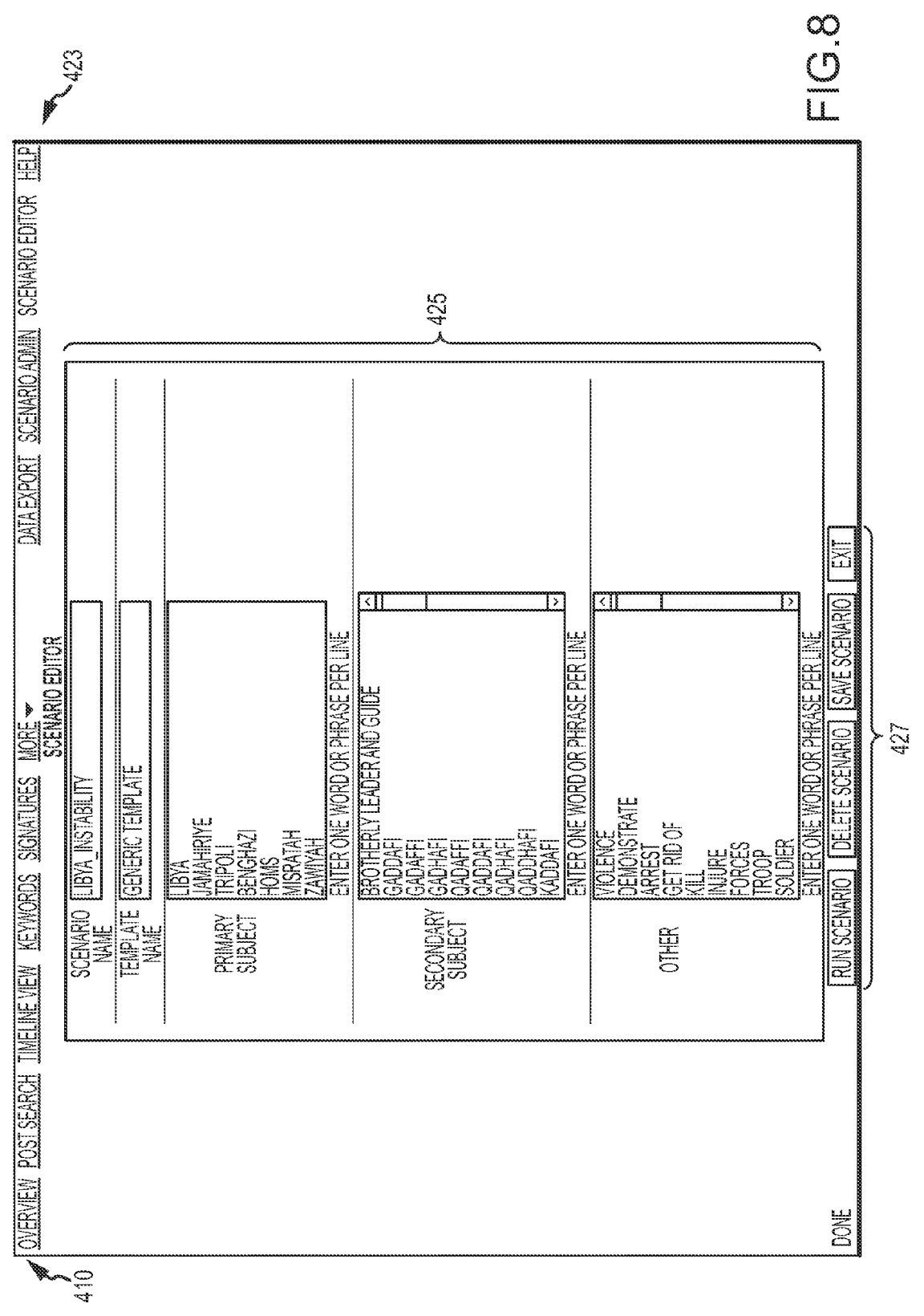

Once a scenario has been created, a user may edit the scenario as necessary. For instance, FIG. 8 illustrates another screenshot 423 of the dashboard 346 that may be presented to the user (e.g., upon manipulating a "Scenario Editor" button 410). This screenshot 423 may include a number of pre-defined cells 425 (or other types of features such as drop down menus and the like) which may be similar to those used to initially create the scenario and that allow for the entry and/or selection of the scenario name (e.g., to edit a previously chosen scenario name), a template name (e.g., to allow a particular scenario to be saved as a template for future use in generation of a scenario), and one or more keywords and/or phrases (e.g., parameters) according to keyword/phrase type or classification (e.g., "Primary Subject," "Secondary Subject," "Other," etc.) upon which a scenario query will be run by the query manager 56. This screenshot 423 may also include a number of buttons 427 (or other user manipulable features) that allow a user to selectively run, delete and/or save a scenario and/or exit the scenario editing feature.

Although not shown, other types of scenario parameters are envisioned such as time periods or date ranges, particular search services to be used, and the like. Furthermore, while the dashboard 346 has been described as presenting the splash screen of FIG. 4 to a user upon starting or running the dashboard 346, it is envisioned that other screenshots (e.g., those discussed elsewhere herein) could be initially presented to a user upon starting the dashboard 346.

Returning to FIGS. 1-2, each of the search services 18 may be, for instance, a different web feed aggregator (e.g., Google® News) that is operable to subscribe to a number of "web feeds" (i.e., frequently updated content such as RSS feeds) from a number of news or data outlets (e.g., MSNBC, Washington Post, Al Jazeera) and/or other online data sources. In this regard, the query manager 56 may pass parameters obtained from data store 46 for a particular scenario to the one or more search services 18 and subsequently obtain a list or collection of websites (e.g., URLs) from the one or more search services 18 corresponding to or matching the passed scenario parameters. Of course, the search services 18 are not limited to web feed aggregators and may in other embodiments include more traditional search engines and/or the like.

In any case, the query manager 56 may perform queries for open source information (e.g., posts such as articles, blog entries, etc.) that matches one or more sets of scenario parameters for various users according to any desired (e.g., automated) schedule (which may be configured via dashboard 346). In one arrangement, the query manager 56 may perform a query of one or more of the search services 18 each morning such that the most recent or substantially most recent news articles, blog entries, etc. may be available to a user (e.g., via dashboard 346) at the beginning of the day. Of course, numerous other query schedules are envisioned which may be automatically and/or manually performed. In any event, the query manager 56 may obtain from the search services 18 identifying information for a number of search results (e.g., URLs) which may be stored in data store 46 and/or utilized by the collection manager 58 as will be discussed below.

With continued reference to FIG. 2, the collection manager 58 may include a retrieval module 66 that may function to actually retrieve the open source information (e.g., the source code of a particular webpage of a website) via the URL or website identifying information obtained by the query manager 56, and a content extraction module 70 that, as will be discussed below, can extract desired content (e.g., the substantive text of a news article and not advertisements, navigation sections, etc.) from the particular webpage or other online data source for use in subsequent filtering and analyses. While the content extraction module 70 and related protocols (e.g., protocol 98 illustrated in FIG. 12) will be discussed in the context of extracting desired content from the source code of webpages and/or other online open source data, it is envisioned that the content extraction module 70 and related protocols may also be used to extract one or more types of content from other types of data as well (e.g., an organization's internal data, financial data, etc.).

Figure 9:
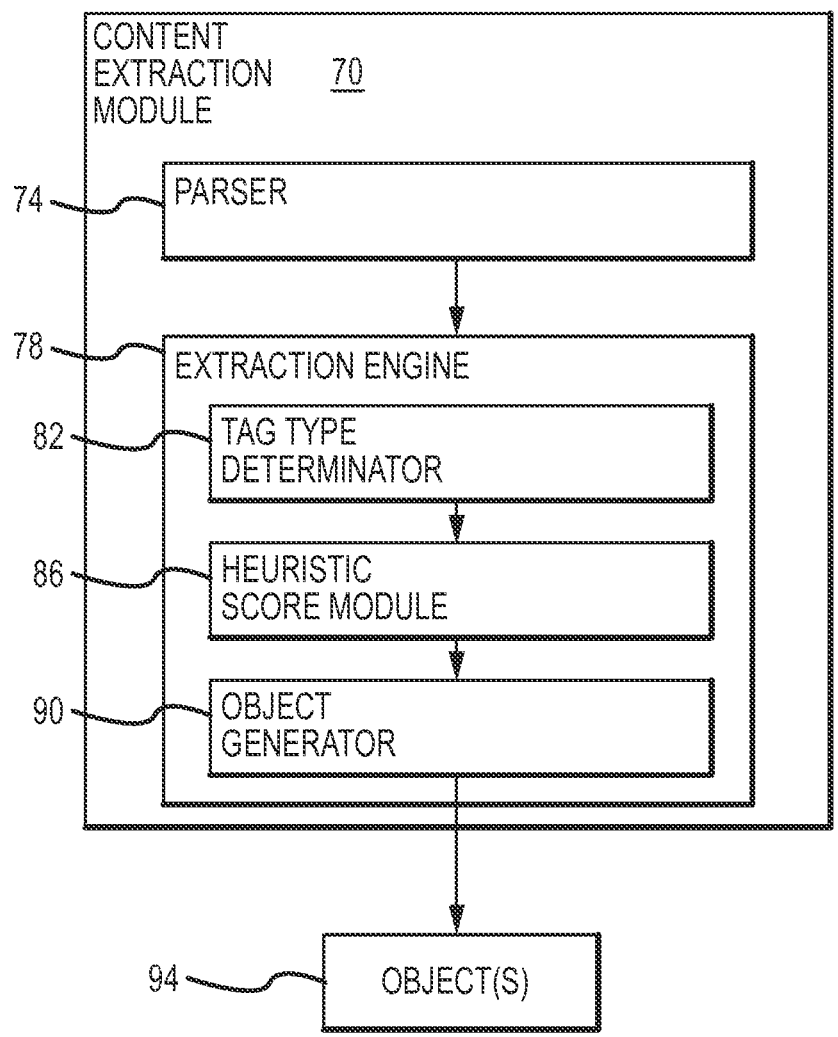
FIG. 9 illustrates a functional block diagram of a content extraction module of a collection manager of the backend processing engine of FIG. 2 that may be used to extract meaningful content from webpages or other online data sources.
Figure 10:
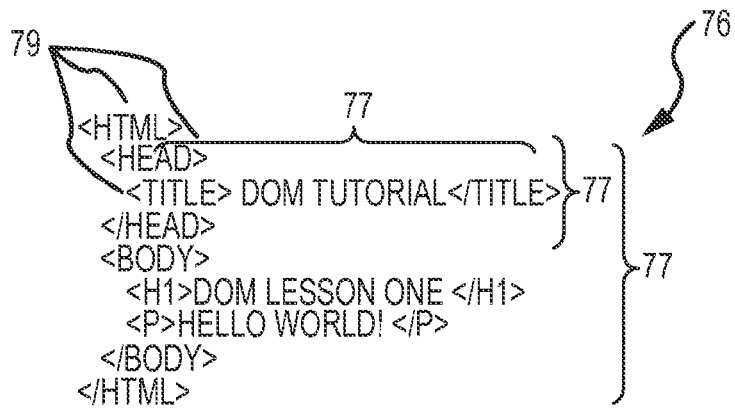
FIG. 10 illustrates a representative segment of HTML code including a number of elements on which the content extraction utility disclosed herein may be practiced.
Figure 11:
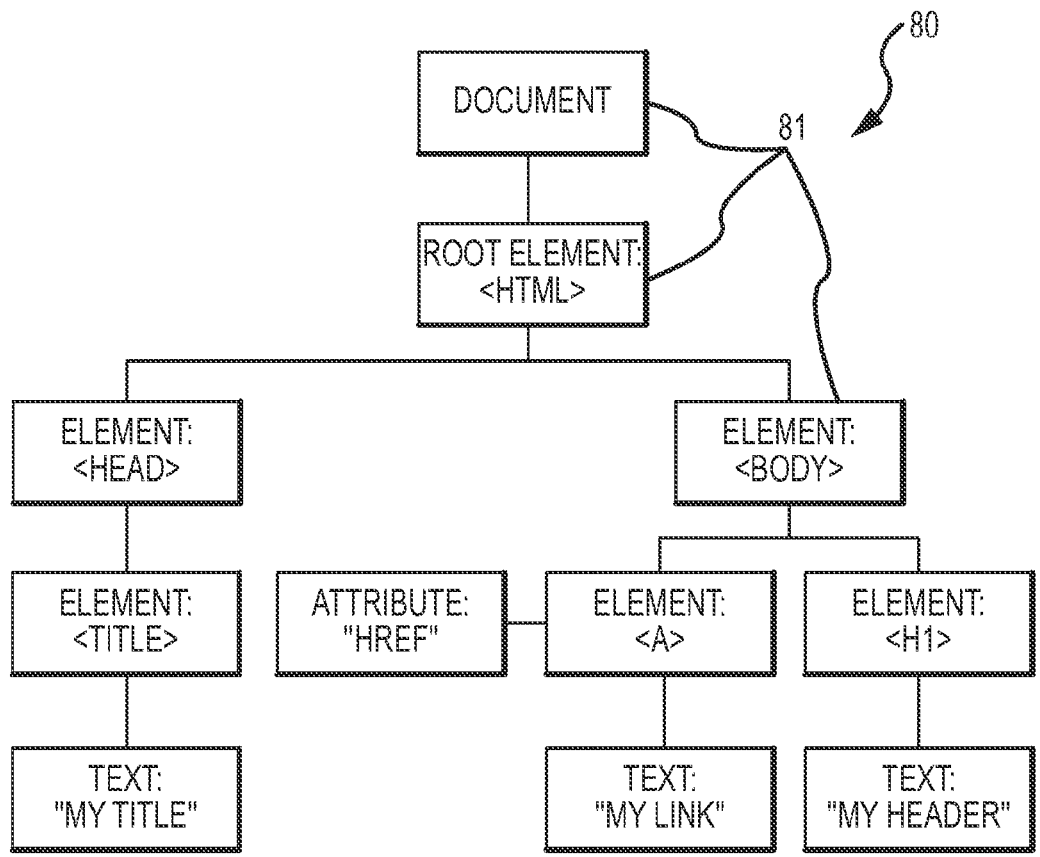
FIG. 11 illustrates a hierarchical parse tree including a number of nodes representing the elements of FIG. 10.

With additional reference now to FIG. 9, content extraction module 70 may include a parsing module or parser 74 that is operable to parse source code of a particular webpage or online data source into a number of elements and an extraction engine 78 that is configured to extract one or more type of content from the source code on which one or more types of analyses can be performed. A representative piece or segment of code 76 (e.g., HTML code) is illustrated in FIG. 10 that includes a number of elements 77, where each element 77 is associated with at least one tag 79 (for clarity, only some of the elements and tags have been labeled). The parser 74 may parse the code 76 into a hierarchical parse tree 80 as illustrated in FIG. 11, where the parse tree 80 includes a number of nodes 81 and each node 81 represents one of the elements 77 of the code 76.

The extraction engine 78 may also include a tag type determinator 82, a heuristic score module 86 and an object generator 90 which collectively function to extract one or more desired types of content from the source code of the particular webpage being analyzed through a heuristic (e.g., learning) process that requires little or no prior knowledge of the particular webpage (and with little or no human interaction). The extraction engine 78 may process the nodes 81 of the parse tree 80 in any appropriate orderly fashion (e.g., all sibling nodes, and then all sibling nodes of the next lower level, etc.) to determine whether each node is or is not likely to include content of interest.

As will be discussed below, part of this process may include utilizing the tag type determinator 82 to determine the tag type of the node (e.g., "HTML a" tag, "HTML text" tag), and then utilizing the heuristic score module 86 (which makes a number of queries in relation to the tag type and other node features) to assign a "heuristic score" to each node that is at least partially indicative of an interest level of the content of the node. For instance, lower scores (e.g., −1, −2, etc.) may indicate that the content of the node is more likely to be substantive (e.g., the actual text of a news article or blog entry) and thus of greater interest to a user in subsequent searches or analyses of the content (e.g., filtering, sentiment analyses, hierarchical signature analyses). As another example, higher scores (e.g., 1, 2, 3, etc.) may indicate that the content of the node is less likely to be substantive and thus less likely to be of interest to a user for subsequent searches or analyses. Advantageously, the extraction engine 78 may "fine tune" the score of a particular node over time by way of making further inquiries in relation to a node and or its features (e.g., attributes, events, content, etc.) to lend further confidence to the interest level of the content of a particular node. Once the extraction engine 78 has completed processing of the nodes of the parse tree 80 of a particular piece of source code, the object generator 90 of the extraction engine 78 is operable to generate one or more objects (e.g., data structures) that include the content of interest (e.g., the content of nodes with lower heuristic scores) which may be appropriately indexed (e.g., via URLs) and stored in data store 46.

Figure 12:
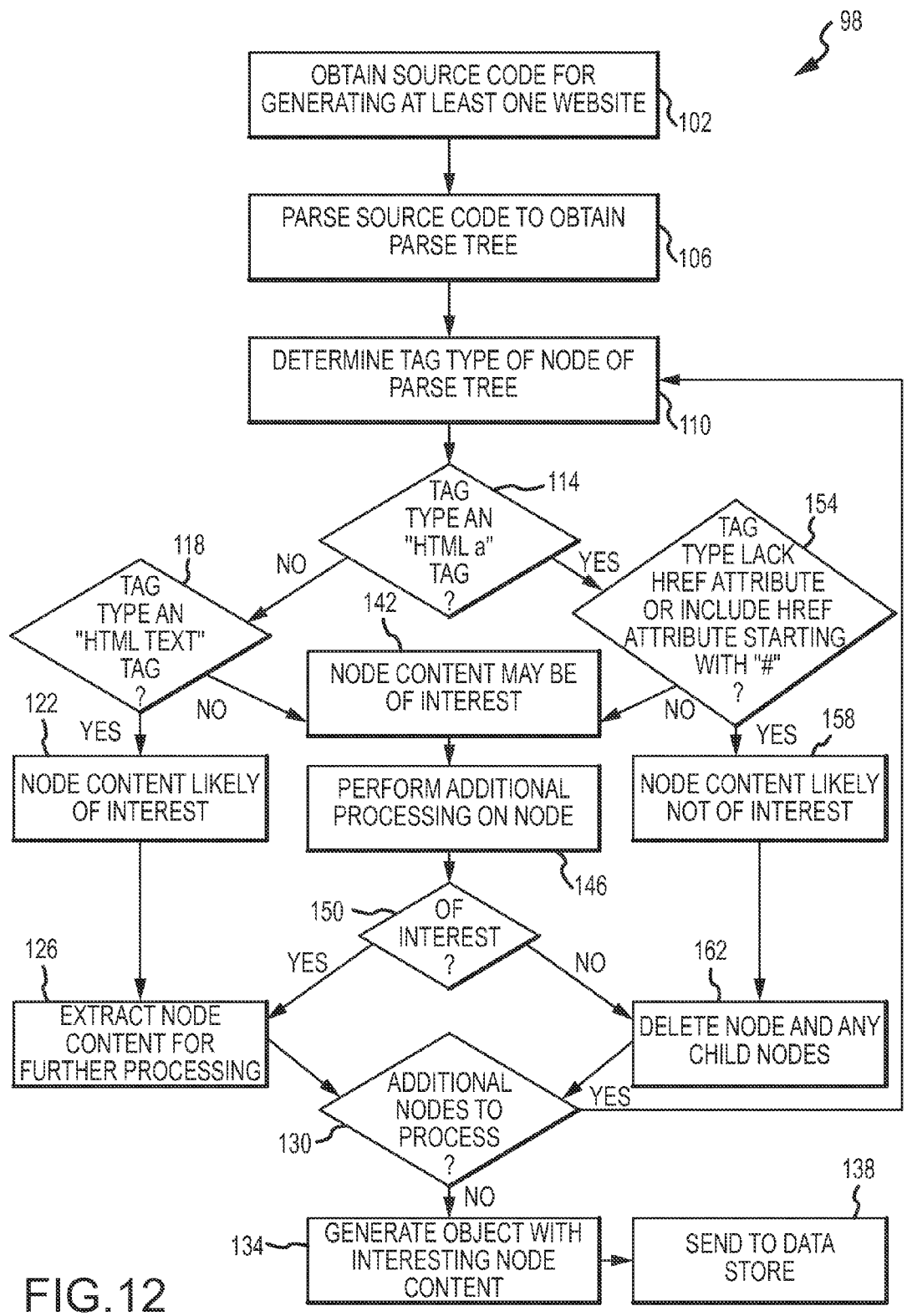
FIG. 12 illustrates a protocol or flow diagram for extracting one or more types of content from a webpage or other type of online content.

As shown in FIG. 12, a protocol 98 (e.g., one or more sets of computer readable instructions) is illustrated that is operable to extract desired content from source code of a webpage. It should be understood that extraction engine 78 and its respective modules (e.g., tag type determinator 82, a heuristic score module 86 and an object generator 90) may not necessarily represent physical pieces of hardware, but may merely represent particular segments of the protocol 98 that collectively function to extract content from source code of a webpage and generate corresponding objects. For instance, the retrieval module 66 may represent the step of obtaining 102 source code for generating at least one website or webpage in FIG. 12, and the parser 74 may represent the step of parsing 106 source code to obtain a parse tree in the protocol 98 in FIG. 12. Similar discussion applies to other modules, engines, and the like disclosed herein.

The protocol 98 may begin by obtaining 102 source code used to generate at least one website (e.g., the source code 76 shown in FIG. 10) from any appropriate data store (e.g., data store 46). After the source code is parsed 106 to obtain a parse tree (e.g., the parse tree 80 shown in FIG. 11), a tag type of a node (e.g., node 81) in the parse tree may be determined. For instance, the protocol 98 may begin with a node under a root node of the parse tree (e.g., one of the nodes 81 directly under the root node) and any child nodes of the node (i.e., lower nodes in the parse tree off of the node being currently analyzed). Of course, the nodes may also be analyzed in other appropriate manners. Once the tag type of the node is determined 110, it may be determined 114 whether it is an "HTML a" tag (i.e., an anchor that may be used to establish a link to another document or a bookmark on a page). Nodes 81 having such tag types may indicate that the content of such nodes is directed to links/bookmarks (instead of substantive text of a webpage) and thus may not be useful in a subsequent search and/or analysis of the webpage.

In response to an affirmative answer to the inquiry at 114, a first heuristic score (e.g., a score greater than 0) may be allocated to or associated with the node (e.g., where a negative answer to the inquiry at 114 may result in a second heuristic score less than zero) and the protocol 98 may then query 154 whether the tag type lacks an "href" attribute or includes an href attribute starting with "#".

An affirmative answer to this inquiry 154 may indicate 158 that the content of this particular node is likely not of interest (i.e., is not directed to substantive content of the webpage because it includes a hyperlink to another portion of the same webpage). For instance, the first heuristic score may assume a third heuristic score (e.g., 2) when the inquiry at 154 is affirmative. Assuming the third heuristic score indicates that the content of the node is likely not of interest, then the node and any child nodes of the node may then be deleted 162 from the analysis, and then the protocol 98 may query 130 whether there are additional nodes to process. This process of determining when a particular heuristic score indicates deletion of a node will be discussed in more detail below. In any event, if the inquiry 130 indicates that there are additional nodes to processes, the protocol 98 may then flow back to 110 to determine a tag type of a node as discussed previously. For instance, processing may move to a "sibling" node of the previously processed node (i.e., a node at the same hierarchical level of the parse tree 80). As another example, any offspring or child nodes of the node may be processed (e.g., starting at box 110), and the heuristic score of each child may be the heuristic score of its parent plus the heuristic score of the child determined in isolation from other nodes.

In any event, and returning to inquiry 154, if the tag type of the node was determined 154 to not lack an href attribute or not include an href attribute beginning with "#", then the first heuristic score may assume a fourth heuristic score (e.g., less than the third heuristic score and greater than the second heuristic score, e.g., 1) and the protocol 98 may make a determination 142 that the node content may be of interest and may perform 146 additional processing on the node (i.e., make additional determinations of the tag type of the node which lend further confidence that the node is or is not of interest). For instance, if the content of the node is a link to another website (i.e., is an "inlink"), such content may be useful for building an online information flow network as will be discussed later in this discussion. As another example, the additional processing may query whether the tag type is an "HTML img" tag, and, if so, allocate a particular heuristic score to the node (e.g., 0). As a further example, the additional processing may entail determining whether the tag type is an "HTML li" tag (i.e., a list tag), and then assign a particular heuristic score to the node based upon the relative interest in the content of a node having such a tag.

Returning to 114 where it was queried whether the tag type of the node is an HTML a tag, a negative answer to this inquiry may cause the protocol 98 to allocate a second heuristic score to the node (e.g., less than 0) and make a further inquiry as to whether the tag type of the node is an "HTML text" tag at 118. A positive determination at block 118 may cause the second heuristic score to assume a third heuristic score (e.g., −1) and cause an indication 122 that the content of the particular node is likely of interest (i.e., because it appears, by virtue of its tag type being a "text" tag, that the content of the particular node at least partially makes up a substantive portion of a webpage, e.g., the text of a news article rather than an advertisement section), and then the node content may be extracted 126 for further processing. However, a negative determination at 118 may cause the second heuristic score to assume a fourth heuristic score (e.g., 0), and then the protocol 98 may flow to 142 and 146 for additional processing on the node as discussed previously.

Once heuristic scores have been allocated to the various nodes of the parse tree, numerous manners are envisioned for determining whether the content of a particular node is to be extracted for use in generating an object or whether the node (and any child nodes) is to be deleted (i.e., not extracted for use in building an object). In one arrangement, if the node is a list node (e.g., see above discussion in relation to additional processing at 146) and has a heuristic score of greater than −1, then the node and any children nodes may be deleted. In another arrangement, if the node has one or more children and has a navigation heuristic score that is greater than 0, then the node and any children nodes may be deleted. In another arrangement, the context of any node with a heuristic store of less than −2 may be extracted. In further arrangements, nodes may be retained and/or deleted based on tag type (e.g., without regard to heuristic score) or based on heuristic score (e.g., without regard to tag type).

In some situations, a website or URL obtained by the retrieval module 66 may include a plurality of articles, only one of which was the reason the website was obtained by the query manager 56 from one or more of the search service 18. For instance, in the situation where a search service 18 is a web feed aggregator and returns a list of URLs with a summary of the relevant article(s) or posts(s) in each returned URL, various words or terms of the summary can be used by the protocol 98 or content extraction module 70 for extracting just the substantive text of the particular article as opposed to the substantive text of all of the articles or posts on the website.

It should be understood that the use of "first" heuristic score, "second" heuristic score, etc. has only been used for purposes of discussion and should not in any way limit the scope of the disclosure. Rather, such labels have merely been used to explain the various types of relationships between heuristic scores based upon the answers to various inquiries about the nodes of a parse tree. Furthermore, the protocol 98 need not necessarily include all of the steps/determinations shown in FIG. 12. In some embodiments, the protocol 98 may include only the determination 114 as to whether the tag type is an "HTML a" tag and then extract the content if it is not an "HTML a" tag and delete the content if it is an "HTML a" tag. In other embodiments, the protocol 98 may include the determination 114 in addition to another layer of determinations (e.g., such as determinations 118 and 154). These and other arrangements are envisioned and encompassed within the scope of the present disclosure.

Figure 13:
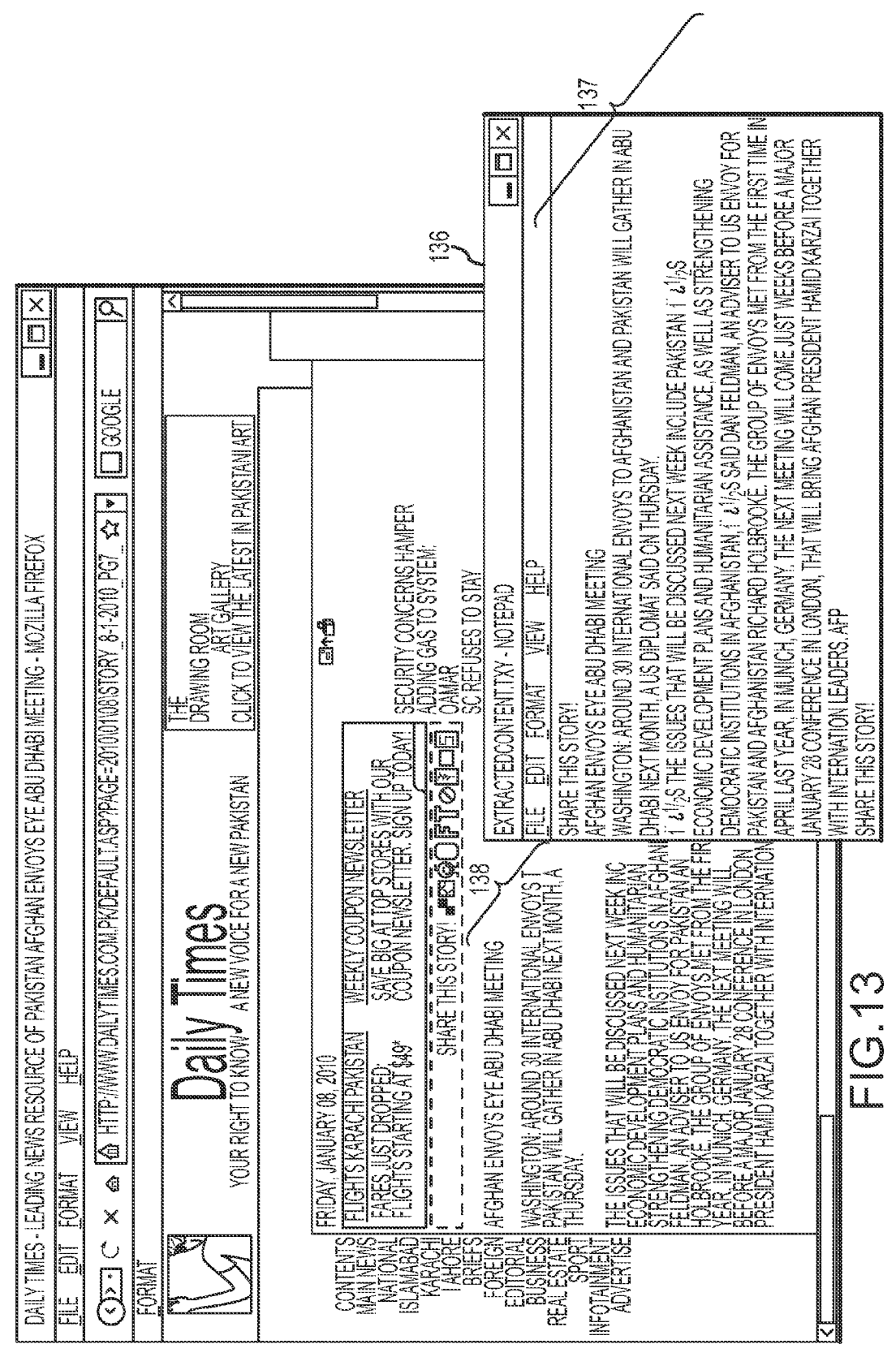

In any event, once it has been determined 130 that there are no additional nodes to process, then the protocol 98 may generate 134 an object 94 (e.g., any appropriate data structure, see FIG. 9) that includes the interesting content of the nodes (e.g., just the text of a news article), and then the object may be sent to a data store (e.g., data store 46 in FIG. 1) for use in subsequent searches and/or analyses (e.g., by tools of toolbox 62 in FIG. 2). With reference to FIG. 13, a representative object 136 (e.g., object 94) is shown including content 137 extracted from the source code of an online data source 138 (e.g., a news article) using the content extraction module 70 (e.g., protocol 98).

In one arrangement, the content extraction module 70 may utilize one or more types of similarity metrics for use in identifying off-topic or low value articles, posts, and/or portions thereof (and/or their respective objects 94, see discussion in relation to FIGS. 9-12) that are obtained as part of a collection (e.g., ensemble) of posts or documents that match one or more sets of scenario parameters. More specifically, while each of the returned posts may have at least some portions that match the one or more sets of scenario parameters, other portions of some of the returned posts may be of limited value and thus may be deleted or otherwise removed from further analyses. Such low or limited value portions may be a particular section or sections (e.g., paragraph(s)) of a single article of a single post, one or more articles out of a plurality of articles on a single post, one or more posts out of the collections of posts that match the scenario parameters, and the like.

For instance, one or more posts or documents and/or portions thereof may be in a different language than the rest of the collection, may have their publication date mislabeled, or may represent an error page for the website. As another example, a page of a post or document may have a small relevant snippet (e.g., in relation to the particular scenario parameters), but the rest of the page may be off-topic (e.g., from the particular scenario parameters). In some scenarios, the sheer volume of posts related to more popular topics may cause the off-topic or low value portions to be overlooked. As will be shown below, the similarity metrics disclosed herein are operable to determine a range of contrasting contextual data in a collection of posts. For instance, contextual data that is close to one or both ends of the range may be largely dissimilar from the majority of the data and thus considered off-topic or low value data which need not be extracted and thus may be removed from further analysis. It is envisioned that the similarity metrics may be utilized with the original source code of returned posts/documents or with the objects 94 as generated by the protocol 98 (i.e., those that already have navigation sections, advertisements, and the like removed).

Figure 14:
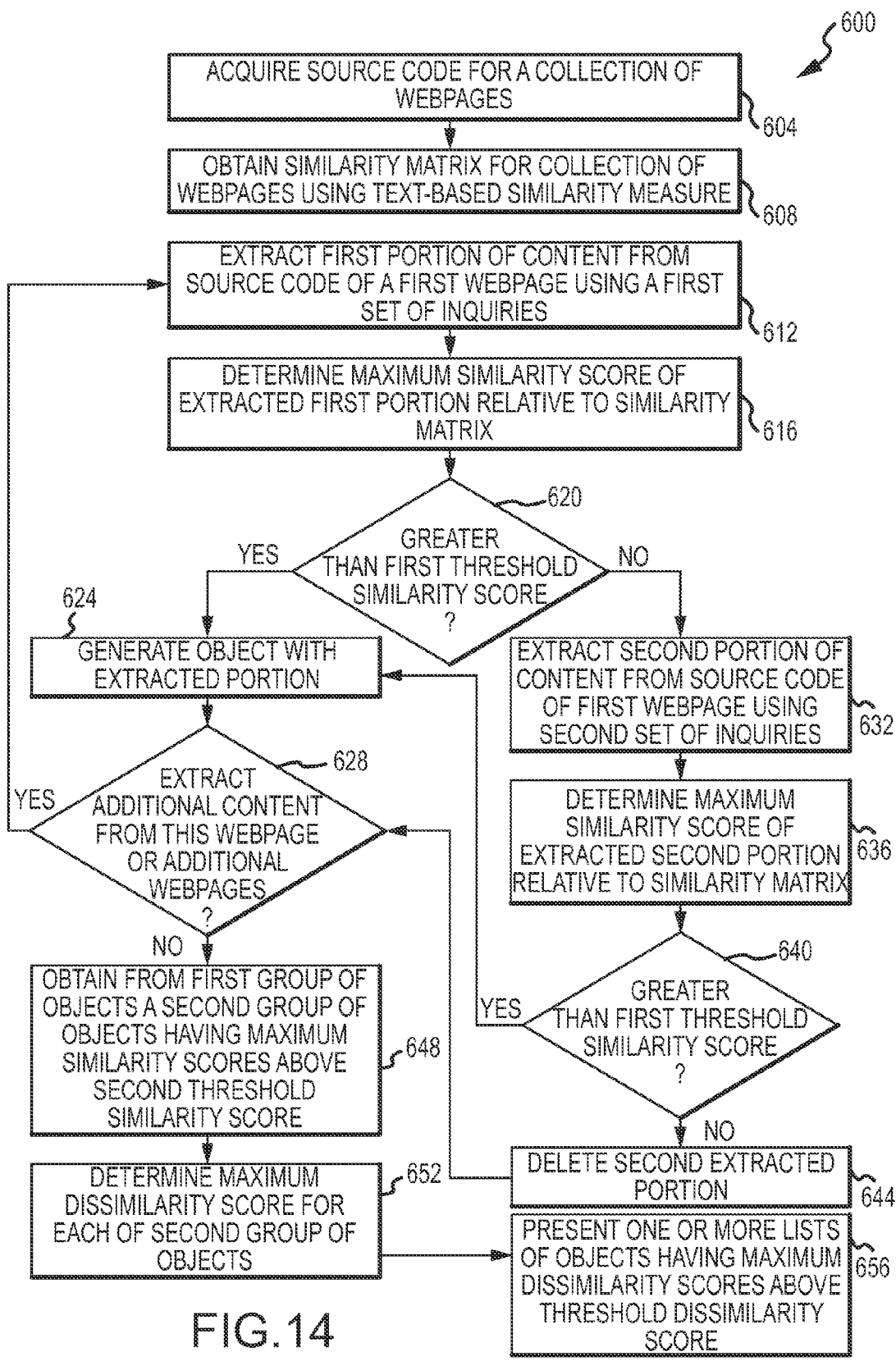
FIG. 14 illustrates a protocol or flow diagram for identifying and eliminating low value or off-topic posts and/or portions of posts from a collection of posts that match one or more scenario parameters.

Turning now to FIG. 14, a protocol 600 is shown for use in identifying and eliminating low value or off-topic posts and/or portions of posts from a collection of posts that match one or more scenario parameters. After source code (or objects 94) has been acquired 604 for each of a collection of posts (e.g., webpages), a similarity matrix may be generated or otherwise obtained 608 for the collection from the acquired source code using a text-based similarity measure and/or in any other appropriate manner. For instance, the various elements of the similarity matrix may measure pairwise similarities of objects (e.g., overlap of particular words or phrases, type of post, publication year, and/or the) like among the webpages of the collection.

Furthermore, a first portion of content may be extracted 612 from the source code of a first webpage using a first set of inquiries. The extracted first portion may be a particular section or sections (e.g., paragraph(s)) of a single article of a single post, one or more articles out of a plurality of articles on a single post, one or more posts out of the collections of posts, and the like. In one arrangement, the first set of inquiries may inquire whether the source code or object 94 of the first webpage or portion thereof has one or more particular keywords, phrases, frequency of keywords or phrases, and/or the like, and extract the first portion based on the answers to such inquiries. Such keywords or phrases may identify low-value or off topic content and/or alternatively may identify content that is likely to be relevant in relation to the particular scenario or sub-scenario under consideration.

In any event, a maximum similarity score of the extracted first portion may be determined 616 relative to the similarity matrix. In one arrangement, the similarity matrix may be used to obtain similarity scores of the extracted first portion in relation to each of the plurality of other webpages and/or portions thereof represented in the similarity matrix, and then the various similarity scores may be appropriately averaged or otherwise normalized to obtain a maximum similarity score of the extracted first portion relative to the collection as a whole. Once the maximum similarity score for the extracted first portion has been determined 616, it may be determined 620 whether it is greater than (or greater than or equal to) a first threshold similarity score. For instance, users may be able to appropriately set or otherwise configure the first threshold similarity score to be at a level whereby similarity scores above such a level indicates that associated portions of extracted content are more or highly likely to be relevant (i.e., not off-topic or of low value). In response to an affirmative answer at 620, an object (e.g., data structure) may be generated 624 including the extracted first portion of content and the protocol 600 may proceed to query whether additional portions of the current webpage or additional webpages need to be extracted 628. An affirmative answer at 628 may cause the protocol 600 to flow back to extract 612 another first portion of content while a negative answer at 628 may cause the protocol 600 to perform additional processing on a group of objects including various portions of extracted content.

Returning to 620, if it was determined that the maximum similarity score of the extracted first portion was not greater than (or not greater than or equal to) the first threshold similarity score, the protocol 600 may proceed to extract 632 a second portion of content from the source code of the first webpage using a second set of inquiries (different than the first set of inquiries). That is, at least one inquiry in the second set of inquiries may be different than those in the first set. In one arrangement, the content extraction module 70 may be operable to automatically edit or otherwise adjust the heuristics (i.e., the various inquiries made to identify supposedly "relevant" content) so that a second portion of content is extracted from the source code that is different than the first portion. For instance, the content extraction module 70 (or other module of the backend processing engine 50) may analyze the extracted first portion to determine which parts of the extracted first portion are causing the extracted first portion to have a maximum similarity score below the first threshold similarity score (which parts of the extracted first portion themselves have low maximum similarity scores in relation to the similarity matrix). Thereafter, the content extraction module 70 may insert, delete and/or edit one or more of the first set of inquiries of FIG. 12 so that the generated object is devoid of or has been at least partially removed of at least some of those parts or portions causing the maximum similarity score of the extracted first portion to be below the first threshold similarity score.

Similar to the analysis performed in relation to the first extracted portion, the protocol 600 may proceed to determine 636 a maximum similarity score of the second extracted portion and then query 640 whether the maximum similarity score of the second extracted portion is greater than the first threshold similarity score. An affirmative answer to the inquiry at 640 may cause the protocol 600 to return to 624 to generate an object with the extracted second portion while a negative answer to the inquiry at 640 may cause the protocol 600 to delete 644 the second extracted portion (i.e., because it may likely be directed to low value, off-topic, or off-date content) and then query 628 whether additional portions from the current webpage and/or additional webpages need to be extracted.

While the protocol 600 has illustrated making only first and second passes at extracting a particular piece of content from a webpage (at steps 612-620 and then at 632-640), the present disclosure in other arrangements contemplates making additional attempts to a extract a particular piece of content. For instance, instead of deleting the second extracted portion at 644, the protocol 600 may extract a third portion at 644 using a third set of inquiries, determine a maximum similarity score for the third portion, and then query whether or not it is greater than the first threshold similarity score. An affirmative answer may cause the protocol 600 to generate 624 an object with the extracted third portion while a negative answer may cause the protocol 600 to delete the extracted third portion and/or extract additional portions of the particular piece of content under consideration.

Once it has been determined at 628 that no additional content needs to be extracted from the collection of webpages, a user may have access to a more refined and/or relevant set of data objects (e.g., stored in data store 46 of wisdom server 14) from which to perform one or more analyses as will be discussed in greater detail in relation to the figures that follow. Furthermore, numerous steps of the protocol 600 (and other protocols disclosed herein) may be performed in an order other than that illustrated in FIG. 14. In one arrangement, the similarity matrix may be generated or otherwise obtained after at least some content has been extracted from the source code portions of the collection. That is, the similarity matrix need not be obtained directly from the original or virgin source code of the collection of webpages as it may appear in FIG. 14, but instead may be obtained from a collection of objects that correspondingly represent the collection of webpages having navigation sections, advertisements, and the like removed. For instance, the protocol 98 of FIG. 12 may be performed a number of times to obtain objects at 134 for a collection of webpages, and then step 608 in FIG. 14 may include obtaining a similarity matrix from the objects obtained from the protocol 98. In this regard, step 612 of FIG. 14 may either include using one of the objects or extracting a portion of one of the objects.

Returning to FIG. 3, the dashboard 346 may include a post query administrator 354 that is operable to accept any appropriate query parameters (e.g., key words, Boolean operators, date ranges, etc.) from a user (e.g., via any appropriate peripheral device) and then coordinate with the data access layer 54 of the WISDOM server 14 to filter or perform a query of the objects 94 stored in data store 46 corresponding to one or more scenarios based on the accepted query parameters. In this regard, the post query administrator 354 can allow a user to define one or more "sub-scenarios" of one or more previously defined scenarios. As discussed throughout, a "post" may be a news article, individual blog or forum entry, and/or other online data source. Upon receipt of query results (e.g., objects 94) from data store 46, the post query administrator 354 may cause the presentation of such search query results on a user's display (e.g., a list of the results in any desired order such as by relevancy, date, type of post, etc.). While the post query administrator 354 of the dashboard 346 has been discussed as performing the filtering of the objects based on the entered parameters, other embodiments envision that one or more engines or tools of the toolbox 62 of the backend processing engine 50 could perform the same (similar discussion applies to other administrators/modules of the dashboard 346).

Figure 15:
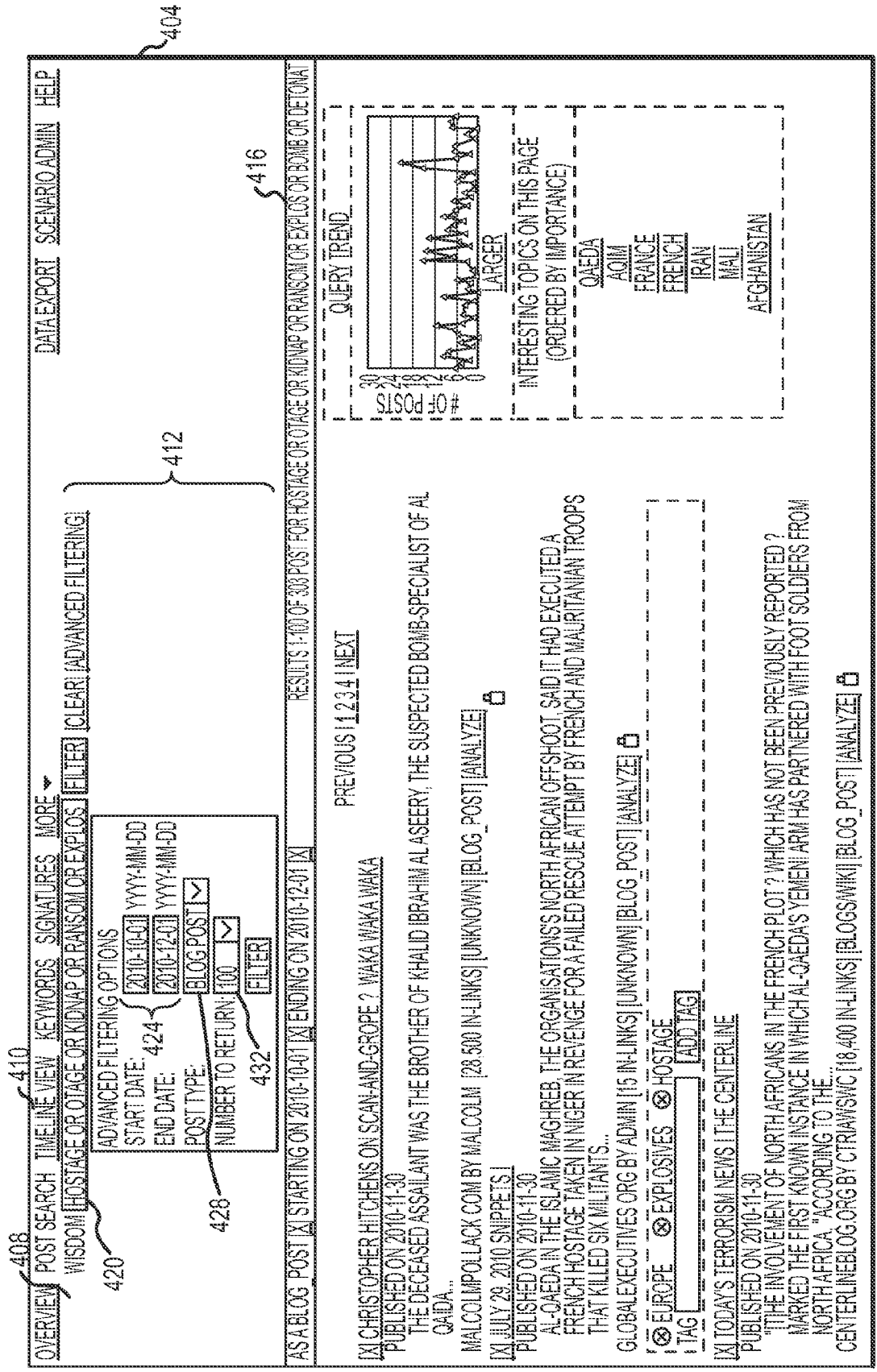
FIG. 15 illustrates another screenshot of the dashboard of FIG. 4.

With reference now to FIG. 15, another screenshot 404 of the dashboard 346 is illustrated that may be presented on a display by the post query administrator 354 upon manipulation of a "post search" button 410. This screenshot 404 allows a user to define a search or query to be performed by data access layer 54 and/or post query administrator 350 on objects 94 in data store 46 corresponding to one or more particular scenarios (and then receive corresponding search results). This screenshot 404 may include a navigation section 408 having a number of buttons 410 (or other user manipulable features), each of which provides a user access to a particular feature or features of the WISDOM server 14 (e.g., sentiment analysis, hierarchical signatures, etc.). The navigation section 408 may also include a control panel 412 including one or more user manipulable features (e.g., typing cells, drop down menus, etc.) that allow a user to modify or control query or analysis parameters (e.g., search terms, date ranges, type of post to be returned, etc.). The screenshot 404 may also include a presentation area 416 for presenting a graphical representation of search results, analyses, and the like, depending upon the particular button 410 (or other manipulable feature) manipulated.

For instance, the control panel 412 may include a cell 420 that allows a user to enter one or more keywords and/or Boolean operators (e.g., "hostage OR otage OR kidnap OR ransom") on which a query of objects 94 is to be performed. The control panel 412 may also include cells 424 to enter or select a time period during which returned search results must fall within (e.g., as determined by their publication dates), a drop down menu 428 to select the particular type of post that the returned search results must be (e.g., blog posting, news article, etc.), and/or a drop down menu 432 which allows a user to select a maximum number of search results to return.

Returned search results may be presented (e.g., in list form) in the presentation area 416, where each search result may include a link (e.g., a URL) to the source of the search result (e.g., to the website on which a news article is found), a summary of the post, the type of post (e.g., blog post, news article), among other information (e.g., number of in-links to post). In one arrangement, the post query administrator 350 governs presentation of the search results on the user's display (i.e., data related to the search results are received from the WISDOM server 14, and then the post query administrator 350 converts the data into the graphical representation shown in the presentation area 416 as shown in FIG. 15). While not shown, a user may also be able to set up a number of different queries (each being defined by different query parameters) according to one or more query schedules. For instance, a "Query A" may be set to run on the objects 94 of a particular scenario twice a day whereas a "Query B" may be set to run on the objects 94 of a different scenario once per morning. Query results may be stored in data store 46 of WISDOM server 14 and made accessible to a user on client device 22 via data access layer 54 of the WISDOM server 14. Of course, query results may also be stored on storage module 334 of client device 22 (e.g., via data export manager 358 of dashboard 346).

Again returning to FIG. 3, the dashboard 346 may include a timeline module 372 that is operable to accept any appropriate parameters in relation to timelines (e.g., date ranges) and scenarios (e.g., scenario and/or sub-scenario name) from a user (e.g., via any appropriate peripheral device), coordinate with the data access layer 54 of the WISDOM server 14 to filter or perform a query of the objects 94 stored in data store 46 corresponding to one or more scenarios based on the accepted date ranges, and then present a graphical representation (e.g. in timeline form) on a user's display of post objects matching the entered parameters. In one embodiment, the timeline may present posts in a manner that provides a particular breadth of coverage for each time period (e.g., for each day of a particular time range). That is, the timeline may present a user with a variety of posts each day, all of which are still encompassed within the parameters of the particular scenario, sub-scenario, etc.

In one arrangement, and referring back to the protocol 600 of FIG. 14, a second group of objects may be obtained 648 from a first group of objects that have maximum similarity scores above a second threshold similarity score (higher than the first threshold similarity score). That is, the set or collection of objects obtained at 628 may be further "pruned" or narrowed by eliminating those objects having maximum similarity scores (in relation to the similarity matrix) below the second, higher threshold similarity score. Then, for each of the objects in the pruned set of objects, a maximum dissimilarity score may be determined 652 relative to one or more of the other objects of the pruned set of objects and/or the similarity matrix using any appropriate dissimilarity measure (to provide an indication of a relative discrepancy between two or more objects). The maximum dissimilarity scores may be compared to a threshold dissimilarity score and those maximum dissimilarity scores that are greater than the threshold dissimilarity score may be presented 656 on a display in the form of one or more lists (e.g., segregated according to day). Thus, a user interested in observing or perceiving a particular level of diversity of posts each day may set or configure the threshold dissimilarity score accordingly (e.g., by setting the threshold dissimilarity score higher for a greater degree of diversity between posts, and vice versa).

Figure 16:
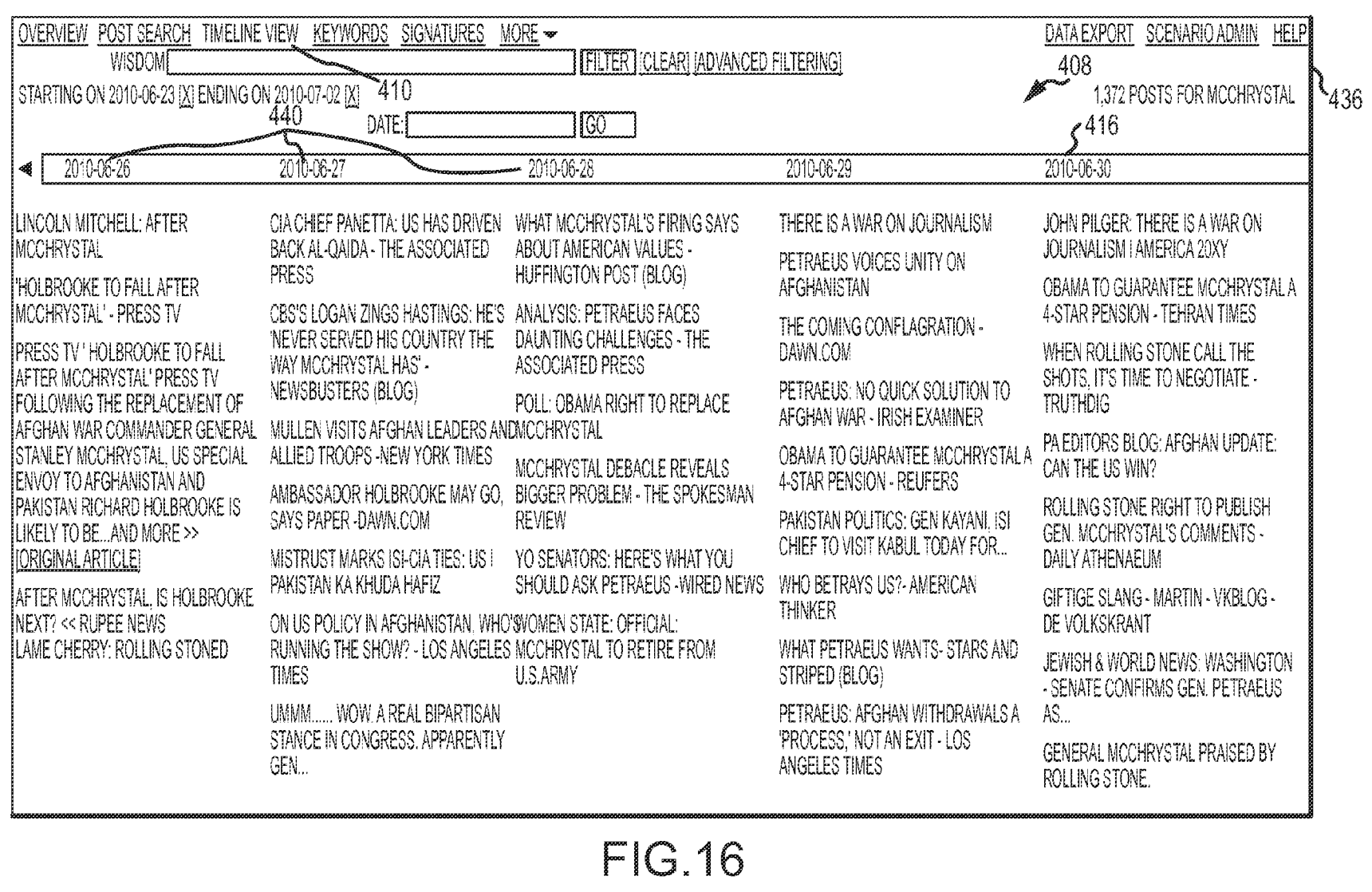

Turning now to FIG. 16, another screenshot 436 of the dashboard 400 may be presented to a user upon manipulation of a "Timeline View" button 410. For instance, the timeline module 372 of the dashboard 346 (see FIG. 3) may present posts (e.g., of a scenario, of a sub-scenario such as the search results of the previously discussed search query of FIG. 15) in the form of a timeline view. As shown, the presentation area 416 may include a number of columns 440, where each column 440 represents a particular day and includes posts from the particular day (e.g., published on the particular day) having a particular level of dissimilarity from other posts of the same particular day. A user may be able to select a particular date range of search results to be presented in the presentation area 416 via the navigation section 408.

The pruned list of objects (e.g., data sets) obtained at 648 of FIG. 14 may also be used as part of one or more additional analyses such as one or more of those disclosed herein (e.g., post searching as shown in FIG. 15, sentiment, signature or information flow analyses as discussed below, and/or the like).

In another arrangement, the timeline module 372 may present the timeline view of dissimilar posts or webpages shown in FIG. 16 based on a collection of posts or webpages that has not been initially "pruned" in the manner discussed at steps 612 through 648 of FIG. 14. For instance, step 652 of FIG. 14 may entail analyzing the original source code of each webpage or post in the collection relative to the similarity matrix obtained in step 608 to determine a maximum dissimilarity score for each webpage or post in the collection. Step 656 may then entail presenting one or more lists (e.g., in a timeline view) of objects or webpages having maximum dissimilarity scores above a threshold dissimilarity score. In one variation, step 652 may alternatively include analyzing the objects 94 generated at step 134 of FIG. 12 (i.e., instead of the original source code) relative to the similarity matrix to determine maximum dissimilarity scores for presentation of webpages having maximum dissimilarity scores above a threshold dissimilarity score.

Figure 17:
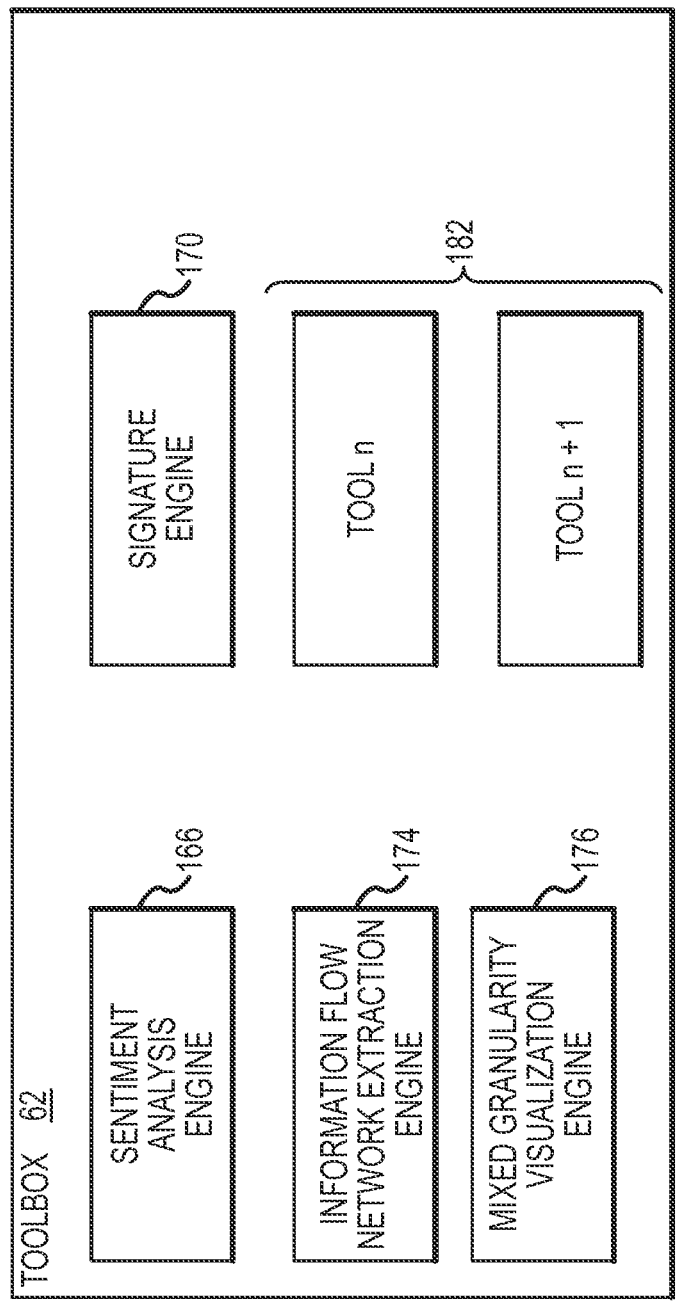
FIG. 17 illustrates a functional block diagram of a toolbox of the backend processing engine of FIG. 2, where the toolbox include a number of tools that may be used to analyze information obtained from one or more search services.

With reference now to FIGS. 2 and 17, the toolbox 62 of the backend processing engine 50 may include any appropriate number of modules, engines and the like that are operable to retrieve objects 94 (where each object 94, as discussed above, may represent desired content (e.g., substantive content) of an online data source such as a news article, blog posting, and the like obtained by backend processing engine 50 in a query of search services 18 based on one or more scenarios) from the data store 46 in relation to one or more scenarios and then perform one or more types of analyses on such objects for use in conveying additional/enhanced visual analytics to users. For instance, one of the tools of the toolbox 62 may be a sentiment analysis engine 166 for use in automatically determining a "sentiment" of one or more terms among one or more data sets (e.g., objects 94) over any appropriate time period(s). In one embodiment, each data set represents the objects 94 corresponding to one or more particular scenarios or sub-scenarios.

As used herein, a "sentiment" of a term or phrase may be an impression (e.g., negative, neutral, positive) of the term or phrase based on the general context of the object(s) 94 in which the term is found. The sentiment analysis engine 166 may allow a user who has defined a scenario (e.g., via scenario generator 350 of dashboard 346, see FIG. 3) to be used in obtaining online open source information (e.g., news articles, blog entries) to visualize a sentiment and/or volume of the "x" (where x may be any positive integer) most frequently disclosed terms and/or phrases (e.g., top 5, top 10) over a time period (e.g., over the past 2 weeks) in the returned open source information corresponding to the user's scenario (s). For instance, a user who has defined a scenario centered on recent attitudes or opinions of President Obama in relation to healthcare may obtain a graphical representation of a sentiment and volume of terms such as "Obama," "Medicare" and "pharmaceutical" based on returned open source information corresponding to the defined scenario. In one arrangement, the sentiment analysis engine 166 may automatically select those terms to be used as part of a sentiment/volume analysis (e.g., x most frequently disclosed) instead of the user having to manually select words or terms for which to perform a sentiment analysis. It is noted that the words/terms may or may not be the same as the scenario parameters used by the query manager 56 to obtain corresponding open source information.

Figure 18:
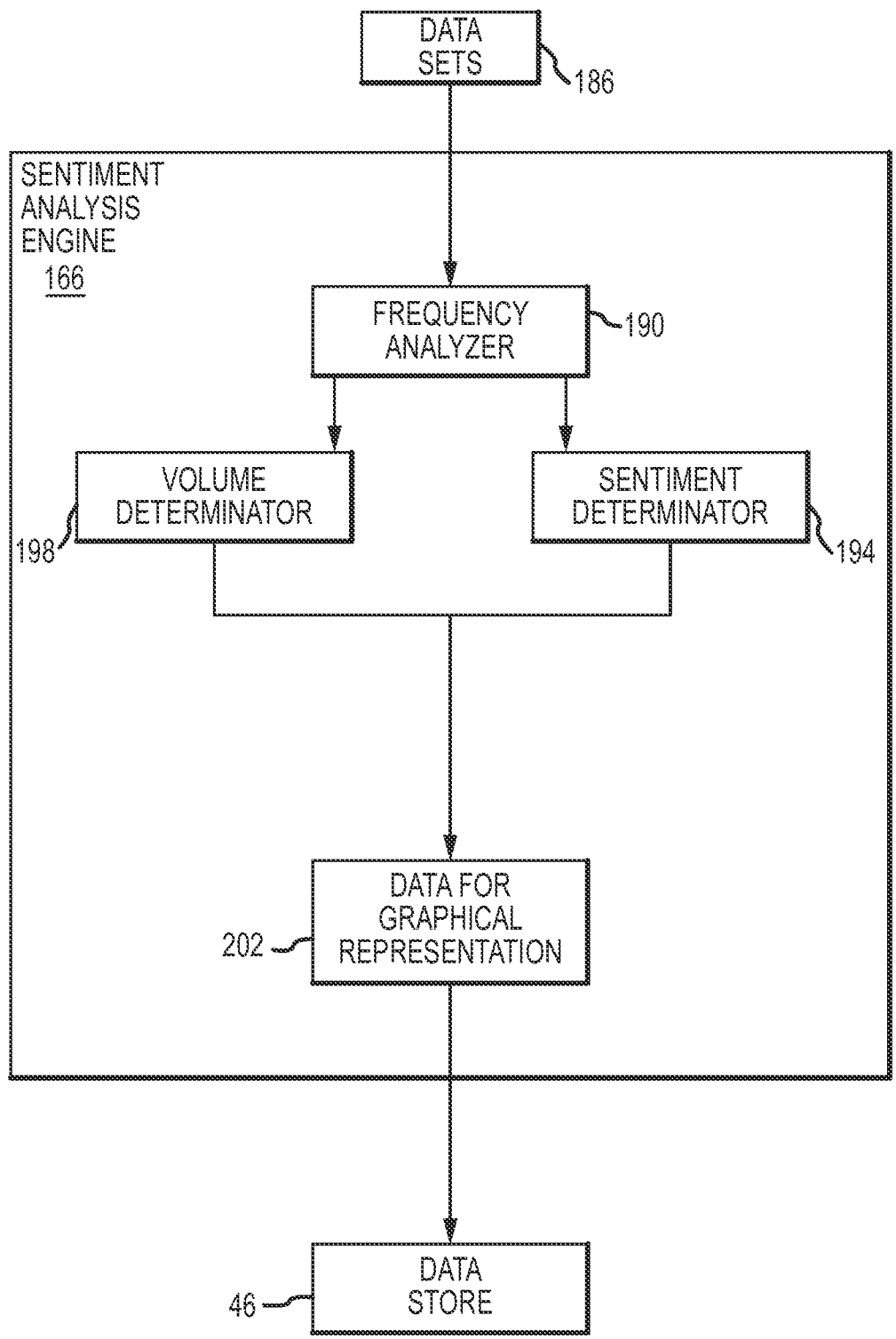
FIG. 18 illustrates a functional block diagram of a sentiment analysis engine of the toolbox of FIG. 17.

As shown in FIG. 18, the sentiment analysis engine 166 may include a frequency analyzer 190 which is operable to receive or retrieve data sets 186 (e.g., objects 94 corresponding to one or more scenarios or sub-scenarios) and determine the x most frequently disclosed terms among the data sets 186 (where "x" is a positive integer). The frequency analyzer 190 may pass the x most frequently disclosed terms (and possibly the objects in which such terms were disclosed) to a sentiment determinator 194 and a volume determinator 198 for respectively determining a sentiment and volume of each of the x most frequently disclosed terms over a particular time period and thereafter generating data 202 for use in generating a graphical representation on a display in relation to the sentiments/volumes of the x most frequently disclosed terms. In one arrangement, the data 202 may be passed to data store 46 of WISDOM server 14 and passed to or retrieved by dashboard 346 for presentation of the sentiment/volume information on a display.

The sentiment analysis engine 166 may be operable to automatically update the sentiment/volume analysis upon any scenario or query parameters being modified by a user and/or new online data being received by backend processing engine 50. For instance, upon a user choosing to analyze objects 94 of a different scenario (e.g., via dashboard 346), the sentiment analysis engine 166 may automatically cause the recalculation of the sentiment/volume of the x most frequently disclosed terms based on the objects of the different scenario.

Figure 19:
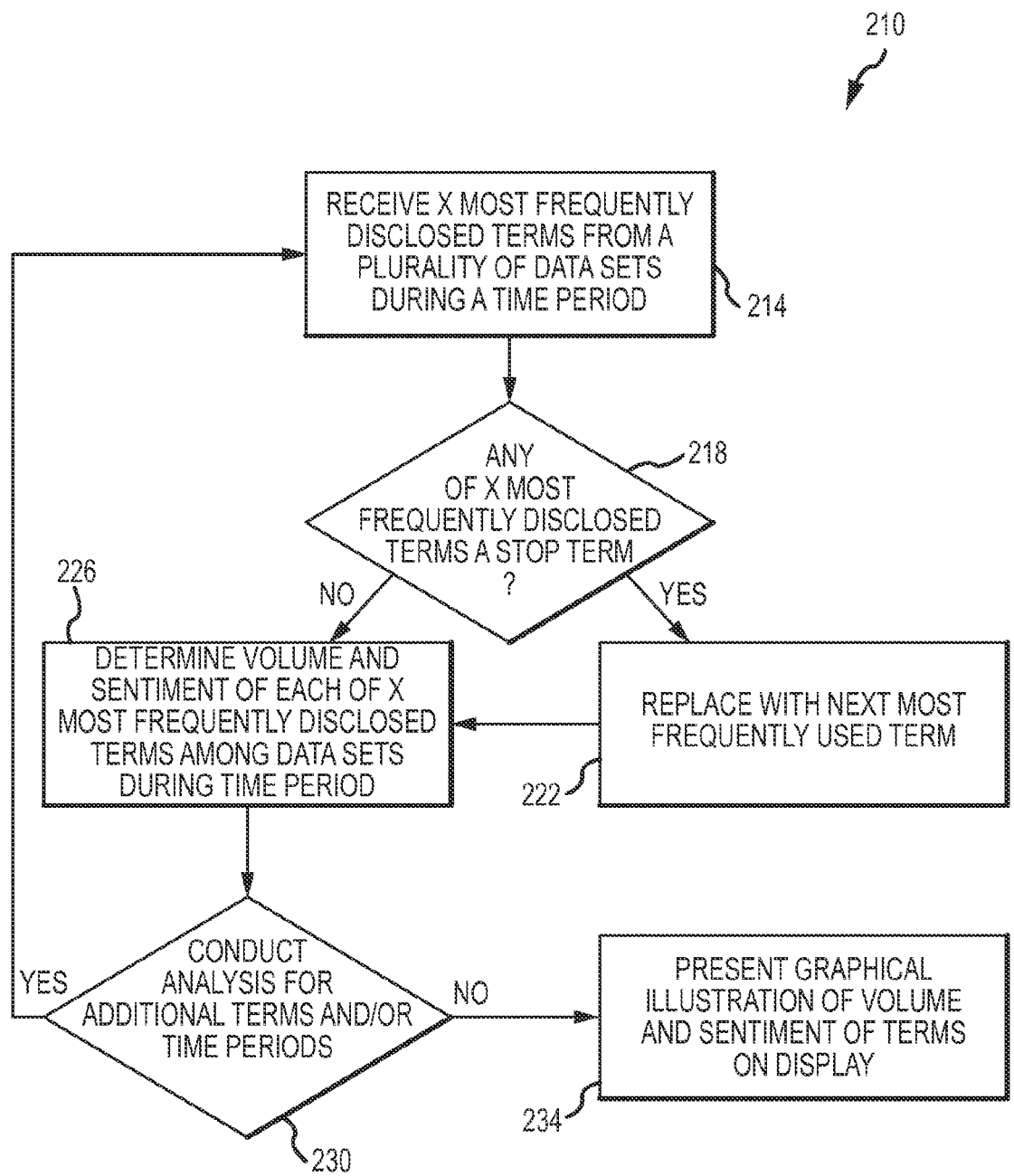
FIG. 19 illustrates a protocol or flow diagram for determining and presenting on a display a graphical illustration of a sentiment and volume of one or more terms of a website or other online data source over one or more time periods.

As shown in FIG. 19, a protocol 210 (e.g., one or more sets of computer readable instructions) is illustrated that is operable to determine a sentiment and volume of one or more terms of one or more data sets (e.g., objects 94) and then present or cause the presentation of a graphical illustration of the sentiments and volumes on a display. As discussed previously, each component of the sentiment analysis engine 166 may represent one of more steps or portions of protocol 210. The protocol 210 may begin at 214 by receiving the x most frequently disclosed terms from a plurality of data sets during a time period. As discussed previously, the data sets may be in the form of objects (e.g., objects 94) representing the source code of websites and/or other online data sources returned in response to a user's search query. The protocol 210 may then determine 218 whether any of the x most frequently disclosed terms is a "stop term". As used herein, a "stop term" (e.g., a, an, the) is a term that, when matched by one of the x most frequently disclosed terms, is automatically removed from further analysis and replaced with the next most frequently disclosed term that is not a stop term. Such stop terms may be automatically determined or set by the sentiment analysis engine (i.e., there may be default stop terms) and/or may be manually selected by a user (e.g., via dashboard on client device 22). Thus, a term may be replaced with the next most frequently disclosed term at 222 in response to a positive determination at 218.

Figure 35:
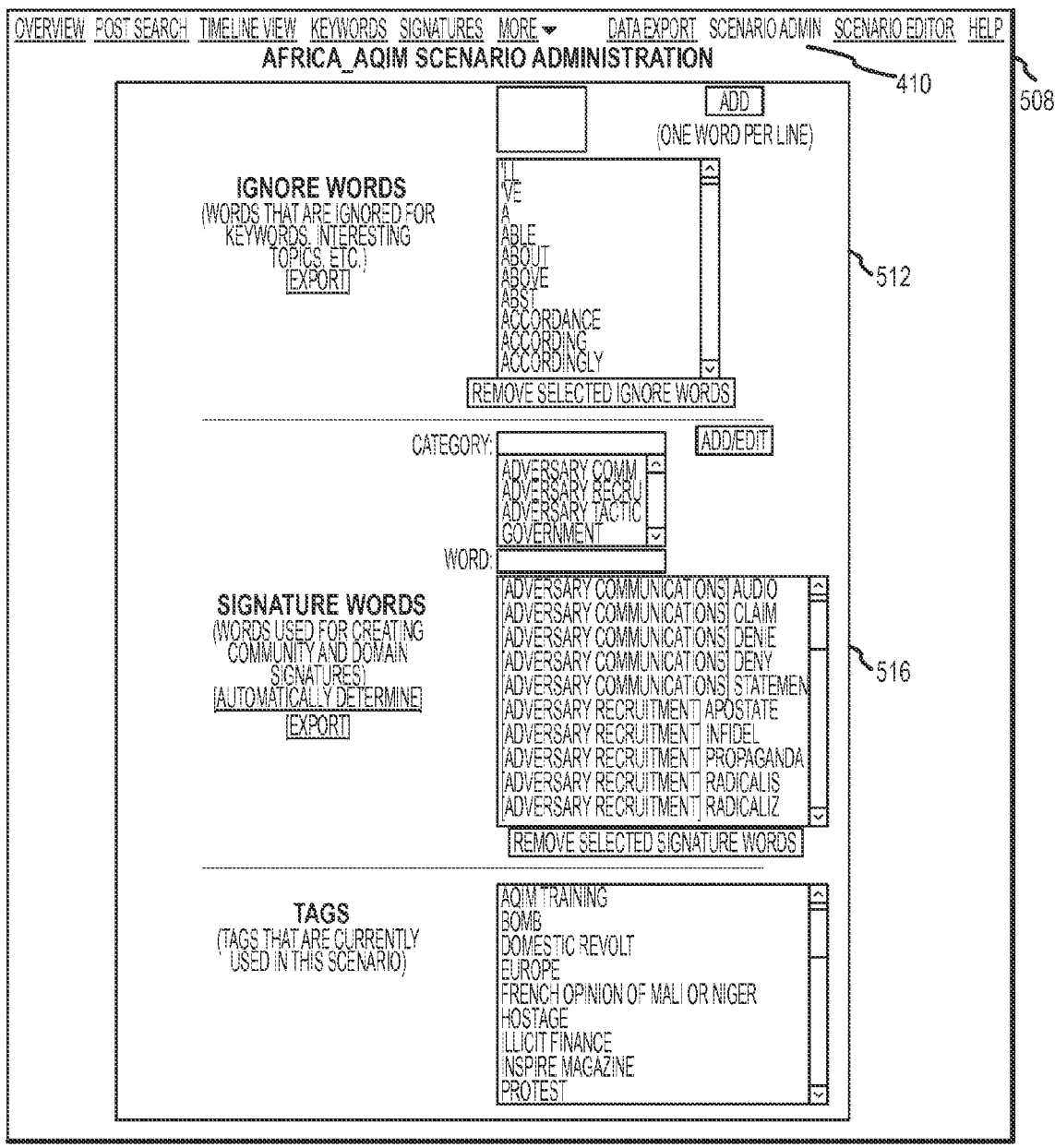
FIG. 35 illustrates another screenshot of the dashboard of FIG. 4.

Turning briefly to FIG. 35, another screenshot 508 of the dashboard 346 is illustrated after a "Scenario Admin" button 410 has been manipulated. In this screenshot 508, one portion 512 may allow a user to specify one or more of stop or ignore words that are to be ignored during processing at the WISDOM server 14 (e.g., during a sentiment analysis). In this regard, the scenario administrator 378 of the dashboard 346 would communicate with the sentiment analysis engine 166 to limit a sentiment analysis from being performed on a stop word specified in portion 512. Returning to FIG. 19, the protocol 210 may eventually proceed to 226 whereby the sentiment and volume of each of the x most frequently disclosed terms among the data sets during the time period is determined. In relation to determining the sentiment of a term among a number of data sets (e.g., objects 94) disclosing such term, numerous manners of such determination are envisioned. In one arrangement, it may first be determined, for each of the websites or online data sites (and/or their objects 94) disclosing the x most frequently disclosed terms, whether the data site (or its object) is a positive, negative or neutral data site. This may be accomplished (either at the post/article level or at the sentence level) by mining the object for positively charged words (e.g., esteemed, great, liked) and negatively charged words (e.g., hate, coup, overthrow), and then using the totals to determine whether the object (i.e., the website) is a positive, neutral or negative site. For instance, if the text of such an object contains 20 instances of "esteemed" but only 5 instances of "defunct," then the website may be afforded a "positive" label. It is also envisioned that some of the charged words or terms may be afforded more or less weight than others (e.g., the term "kill" may be afforded twice as much weight as the term "hate" in the positive/neutral/negative website determination process).

In any event, the step 226 of determining the sentiment of each of the x most frequently disclosed terms may include summing the number of positive data sites disclosing the term to obtain a count of positive data sites, summing the number of negative data sites disclosing the term to obtain a negative count of data sites, subtracting the count of negative data sites from the count of positive data sites to obtain a result, and using the result to obtain the sentiment of the term over a particular time increment (e.g., day) of a particular time period (e.g., week). In one arrangement, a negative result indicates a negative sentiment, a positive result indicates a positive sentiment, and a result of zero indicates a neutral sentiment. In another arrangement, a result of less than −2 indicates a negative sentiment, a result of greater than 2 indicates a positive sentiment, and a result of between −2 and 2 indicates a neutral sentiment. For example, if a term appears in 10 negative articles and in 4 positive articles, the overall sentiment may be negative. Other manners of determining term sentiments are also envisioned.

A similar procedure may be performed 230 for other terms and/or additional time increments of a time period (e.g., for additional days of a one week time period) for each of the terms. In relation to determining the volume of a term among the data sets during a time increment, the total number of data sites/articles/posts mentioning the term during the time increment is summed. In one arrangement, the frequency of the term in each data site/post/article may not be taken into account to limit the bias that may result from a length of the post/article. Any analytical data resulting from the various processing steps may be appropriately stored in data store 46.

Once the processing has completed for the various terms over the various time increments and/or periods, a graphical representation of the volumes and sentiments of the x most frequently disclosed terms may be presented 234 on a display of a client device 22. For instance, the dashboard 346 may include a sentiment module 362 (see FIG. 3) that is operable to obtain data from data store 46 of WISDOM server 14 related to term sentiments and volumes (as generated by the sentiment analysis engine 166) and present one or more corresponding graphical representations of such information on a display.

Figure 20:
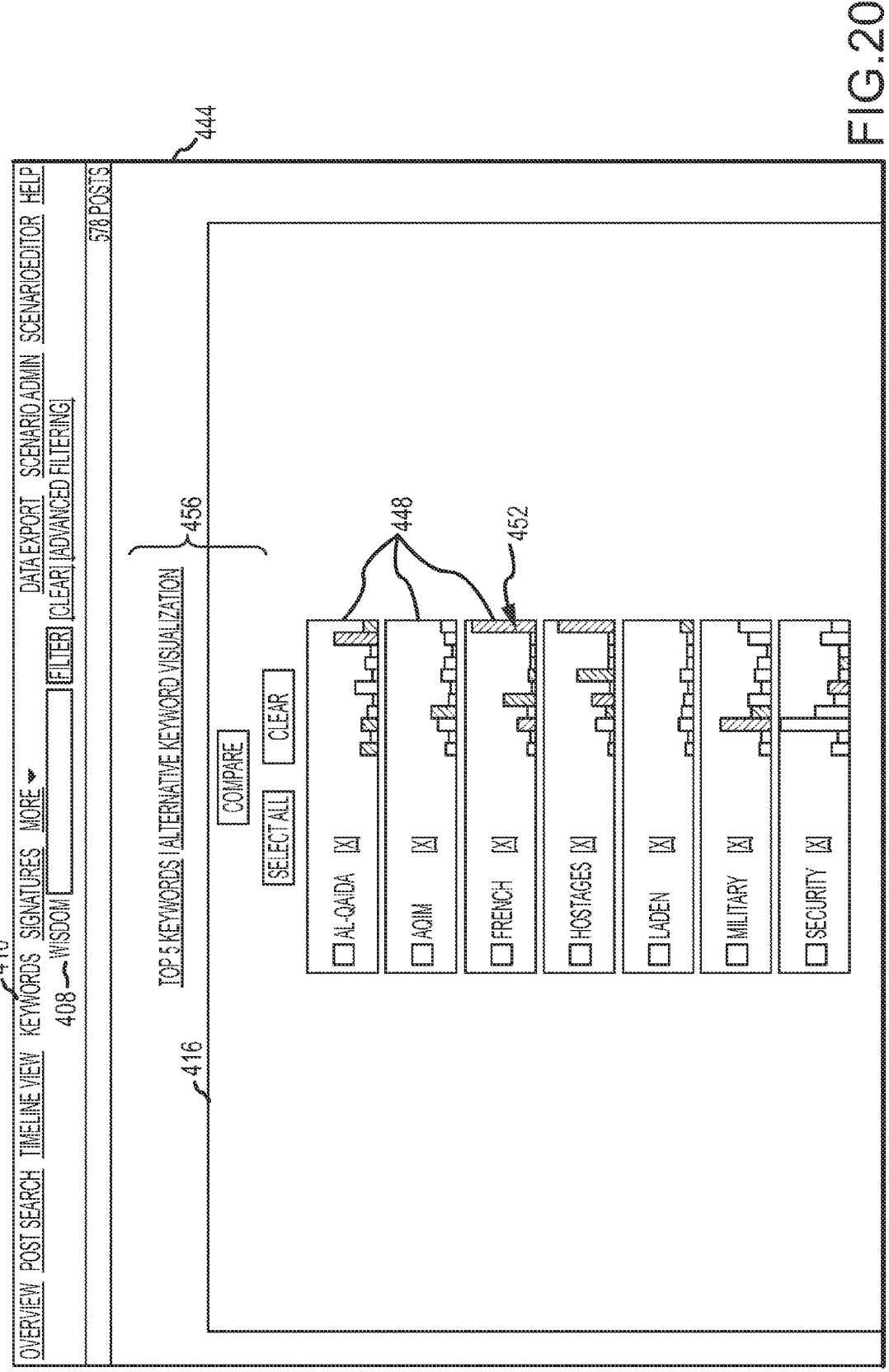
FIG. 20 illustrates another screenshot of the dashboard of FIG. 4.

Turning to FIG. 20, another screenshot 444 of the dashboard 346 may be presented to a user upon manipulation of a "Keywords" button 410 that conveys sentiment and volume information for one or more terms and/or phrases found in objects 94 of one or more scenarios or sub-scenarios. As shown, the presentation section 416 in this screenshot 444 may include a number of cells or portions 448, where each portion 448 may present a graphical representation (e.g., sparkchart) of sentiment/volume information for a particular term.

For instance, each portion 448 may include a series of lines or bars 452, where each bar 452 represents a particular day (e.g., an x-axis of the series represents days), a height of the bars (e.g., a y-axis of the series) represents relative volume, and a color of the bars (and/or other feature of the bars such as surface texturing, shape, etc.) represents sentiment. In one arrangement, a green color of a bar 452 may indicate a positive sentiment for the particular term for the particular day, a red color of a bar 452 may indicate a negative sentiment for the particular term for the particular day, and a gray color of a bar 452 may indicate a neutral sentiment for the particular term for the particular day. Of course, numerous other arrangements are envisioned for presenting the sentiment and/or volume of a particular term to a user.

This screenshot 444 may also include a number of buttons 456 or other user manipulable features that allow a user to modify and/or analyze the terms in the portions 448 shown in the presentation area 416. For instance, a user may be able to initially select a desired group of terms in any appropriate manner (e.g., by clicking or selecting a checkbox (not labeled) in the portion 448 of a particular term). Thereafter, and upon selecting a "Compare" button 456, the sentiment module 362 may function to automatically filter the portions 448 illustrated in the presentation area 416 such that only the selected terms may be presented for comparison of their respective sentiments and volumes.

As another example, a user may be able to select a "Top 5 Keywords" button 456 such that portions 448 corresponding to the top five most frequently disclosed terms among the posts/articles/data sites returned matching a particular scenario are shown in the presentation area 416. As discussed previously, this feature limits the need for a user to manually review the search results for terms on which to perform sentiment and volume analyses. Furthermore, a user may be more interested in reviewing sentiment/volume analyses for terms that are more frequently disclosed than other terms as the mere fact that the term is frequently disclosed may indicate a greater relative importance of the term in relation to other terms.

As discussed previously, a user may specify one or more "stop words" that may not be taken into account during a sentiment analysis (see previous discussion in relation to FIG. 35). As also discussed previously, updating/revising a scenario (e.g., via changing one or more scenario parameters) and/or updating/revising filtering parameters (e.g., via post query administrator 354) may cause the various graphical representations in the portions 448 to automatically adjust/change as necessary to reflect a current sentiment/volume of the terms. In one arrangement, and although not shown, one or more graphical representations/sparkcharts providing sentiment/volume analysis for one or more terms may be presented (e.g., discretely) on a website of one of the returned search results (e.g., upon a user clicking or selecting a link to a website in the screenshot 404 of FIG. 14).

Figure 21:
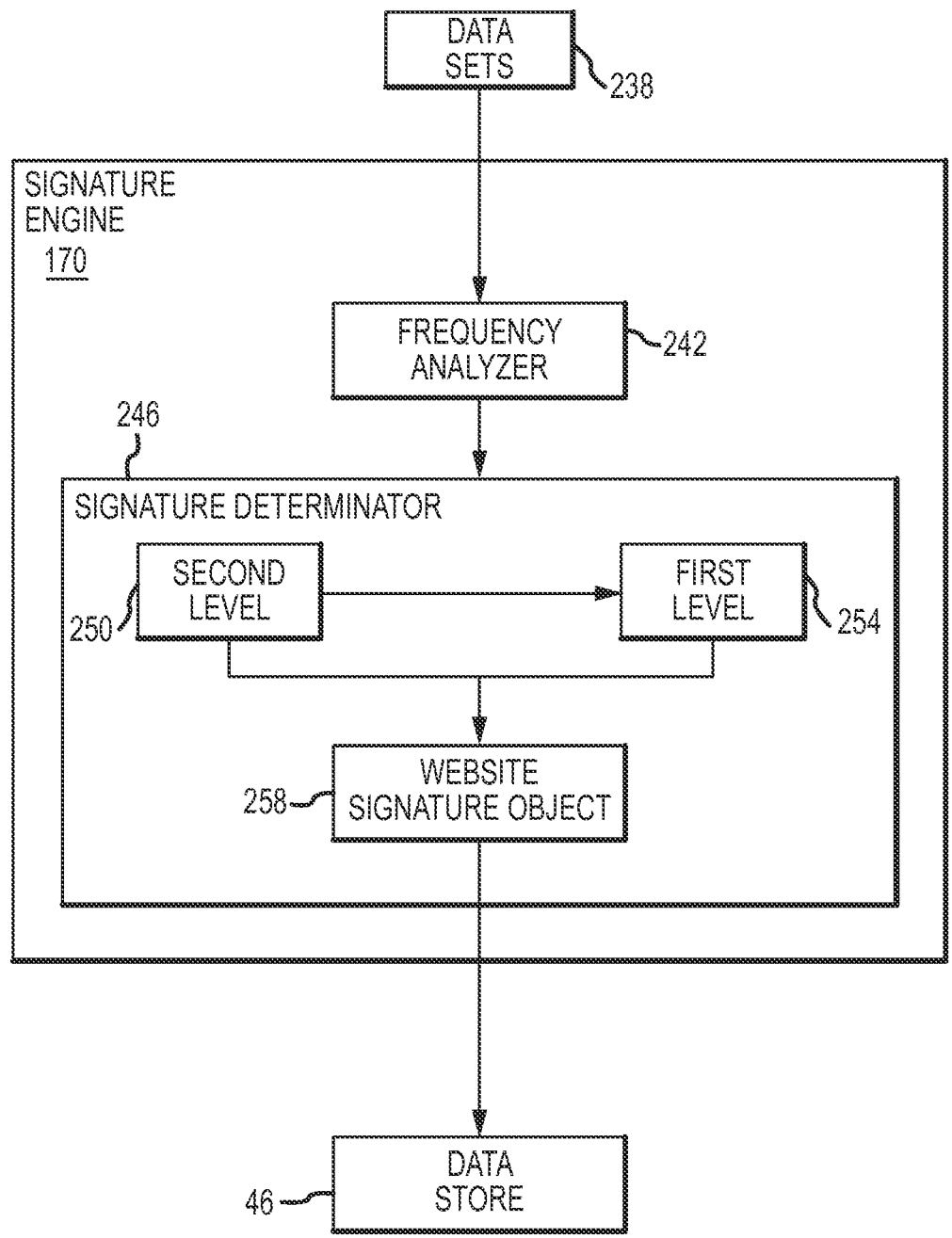
FIG. 21 illustrates a functional block diagram of a hierarchical signature engine of the toolbox of FIG. 17.

With reference now to FIGS. 17 and 21, another of the tools of the toolbox 62 of the backend processing engine 50 may be a signature engine 170 that is broadly operable to create one or more "hierarchical signatures" for a web or online data site for allowing a user to, for instance, discern the ebb and flow of topics over any appropriate time period on individual websites as well as on automatically clustered sites having similar signatures. More specifically, a "signature" of a website or other online data source may be obtained by determining a frequency or prevalence of particular terms or phrases on one or more pages of the website over a time period, and then appropriately presented on a display for visualization by a user. For instance, a frequency of each of the terms "countertenor," "government," "military," and "president" on each of a number of websites (e.g., those websites obtained from search services 18 by backend processing engine 50 that correspond to a particular defined scenario) may be determined, the results may be normalized to "high," "medium" and "low," and then such normalized results may be presented for a user on a display in the form of a color coded chart for one or more of such websites (e.g., where darker colors represent higher frequency and lighter colors represent lower frequency). This utility may allow such signatures to be leveraged to track discussions, infer textual linkages among websites, discover communities of interest according to topic saliency, and the like.

As shown in FIG. 21, the signature engine 170 may include a frequency analyzer 242 that is operable to receive one or more data sets 238 (e.g., objects 94 obtained from data store 46) and determine a frequency or prevalence of each of a number of particular terms or phrases from the data sets 238. For instance, the frequency analyzer 242 may determine the prevalence of one or more terms of at least one textual hierarchy that includes at least first and second level terms, where each first level term is a textual category and each second level term is a term encompassed by at least one first level textual category. A signature determinator 246 may then perform second level hierarchical signature processing 250 and first level hierarchical signature processing 254 to obtain a hierarchical signature object 258 for a particular web or online data site that is essentially represented by the particular prevalence of a number of specific terms in object representing the particular web or online data site. The web site signature object 258 may be passed to data store 46 and retrieved by a dashboard of a user's client device 22 which may operate to present a representative graphical illustration of the signature (s) on the user's display.

Figure 22:
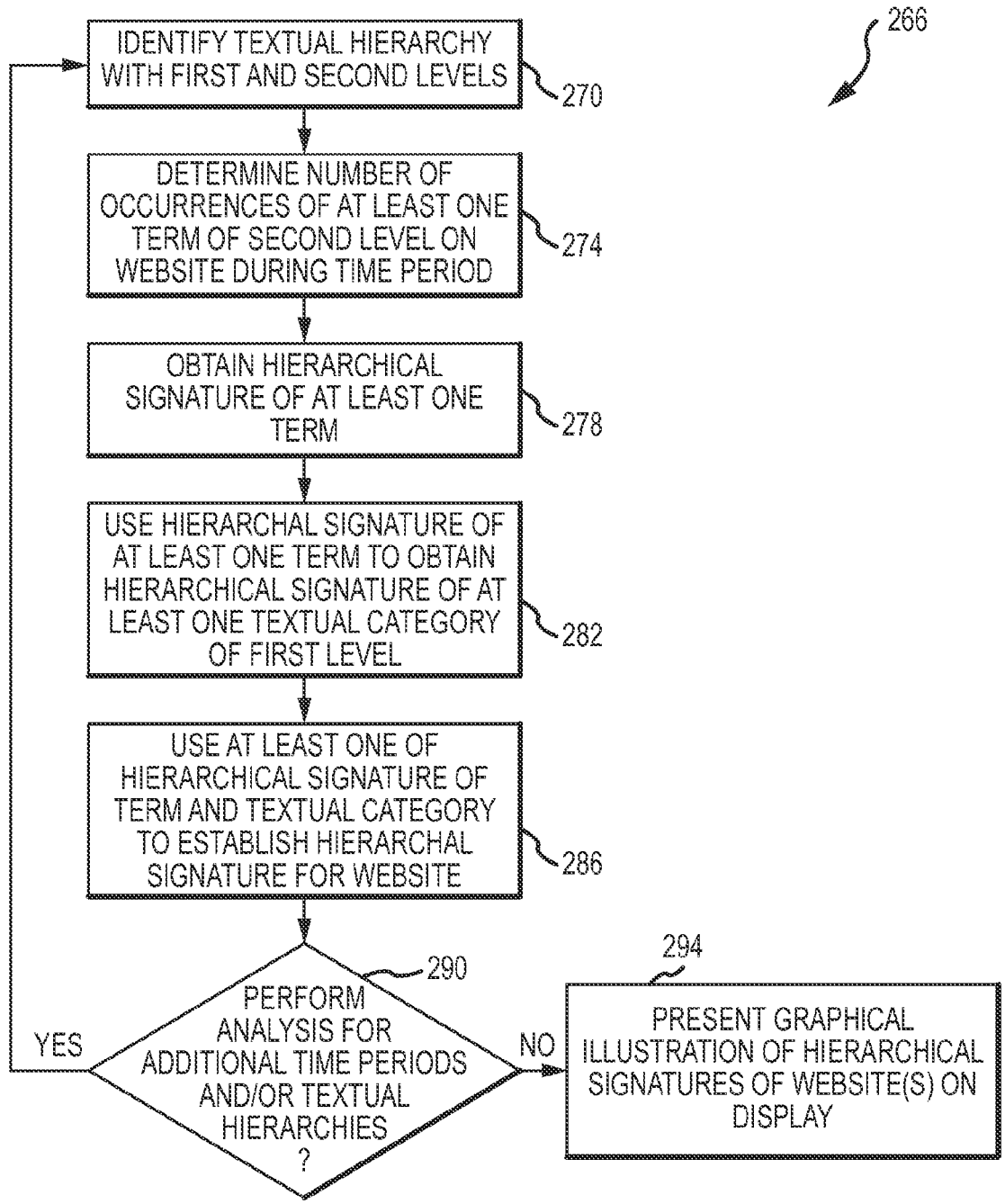
FIG. 22 illustrates a protocol or flow diagram for establishing a hierarchical signature for a website or online data source over one or more time periods and then presenting a graphical representation of the hierarchical signature on a display.

As shown in FIG. 22, a protocol 266 (e.g., one or more sets of computer readable instructions) is illustrated that is operable to determine a hierarchical signature of one or more websites and/or communities of websites and then present a graphical representation of such hierarchical signature on a display. As discussed previously, the various components of the signature engine 170 may represent one of more steps or portions of protocol 266. The protocol 266 may begin by identifying 270 at least one textual hierarchy having first and second levels. In one arrangement, a user may be presented with a number of predefined textual hierarchies that may be selected (e.g., manually) by the user via the dashboard 346 (e.g., see portion 516 in screenshot 508 of FIG. 35) and/or may define additional textual hierarchies. For instance, a first textual hierarchy could include an upper or first level term of "Government" and corresponding lower or second level terms of "Congress," "Senate," "President," and "Constitution" while a second textual hierarchy could include a first level term of "Sports" and corresponding second level terms of "football," "soccer," "basketball," and "tennis".

Additionally or as an alternative to the manual selection of one or more textual hierarchies as discussed above, the back-end processing engine 50 may automatically identify 270 one or more textual hierarchies. In one embodiment, the signature engine 170 may select terms for such textural hierarchies based at least in part on the scenario parameters used by a user to define a particular scenario. Advantageously, doing so may present a user with hierarchical signatures that may be of greater interest or importance to the user by virtue of at least some of the terms making up such hierarchical signatures being the same as those used to define the particular scenario (as compared to the textual hierarchies made up of randomly selected terms and/or terms merely having higher disclosure frequencies in website objects than other terms).

Figure 23:
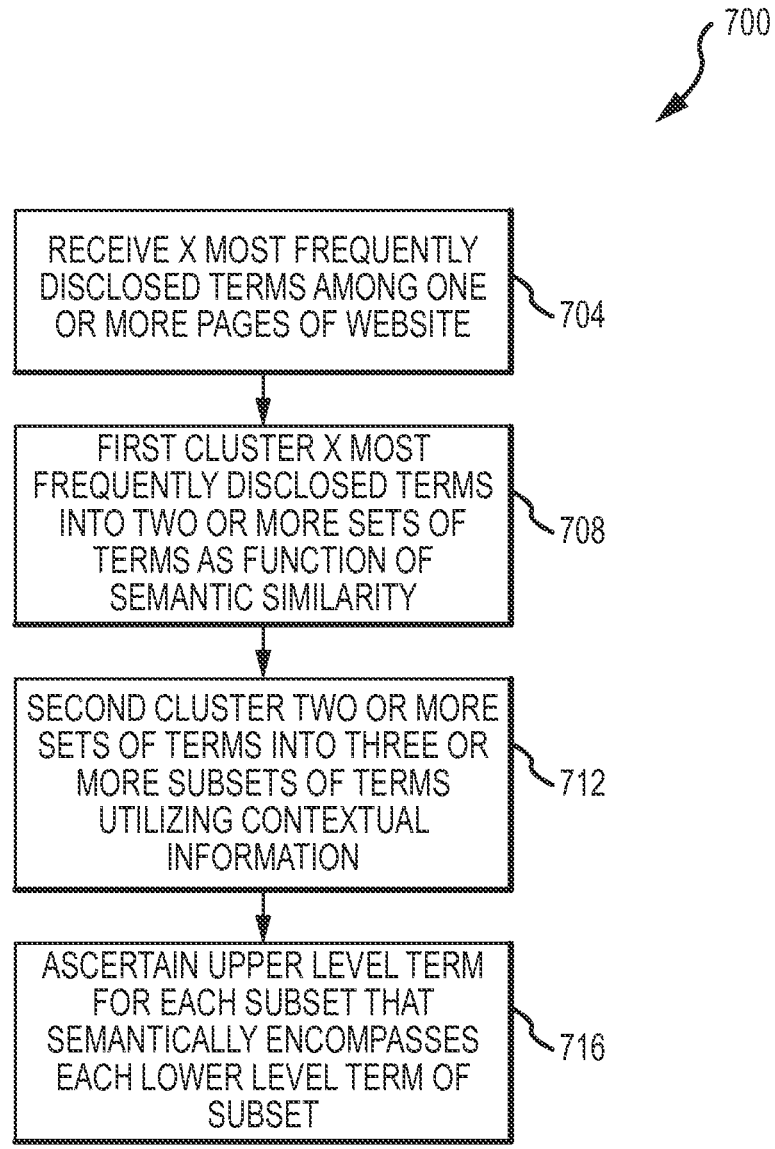
FIG. 23 illustrates a protocol or flow diagram for automatically identifying one or more textual hierarchies that may be used to establish hierarchical signatures for websites.

As another example of the automatic selection of one or more textual hierarchies, the signature engine 170 may choose the second level terms with which to generate one or more hierarchical signatures based at least in part on the automatic clustering (i.e., grouping) of terms or phrases (i.e., second-level terms, e.g., by utilizing any appropriate similarity functions or procedures) and then the appropriate selection of a first/top-level category for each of the clusters in any appropriate manner. Turning now to FIG. 23, protocol 700 illustrates one manner in which one or more textual hierarchies may be automatically identified. The protocol 700 may receive 704 the x most frequently disclosed terms or phrases (where x is an integer) among one or more pages of a website (e.g., the corresponding objects obtained from step 134 of FIG. 12 or step 648 of FIG. 14) in any appropriate manner. For instance, any manner of keyword extraction and ranking can be used such as term frequency-inverse document frequency.

Once the x most frequently disclosed terms or phrases have been received, the protocol 700 may first cluster 708 such terms into two or more sets of terms as a function of similarity in any appropriate manner. That is, the first clustering 708 may entail grouping terms into two or more sets where the terms of a particular set could conceivably have common or at least similar meanings, connotations, and/or the like. In one arrangement, agglomerative clustering (e.g., bottom-up hierarchical clustering) may be used where at least one distance dimension is the semantic similarity of two terms, and where the semantic similarity may be computed using stemming and/or a thesaurus. Distances may be determined in any appropriate manner such as by computing Euclidean distances, Squared Euclidean distances, Power distances, and/or the like. For instance, terms such as "caravan," "train," "convoy," and "procession" could be clustered into a set.

The protocol 700 may then second cluster 712 the two or more sets of terms into two or more subsets of terms utilizing contextual information (i.e., terms adjacent each term of the two or more sets in the one or more pages of the website). For instance, the contextual information for each term may include a particular window of terms (e.g., 5, 10, etc.) around the term (i.e., to the left and right of the term) where the term is found in the one or more pages of the website. Terms that may be interpreted as carrying little substantive meaning (e.g., "a," "an," "the," etc.) may not be included as part of the window of contextual information for the terms. In one arrangement, the second clustering 712 may use a first distance dimension that accounts for the similarity of the contextual information (i.e., to the term under consideration) and a second distance dimension that accounts for the relative specificity of the contextual information. For instance, the similarity of contextual information may be determined using a bag-of-words model and/or Dice's coefficient and the specificity of the contextual information may be determined using a general-purpose ontology. Continuing with the above example, the second clustering 712 could entail removing the term "train" from the above first clustered set and clustering this term with other terms if the contextual information for the term "train" included terms such as "marathon," "jogging" and "fitness." While not specifically described, additional rounds of clustering may be performed on the subsets to further refine the groups of terms.

In any case, the protocol 700 may include ascertaining 716 a first or upper level term for each subset that encompasses (e.g., semantically encompasses) the terms of the subset (e.g., where the terms of the subsets may be referred to as second or lower level terms). In one arrangement, the ascertaining 716 may entail finding a deepest common root in any appropriate general purpose ontology that includes the lower level terms of the subset. In the above example, the lower-level terms of "caravan," "convoy" and "procession" (assuming the term "train" was removed from this subset after the second clustering 712) may be associated with an upper-level term or phrase such as "motorcades" or "traveling groups." In another arrangement, the centroid term of the subset of lower-level terms may be utilized as the upper-level term for the subset, where the centroid is the keyword that is in the center of the subset and may be found by computing the distance as a harmonic mean of the previously discussed distance dimensions or functions in relation to the first and second clustering steps 708, 712. However, the particular upper-level term need not necessarily be present in the subset under consideration. Furthermore, while first/upper and second/lower level terms have been discussed, other embodiments envision adding additional levels to the textual hierarchy (e.g., by way of appropriately clustering the upper level terms, and so on).

In any event, and returning to FIG. 22, the protocol 266 may proceed to determine 274 a number of occurrences of each of the second/lower level terms of the at least one textual hierarchy in an object 94 corresponding to a particular returned post or website of a defined scenario for a particular time period (e.g., for a day of a 3 week time period), and then obtain (utilizing the determined number of occurrences of each second level term) a hierarchical signature of each of the second level terms representing a prevalence of each term on the particular website during the time period. In one arrangement, the hierarchical signature of each second level term may be obtained by dividing the number of occurrences of the term by the number of pages of the particular website on which the term is found to obtain the hierarchical signature for the at least one term for the particular website. For instance, if the second level term "computer" was found 100 times across 25 pages of a website on a particular day, then the hierarchical signature for "computer" for the day would be four. Furthermore, some second level words or terms of the textual hierarchies may be weighted more than other second level terms when merely a single use of such term could be highly representative of the content of the website/blog posting as a whole.

Once the second level signatures have been obtained at 278, the protocol 266 may then utilize the second level hierarchical signatures to obtain 282 a first/upper level hierarchical signature of the at least one textual hierarchy that encompasses the various corresponding second level terms. In the case where a first level textual category encompasses just a single second level term, the hierarchical signature of the first level textual category would be that of the second level term. In the case where the first level textual category encompasses a plurality of corresponding second level terms, the hierarchical signature of the second level textual category may be obtained by, for instance, averaging the hierarchical signatures of the plurality of second level terms (and/or performing other types of statistical analyses).

Once the first and second level hierarchical signatures have been determined, then one or both of such signatures may be utilized 286 to establish a hierarchical signature for the particular website. In one arrangement, the first and second level hierarchical signatures may be obtained for the particular website using a plurality of textual hierarchies. In this regard, the hierarchical signature for the website may be the combination of the first and second level hierarchical signatures for the plurality of textual hierarchies. In any event, if it is determined at 290 that additional analyses for additional time periods and/or textual hierarchies are required, the protocol may flow back to 270 to identify one or more textual hierarchies. Any analytical data resulting from the various processing steps may be appropriately stored in data store 46. Of course, a similar analysis may be performed for additional posts or websites.

In another arrangement, any appropriate algorithm for or manner of discovering at least one website community may be used to obtain at least one website community from a plurality of websites, and then the hierarchical signatures of the websites making up the website community may be utilized (i.e., they may be averaged or otherwise "rolled up") to obtain a hierarchical signature for the website community.

Figure 24:
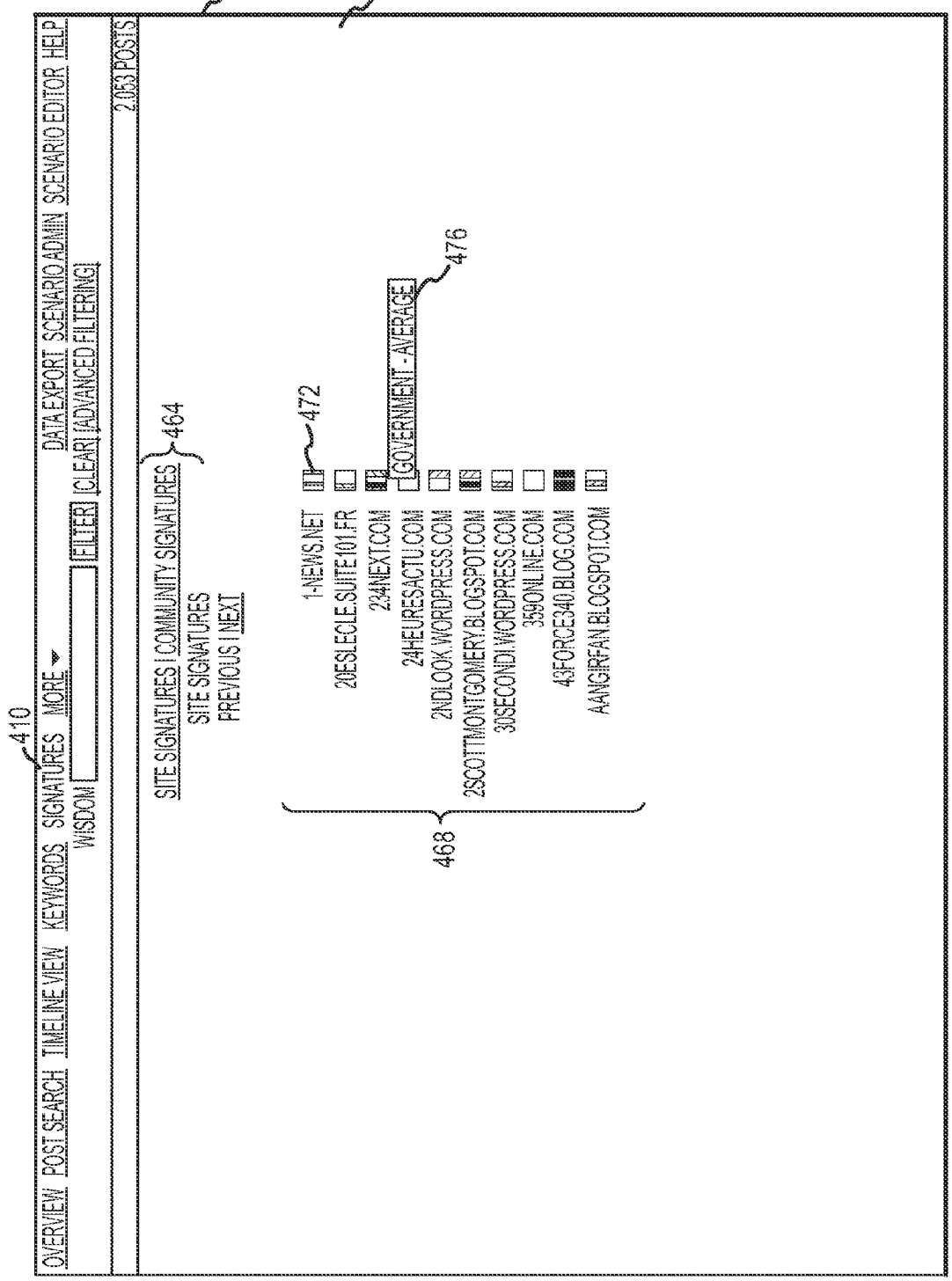
FIG. 24 illustrates another screenshot of the dashboard of FIG. 4.

In any event, one or more graphical representations of various hierarchical signatures may subsequently be presented 294 on a display for visualization by a user. Turning now to FIG. 24, another screenshot 460 of the dashboard 346 may be presented to a user upon manipulation of a "Signatures" button 410 that illustrates such graphical representations. Here, a signature module 366 of the dashboard 346 (see FIG. 3) may function to retrieve hierarchical signature data for one or more web or data sites from data store 46 of WISDOM server 14 (as generated by signature engine 170 of WISDOM server 14) and present a graphical representation of such one or more hierarchical signatures on a user's display. The websites for which a hierarchical signature is determined may be either those websites matching a particular scenario (e.g., as coordinated by scenario generator 350, query manager 56, etc) and/or a particular sub-scenario (e.g., as coordinated by post query administrator 354). In some arrangements, the signature module 366 may automatically determine those signatures to be displayed in the presentation area 416 in any appropriate manner (e.g., by date, relevancy, etc.). In other arrangements, a user may manually select the particular hierarchical signatures to be displayed.

In any event, the presentation area 416 may include a number of portions 468, where each portion 468 may present a graphical representation (e.g., sparkchart) of a hierarchical signature for a particular web or data site. For instance, each portion 468 may include a series of lines or bars 472, where each bar 472 represents a first level textual category of a textual hierarchy. A user may select particular textual categories and corresponding terms to be used for determining hierarchical signatures in portion 516 of screenshot 508 in FIG. 35.

Each bar 472 may be appropriately textured, colored, and/or the like to indicate a relative prevalence of a particular first level textual category on a particular website. In some arrangements, one or more of the hierarchical signatures may be normalized (e.g., by the signature engine 170 and/or signature module 366) to allow, for instance, the intensity of a particular hierarchical signature to be represented as "high," "medium," "low," etc. instead of or in addition to a numerical representation. For example, in the context of a first level textual hierarchy encompassing a plurality of second level terms, the normalizing may include ascertaining a mean and standard deviation of the hierarchical signatures of the second level terms, subtracting the mean from each of the second level term hierarchical signatures, and dividing each of the values resulting from the subtracting by the standard deviation to obtain z-scores for each of the first and second term hierarchical signatures. In this case, the graphical representations of the second level term hierarchical signatures would respectively correspond to the z-scores of the second level term hierarchical signatures. In one arrangement, a first color (e.g., a darker color) of the graphical representation could represent a first prevalence of the at least one term and/or at least one textual category on the at least one website and a second color (e.g., lighter color) of the graphical representation could represent a second prevalence of the at least one term and/or at least one textual category on the at least one website, where the first prevalence is higher than the second prevalence. A similar procedure may be performed for the first level textual category hierarchical signatures.

For instance, a darker color (e.g., blue) of a bar may indicate a higher prevalence of the first level textual category on the website while a lighter color (e.g., white, gray) may indicate a lower prevalence of the first level textual category on the website. In one arrangement, moving a user manipulable device (e.g., cursor, finger) over a particular bar 472 causes the presentation of a pop-up box or tooltip 476 having a visual indication as to the normalized prevalence of the particular first level textual category (e.g., "government-average").

As shown, this screenshot 460 may include a number of buttons 464 or other user manipulable features that, when manipulated, allow a user to toggle between site signatures and community signatures. As discussed previously, a signature of any appropriately defined or determined "website community" may be determined by "rolling up" the signatures of the individual websites making up the community.

Figure 25:
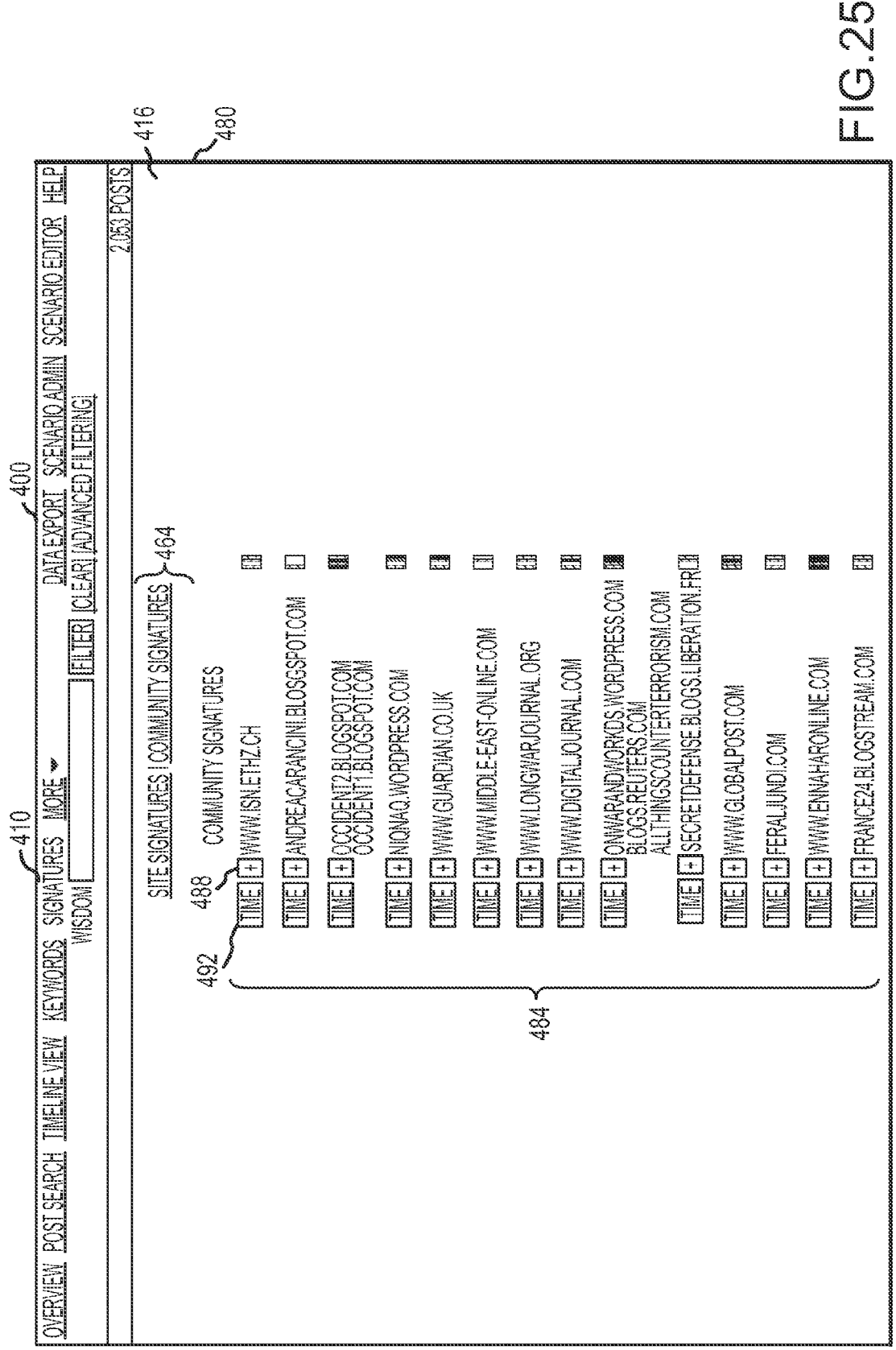
FIG. 25 illustrates another screenshot of the dashboard of FIG. 4.

Turning now to FIG. 25, another screenshot 480 of the dashboard 400 is shown upon the "community signatures" button 464 being manipulated. In this screenshot 480, the presentation section 416 may include a number of portions 484, where each portion 484 may present a graphical representation (e.g., sparkchart) of a hierarchical signature for a particular community. Each portion 484 may include an expand button 488 that, when manipulated, may cause the display of the various websites making up the particular community. Additionally, each portion 484 may include a "time" button 492 or other type of user manipulable feature that, when manipulated, may cause the display of a pop-up window or other type of view that illustrates hierarchical signatures for a community for each of a number of time increments of a time period (e.g., for each day of a 4 month time period).

Figure 26:
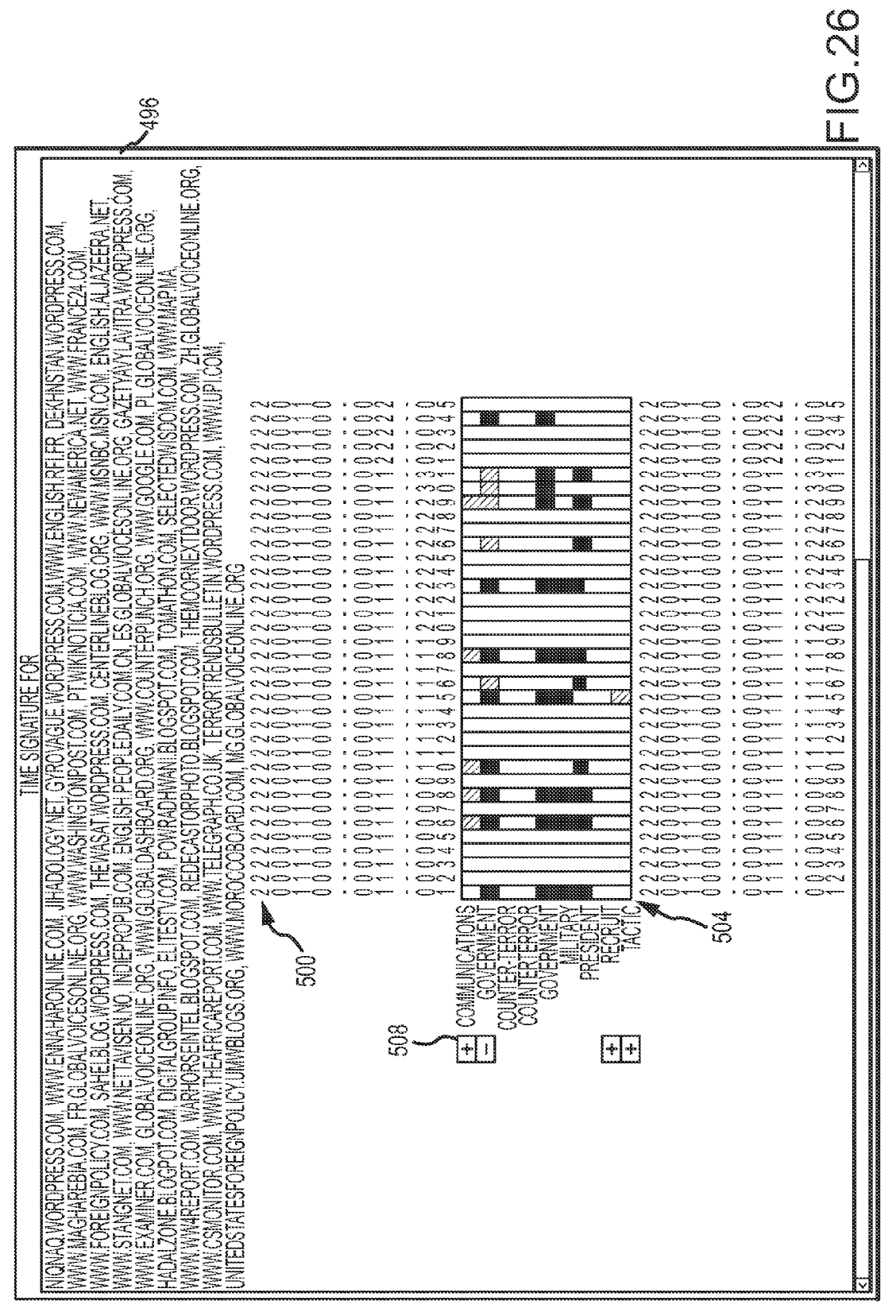

With respect to FIG. 26, a pop-up window 496 may present a "time signature" for a community on a user's display upon manipulation of a time button 492 corresponding to the particular community. The pop-up window 496 may include a plurality of portions 500, where each portion 500 represents a hierarchical signature for the community for a particular time increment (as shown, for a particular day). Each portion 500 may include a number of lines or bars 504, where each bar 504 represents a first level textual category of a textual hierarchy, and where a color of each bar represents a particular prevalence of the first level textual category in the community (similar to those shown in FIGS. 24-25). Furthermore, each of the first level textual categories may be associated with an expand button 508 that, when manipulated, causes the display of a number of lines or bars 504 representing the prevalence of each of the second level terms of the particular first level textual category. Although not shown, time and expand buttons may also be provided for site signatures (e.g., in screenshot 460 of FIG. 24).

With reference again to FIG. 17, another of the tools of the toolbox 62 of the backend processing engine 50 may be an information flow network extraction engine 174 that is broadly operable to infer one or more online information flow networks among a plurality of online data sources (e.g., individual blog or forum entries on website, news articles, webpages and/or other posts, which may be those obtained by backend processing engine 50 that correspond to a particular scenario) which may then be presented in the form of a graphical representation on a user's display for visualization by the user. Such graphical representations may illustrate information flows from "primary" data sites or sources (e.g., authors, news articles, etc.) to "secondary" data sites or sources over time. Over time, a more robust picture of each person, actor, author, news article, and the like discussing a topic may be built to better identify differences between insignificant/spurious relationships and more significant relationships across various demographics, cultures, and the like. Advantageously, companies and other brand management functions can readily observe who is saying what about their products, services, and the like. Furthermore, analysts can observe and understand the significance of relationships between authors, articles, and the like from what is often noisy and complicated open source data.

Figure 27:
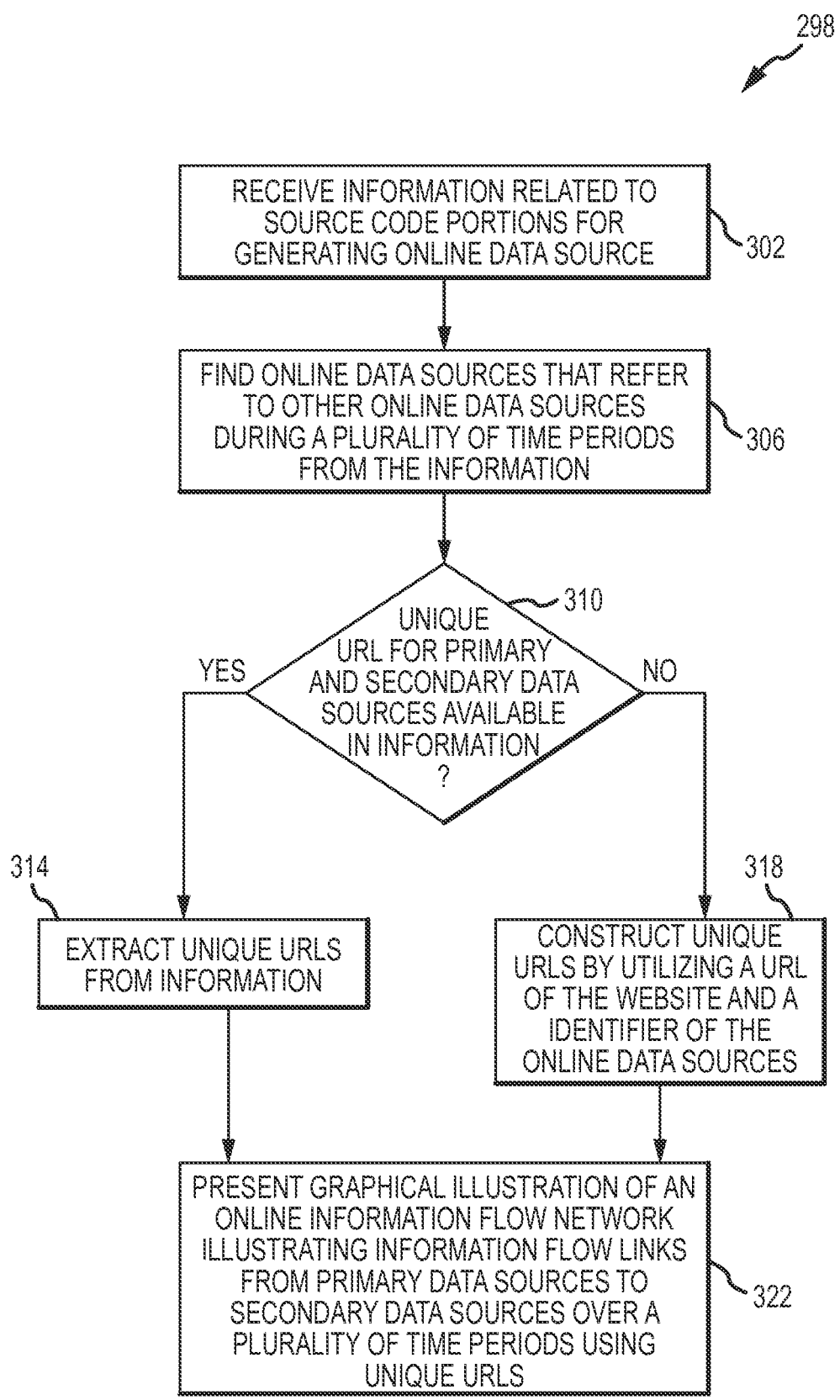
FIG. 27 illustrates a protocol or flow diagram for inferring or extracting an online information flow network from a plurality of online data sources and then presenting a graphical illustration of the network on a display that illustrates information flows between a number of posts and/or authors.

As shown in FIG. 27, a protocol 298 (e.g., one or more sets of computer readable instructions) is illustrated that is operable to infer or extract an online information flow network from a number of online data sources. For purposes of this discussion, an "online data source" may be a news article, one or more individual blog or forum entries or postings, and the like. An online data source may be found on a website, one or more webpages of a website, and the like.

In the case of, for instance, a news article found on one or more pages of a website, the news article may be associated with a unique URL that allows a user, process, module, etc. to locate the article over any appropriate network (e.g., the Internet). Such news articles and other online data sources may refer to other online data sources via hyperlinks (e.g., inlinks) within the source code of the online data sources (where the referred to online data source may be a "primary" data source and the referring online data source may be a "secondary" data source). Unique URLs for primary and secondary data sources may be found, for instance, in "information" related to source code used to generate the news article or online data source on the webpage (e.g., an object 94 related to the source code, the original source code for the webpage, etc.).

Some online data sources may not be associated with unique URLs that specifically identify the online data sources. For instance, in the case of an individual blog or forum entry, there may not be a unique URL available to link directly to the individual entry or posting; rather, there may only be a unique URL available for the website or webpage as whole where a number of entries or postings are found (where a number of entries may be related by a common topic or subject). In the latter case, each entry or posting may be associated with any appropriate identifier used by the webmaster of the website to differentiate between the various postings. However, such identifiers may not uniquely identify an individual entry or posting in relation to other online data sources. In this regard, and as will be discussed in more detail below, the protocol 298 may be able to construct or obtain a construction of a unique URL for each individual posting or entry based on a combination of the URL of the website where the entry is found plus additional information (e.g., the identifier of the entry, the topic within which the entry is found, etc.).

The protocol 298 may begin by receiving 302 "information" related to source code portions used to generate online data sources. For instance, such information may be objects (e.g., objects 94) for a number of online data sources generated in response to the query manager 56 processing a particular scenario. As discussed previously, the content extraction module 70 may function to generate objects from the source code of webpages returned by the query manager 56 that include content of interest such as the substantive text of a news article or blog entry, any links within such substantive text to other online data sources, and the like (instead of advertisements and related links, navigation sections, etc.).

Once the information has been received 302, the protocol 298 may then determine 306 whether any of the received online data sources refer to other online data sources during a plurality of time periods from the received information. In the case of an article or other posting on one or more pages of a website, this may entail scanning the information (e.g., the object 94) for any links (e.g., URLs) within the substantive content of the article or posting to other online data sources. In the case of a blog or forum entry, this may entail determining whether the entry was posted in response to or off of a previous entry. In any case, the protocol may then determine 310 whether unique URLs that identify both the secondary data source (i.e., the referring data source) and the primary data source (i.e., the referred to data source) are available in the information, and then extract 314 the unique URLs from the information in response to a positive determination at 310.

If unique URLs for the primary and second data sources are not (directly) available from the information, then the protocol may proceed to construct 318 (or obtain a construction of) unique URLs for the primary and/or secondary data sources. For instance, in the case of a blog entry, a unique URL may be constructed for use by the online information flow network engine 174 (e.g., the protocol 298) in building online information flow networks by way of combining a URL of the website or webpage where the blog entry is found with another piece of information (e.g., an identifier of the particular blog entry, the topic within which the blog entry was found on the website, etc.) in any appropriate manner. The above process of extracting or constructing unique URLs for a number of online data sources may be performed during each time increment of any desired time period(s) (e.g., for each day of a two week time period). Any analytical data resulting from the various processing steps may be appropriately stored in data store 46.

Once an initial set of relationships have been determined, other existing public data sources may be appropriately leveraged to add confidence to the existing discovered relationships (as well as possibly identify new ones). For example, online information flow extraction engine 174 may search a blog for all posts and comments made between an author and specific actors that were previously discovered. Depending on the volume and type of other relationships discovered, a certain level of confidence could be added to the original set of relationships. An individual, community or demographic tolerance can be provided or calculated on-the-fly to determine how much support is sufficient to label a relationship as "significant". In one example, one particular online actor may be found who comments on a significant number of other actors blogs. For this particular online actor, it may be more appropriate to analyze the text that appears in his or her comments (as opposed to just the inlinks) to determine which relationships are most important. As an additional example, the frequency of postings may be significant where two actors that are somehow related tend to respond to each other very quickly.

In any case, a graphical representation of an online information flow network over a plurality of time periods that illustrates information flow links from primary data sources to secondary data sources may be presented 322 on a user's display using the extracted and/or constructed unique URLs to allow analysts and other users to observe and understand the significance of relationships between authors, articles, and the like from what is often noisy and complicated open source data.

Figure 28:
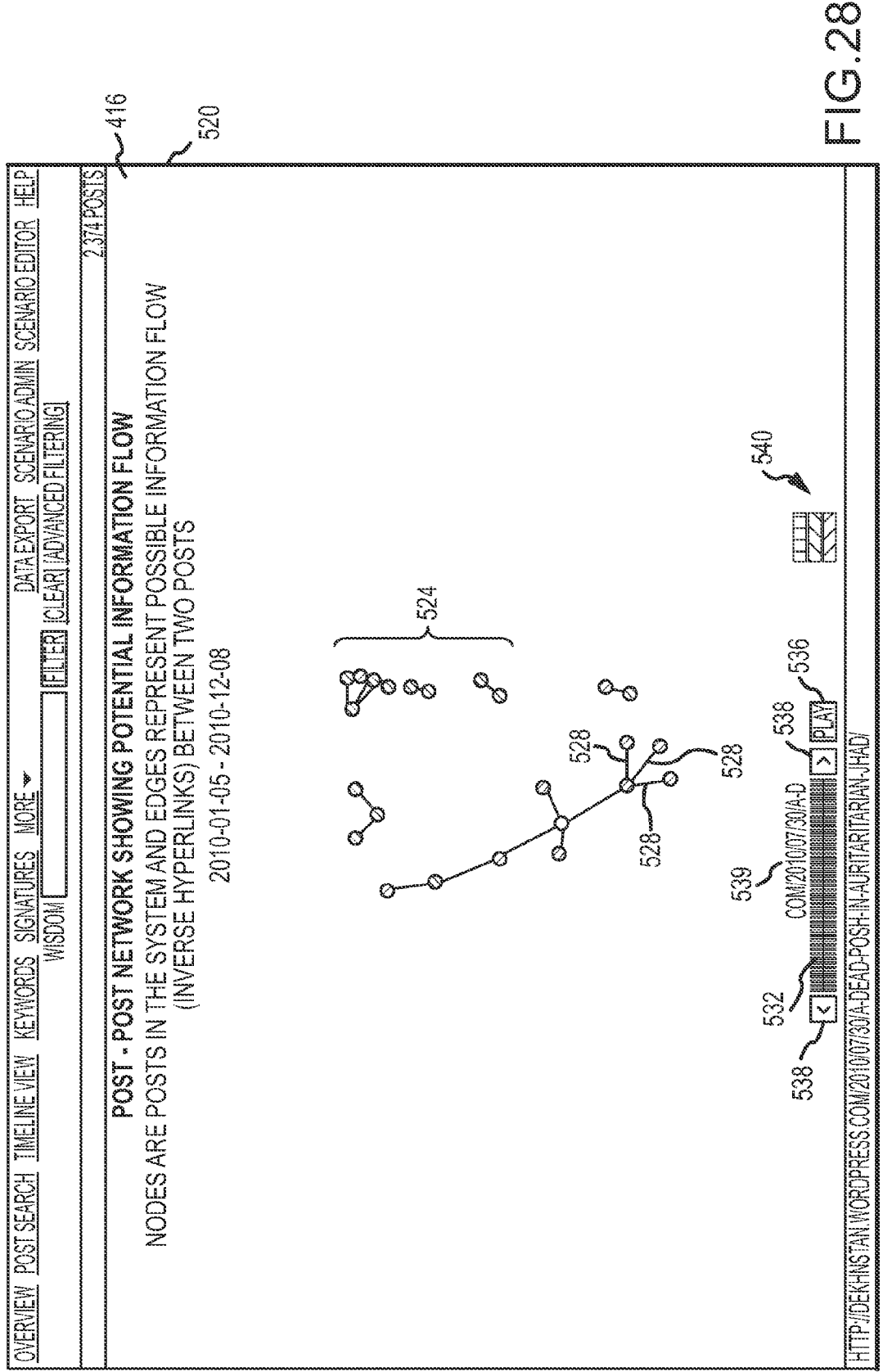
FIG. 28 illustrates another screenshot of the dashboard of FIG. 4.

Turning to FIG. 28, another screenshot 520 of the dashboard 346 may be presented to a user upon manipulation of a "Network" button (not shown) that illustrates one or more information flow networks. Here, an information flow network module 370 of the dashboard 346 (see FIG. 3) may function to retrieve information flow network data (as generated by information flow network extraction engine 174 of WISDOM server 14) for a number or websites/posts/etc. from data store 46 of WISDOM server 14 and present a graphical representation of one or more information flow networks on a user's display as shown in FIG. 25.

In this screenshot 520, a number of data source graphical icons 524 (e.g., nodes, dots, circles) may be shown in the presentation section 416, each of which represents a particular data source (e.g., blog posting, website, etc.) corresponding to one or more scenarios or sub-scenarios. The data source graphical icons 524 may be appropriately connected by information flow link graphical icons 528 (e.g., lines), where an arrow or other feature associated with each information flow link graphical icon 528 illustrates a flow of information from a "primary" data source graphical icon 524 to a "secondary" data source graphical icon 524 (i.e., the secondary data source includes an inlink to the primary data source). Each of the data source graphical icons 524 may be appropriately colored, textured, shaped, etc. to indicate the particular type of data source it represents. For instance, and as indicated by legend 440, blog posting data source graphical icons 524 may be colored pink, news article data source graphical icons 524 may be colored blue, and the like. In another arrangement, the data source graphical icons 524 of relatively older data sources (e.g., as measured by their publication date) may be grayed out (or may be associated with a feature different from newer data sources).

This screenshot 520 may also include a time bar 532 that indicates a particular time increment (e.g., day) for which the information flow network shown in the presentation section 416 represents. This view 520 may also include a "play" button 536 that, when manipulated, may cause the presentation section 416 to successively display the particular arrangement of data source and information flow link graphical icons 524, 528 making up the information flow network for each time increment. For instance, upon manipulating the play button 536, the presentation section 416 may display the information flow network for each successive day for a predetermined period of time (e.g., 3 seconds, 10 seconds) before displaying the information flow network for the next successive time increment. The view 520 may also include toggle buttons 538 that allow a user to manually cause the display of a information flow network for a desired time increment.

In one arrangement, moving a user manipulable feature (e.g., cursor, finger) over a data source graphical icon 524 may cause an indication 539 of a URL corresponding to the particular data source graphical icon 524 to be displayed and/or may cause one or more features of the graphical representation of the information flow network to change to its relation to adjacent data source graphical icons 524 to provide a visual indication of data sources interacted with by this particular data source. For instance, moving a cursor or finger over a particular data source graphical icon 524 may cause such data source graphical icon 524 to change to a first color (e.g., green) and any connected data source graphical icons 524 to change to a second color (e.g., orange), where the first and second colors are different from the color(s) of the other data source graphical icons 524. In one arrangement, those data source graphical icons 524 that are "primary" data sources in relation to the selected data source graphical icon 524 may be of a color different than a color of those data source graphical icons that are "secondary" data sources in relation to the selected data source graphical icon 524.

Similarly, the information flow link graphical icons 528 interconnecting the selected primary/secondary data source graphical icons may change to a color (e.g., orange) different from other information flow link graphical icons 528. In one arrangement, those information flow link graphical icons 528 representing information flow towards the selected data source graphical icon 524 may be of one color (e.g., orange) to indicate that the selected data source graphical icon 524 is a "secondary" data source in relation to the data source graphical icons 524 connected to such orange information flow link graphical icons 528, and those information flow link graphical icons 528 representing information flow away from the selected data source graphical icon 524 may be of another color (e.g., yellow) to indicate that the selected data source graphical icon 524 is a "primary" data source in relation to the data source graphical icons 524 connected to such yellow information flow link graphical icons 528.

Figure 29:
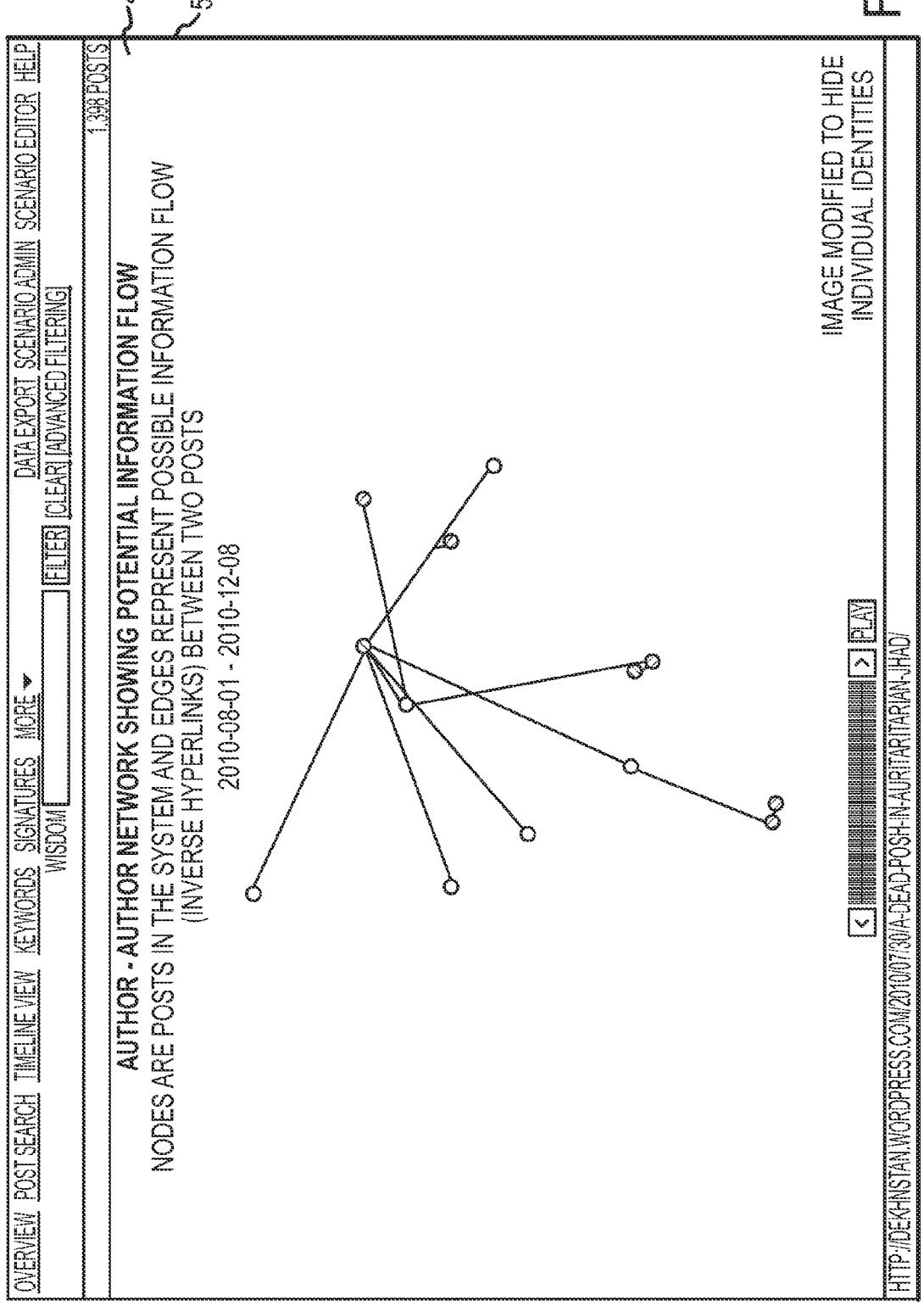
FIG. 29 illustrates another screenshot of the dashboard of FIG. 4.

Turning to FIG. 29, another screenshot 544 is illustrated similar to the screenshot 520 of FIG. 28, but that provides graphical representations of information flow networks at an author level as opposed to the post level as in FIG. 28. For instance, part of the processing performed by the content extraction module 70 of the WISDOM server 14 may be to extract an author from the source code of the webpage or other online data source, and then include the author's name within the generated object 94 stored in data store 46. The information flow network extraction engine 174 of the WISDOM server 14 may then utilize the author names in constructing information flow networks which may be retrieved by the information flow network module 370 of the dashboard 346 for presentation on a user's display.

In one embodiment, one or more metrics may be obtained or otherwise gleaned from one or more information flow networks (where the information flow networks are built from any filtered or unfiltered dataset) and used in a number of manners to determine one or more "online roles" for the various authors of the networks. In this regard, various online roles may be determined such as, for example, "authority" (i.e., an author that is oft cited by other authors/posts and thus has a relatively high level of "reach" in cyberspace), "initiator" (i.e., an author that starts a relatively high level of post threads), "influencer" (i.e., an author that influences other authors to behave in a certain way, such as to post a particular viewpoint or opinion), "active" (i.e., an author that posts a relatively high number of posts), "provocateur" (i.e., an author that posts a particular sentiment that is influential on the posts of other authors), and the like.

One metric that may be used as part of online role determination is post activity, or in other words the distribution of or total number of a particular author's posts across the various discussions participated in by that author. Another metric may be a relative level of post starts which may be obtained by dividing the total number of post starts (i.e., those posts that are first posts of a thread) by the total number of discussions participated in by that author. For instance, post starts may be identified by a new subject line or title of a post (e.g., as opposed to a post having a subject line reading "re: . . . "). Another metric may be a relative in-degree level, or in other words the total number of in-links to an author. Another metric may be a relative level of sentiment influence. More specifically, the sentiment of a number of posts (and/or their authors) in the information flow network may be measured and used to determine the influence that a particular author's sentiment has on one or more other posts and/or authors that link to the particular author and/or a post of the author.

Figure 30:
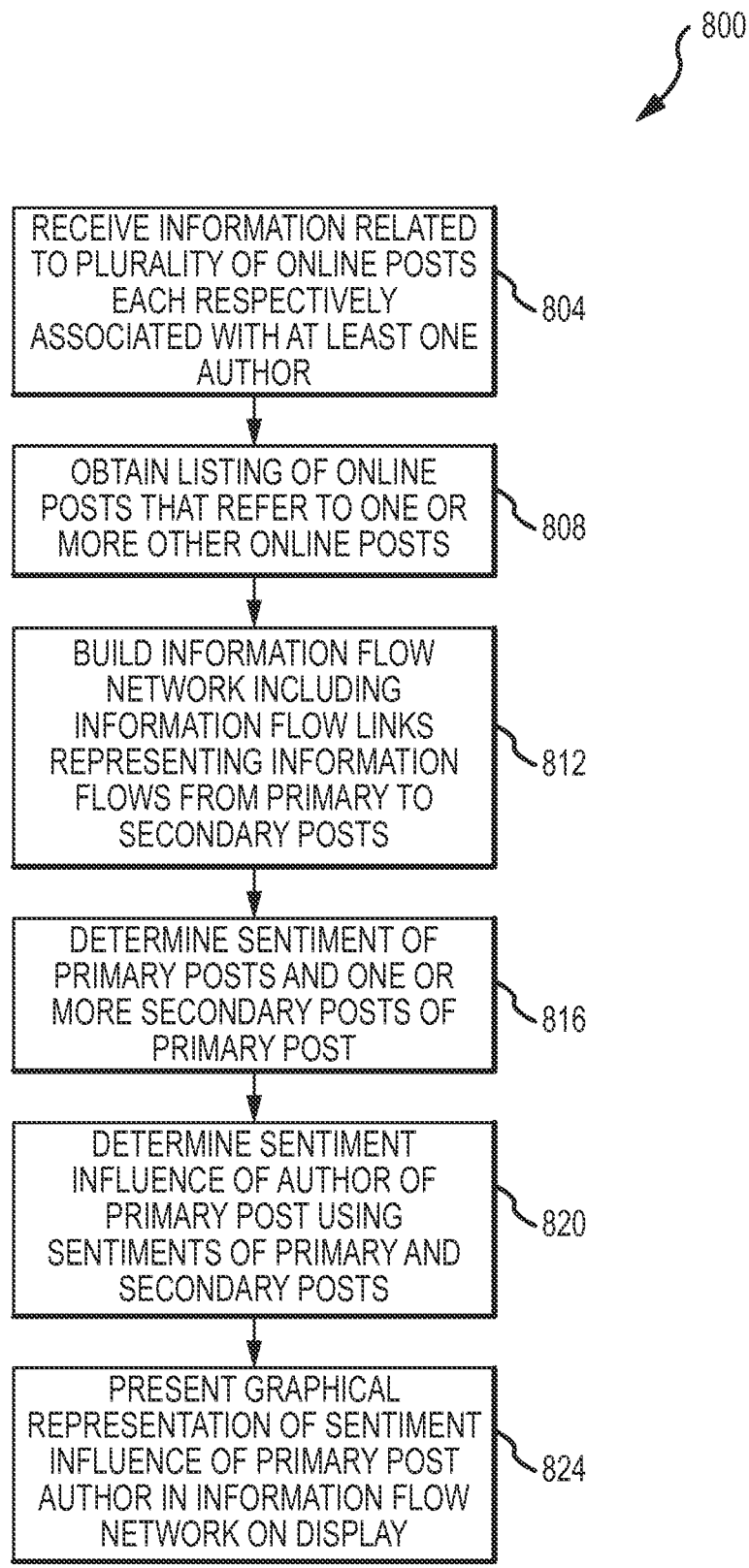
FIG. 30 illustrates a protocol or flow diagram for determining the influence of post or author sentiment on other posts or authors of an information flow network, such as the information flow networks illustrated in FIGS. 28-29.

Turning to FIG. 30 a protocol 800 is illustrated for use in determining the influence of post or author sentiment on other posts or authors of an information flow network. The protocol may receive 804 information (e.g., objects 94 including content that is substantially free of navigation sections and advertisements, that includes any appropriate identifying data such as author, publication date, etc.) related to a plurality of online posts (e.g., associated with a particular scenario, sub-scenario, etc.), where each post is associated with at least one author (e.g., screen name, website name, etc., also see above discussion in relation to FIG. 29). Similar to protocol 298 of FIG. 27, the protocol 800 may proceed to obtain 808 a listing of or otherwise find online posts that refer to one or more other online posts and then build 812 an information flow network that includes information flow links representing information flows from primary posts (e.g., those posts to which other posts link) to secondary posts (e.g., those posts which link to primary posts). For example, see screenshots 520, 544 of FIGS. 28-29.

Once the information flow network has been established (although at least some of the subsequently described steps may be performed even before the information flow network has been established), the protocol 800 may determine 816 a sentiment of at least one primary post and one or more secondary posts of the at least one primary post. That is, the sentiment of each of the primary and secondary posts may be determined as a whole instead of with respect to one or more particular words or phrases within each of the posts. In this regard, such "post sentiments" may be at least partially distinct from the "term/phrase sentiments" discussed above in relation to FIGS. 18-20. However, the sentiments of particular words or phrases in a post may affect the sentiment of the post as a whole.

In one arrangement, a post sentiment (e.g., positive and/or negative) may be determined by identifying a total quantity of positively charged terms or phrases (e.g., esteemed, great, liked) and/or negatively charged terms or phrases (e.g., hate, coup, overthrow) and using the total quantity as a measure of the post sentiment or sentiment strength. A post may include both positive and negative sentiments. In other arrangements, post sentiment may be determined by summing phrases that include more than a particular quantity of adjectives, adverbs, or specific parts of speech that are typically associated with sentiment bearing language.

Furthermore, each of the sentiments may be appropriately normalized to account for the length of the post (e.g., to account for the fact that a shorter post (e.g., 50 words) including 10 negatively charged words may have a higher negative sentiment strength than a longer post (e.g., 1000 words) also having 10 negatively charged words). For instance, a positive and/or negative sentiment strength of a post may be obtained by dividing each of the total number of positive and/or negative words by the total number of words in the post to obtain a positive and/or negative sentiment strength for the post.

Once the sentiments (or sentiment strengths) of each of at least one primary post and one or more respective secondary posts have been determined, the protocol 800 may proceed to determine 820 a sentiment influence of the at least one author of the primary post using the sentiments of the primary post and the one or more secondary posts. In one arrangement, the sentiment influence of the author of the primary post may be obtained by determining a first average sentiment of the one or more secondary posts, determining a second average sentiment of other posts in the information flow network initiated by the at least one author of the primary post, and determining a quotient of the first average sentiment and the second average sentiment. For instance, the sentiment influence may be determined in relation to all available posts of the scenario or sub-scenario or in relation to a particular topic or discussion thread. In another arrangement, the sentiment influence of the primary post author may be obtained in a manner similar to how PageRank® (owned by Google Technology Inc. of Mountain View, Calif.) determines the relative importance of a document or element within a set of hyperlinked elements/documents (e.g., where the set would include the primary post and the one or more secondary posts).

The protocol 800 may also include presenting 824 a graphical representation of the sentiment influence of the primary post author on a display in any appropriate manner. As discussed above, various metrics (e.g., including sentiment influence) may be gathered or otherwise obtained from one or more information flow networks and used to determine one or more online roles for the various authors of the network(s). As just one example, the previously discussed online roles may be determined using the following table, where each number represents a particular weight to be assigned to each of the various metrics for use in determining the online roles:

|  | Authority | Initiator | Influencer | Provocateur | Active |
| --- | --- | --- | --- | --- | --- |
| Post Activity | 0 | 0 | 2 | 0 | 5 |
| Post Starts | 0 | 3 | 1 | 0 | 0 |
| In-Degree | 5 | 2 | 2 | 2 | 0 |
| Sentiment Influence | 0 | 0 | 0 | 3 | 0 |

With reference to the "authority" online role column in this example, the "in-degree" metric has a weight of five while the other metrics have weights of zero. In other words, the authority online role score for each author may be determined by way of adding up the total number of in-links to posts of that author (i.e., the authority online role score only takes into account the in-degree metric without any weighting). As another example, the "provocateur" online role column in this example shows that the in-degree metric has a weight of two, the sentiment influence metric has a weight of three, and the other metrics have weights of zero. In other words, the in-degree metric is weighted by 60% (e.g., 3/(2+3)) and the sentiment influence metric is weighted by 40% (e.g., 2/(2+3)). Thus, the provocateur online role score for each author may be determined by multiplying the in-degree metric by 60%, multiplying the sentiment influence metric by 40%, and summing the two products. Different weights than those shown in the above table for use in determining various online roles are also contemplated and encompassed within the scope of the present disclosure.

In any event, graphical representations may be in the form of one or more tables each providing an indication of a relative degree to which one or more of the authors is each of the various online roles. Stated differently, each of the tables may represent one of the online roles, and each table may include a list of authors (e.g., according to author name) in addition to a corresponding indication as to a degree (relative to other authors) to which each author assumes the particular online role. For instance, in the case of a "provocateur" table, any appropriate logic may initially sum the provocateur scores for each of the various authors under consideration. The logic may then divide the provocateur score for each author by the sum to obtain a fraction or percentage that provides an indication as to a degree to which each author assumes a provocateur online role in the particular network(s) under consideration. A similar procedure may be performed for the other online roles. Other manners of determining the degree to which each author assumes an online role are also contemplated. In one arrangement, only the authors that together account for at least 50% of the total score for each of the online roles are identified and graphically depicted. It is envisioned that authors may have more than one online role.

In another arrangement, the various online roles and/or metrics of the information flow network(s) as discussed above may be graphically depicted in a screenshot similar to that in FIG. 29. For instance, the various graphical icons representing the various authors may be appropriately colored (or otherwise textured) based on the relative level of positive and/or negative sentiment influence that they have on other authors of the network. In one embodiment, the author graphical icons may be colored varying shades of green and/or red based on the relative level of respective positive and/or negative sentiment influence that such authors have (e.g., where dark green and red indicate high levels of positive and negative sentiment influence and light green and red indicate low levels of positive and negative sentiment influence). As discussed previously, it is envisioned that an author may carry both positive and negative sentiment influence in the information flow network. Similar coloring, shading and/or texturing may also be used to provide a measure of one or more other metrics and/or connote various online roles. In some instances, it may be desirable to determine or obtain one or more characteristics of the posts of a particular author. More specifically, a user may be interested in investigating the posts of one or more particular authors (e.g., such as the top "provocateur") of one or more information flow networks to obtain any appropriate data or information in one or more manners. In one arrangement, a user may be interested in the degree to which one or more particular terms (e.g., geographic terms, economic terms, governmental terms, etc.) are represented in the online posts of a particular author to provide an indication as to what the author is posting about. Groups of at least partially related terms may be represented in one or more textual hierarchies.

In this regard, and with reference again to FIG. 17, another tool in the toolbox 62 of the backend processing engine 50 may be a mixed granularity visualization engine 176 that is broadly operable to determine a relative frequency of one or more terms of a textual hierarchy within a collection of webpages or online posts (e.g., where the collection has been filtered so as to include those posts of one or more particular authors under consideration) and allow for display of a graphical representation of a relative intensity of terms in the hierarchy for those terms actually found in such webpages or posts in addition to higher level terms in the hierarchy from which such terms depend, even if such higher level terms are not literally found in the webpages or posts.

As an example, various geo-locations of differing levels of granularity (e.g., cities, states, countries, continents, etc.) may be interrelated in the form of one or more textual hierarchies such that a reference to a lower level term of the hierarchy in a post passes at least some amount of "heat" to one or more upper level terms (e.g., a reference to a city such as "Paris" may be at least a partial indirect reference to the country of "France"). Such textual hierarchies may be manually configured by a user (e.g., to allow a user to create custom regions or the like) or may be automatically available for selection by a user. Each of such textual hierarchies may specify a particular "value" and "weight" to be afforded to the various terms of the hierarchy upon a reference being made to a lower level term (i.e., a reference being made to a term that is lower in the hierarchy than the term under consideration), where the product of the value and weight may equate to the degree of heat to be afforded to such terms (e.g., which may be indicated in any appropriate graphical representation as darker or lighter colors). Utilizing such weights can more accurately depict such visualizations by limiting the occurrence of hierarchy representation distortions. The mixed granularity visualization engine 176 may utilize the textual hierarchy to determine how much heat to afford to various terms of the hierarchy upon an instance of at least one of the terms in a webpage or post associated with a scenario, sub-scenario, etc.

Figure 31:
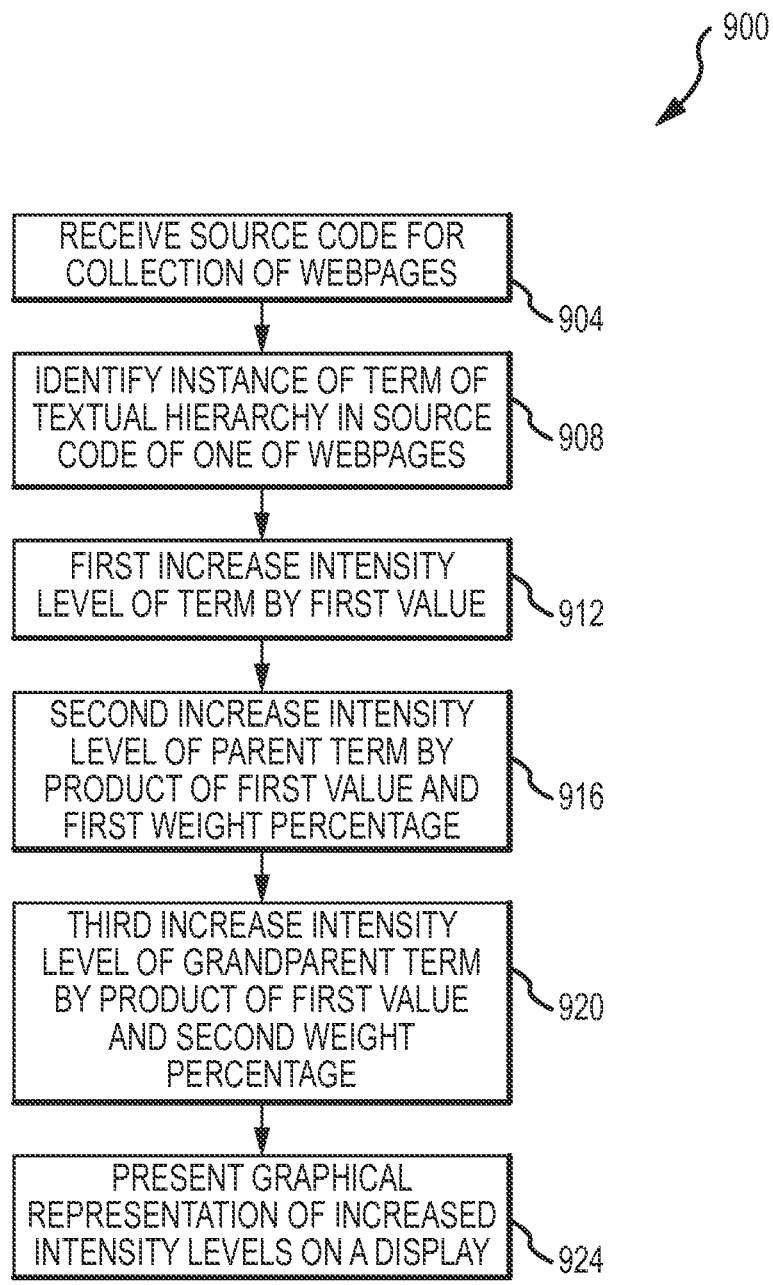
FIG. 31 illustrates a protocol or flow diagram for identifying instances of terms of a textual hierarchy in the source code (or associated objects) of one or more webpages or posts, determining any increases in intensity levels of one or more terms of the hierarchy and presenting a graphical representation of such increased intensity levels on a display.
Figures 32, 33:
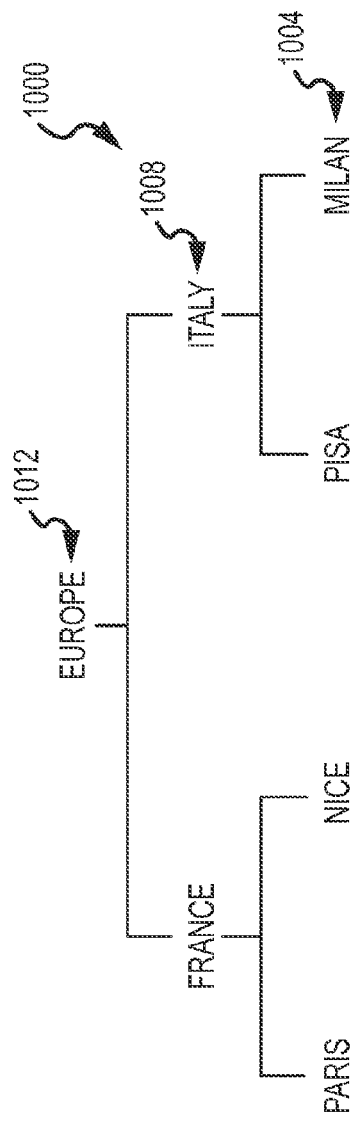
FIG. 32 illustrates a representative textual hierarchy that may be used in conjunction with the protocol of FIG. 31.
FIG. 33 illustrates a data structure that includes information associated with the textual hierarchy of FIG. 32.

Turning now to FIG. 31, a protocol 900 is illustrated that is operable to identify instances of terms of a textual hierarchy in the source code (or associated objects) of one or more webpages or posts (e.g., such as those associated with a particular author), determine any increases in intensity levels of one or more terms of the hierarchy and present a graphical representation of such increased intensity levels on a display. At 904, the source code or associated objects 94 for one or more webpages (e.g., a collection of webpages) may be received, and then instances of one or more terms of a textual hierarchy may be identified 908 in the received source code. Turning briefly to FIG. 32, a representative textual hierarchy 1000 is illustrated including a plurality of interconnected elements such as child-level terms 1004, parent-level terms 1008 and a grandparent-level term 1012 (numerous other labels such as "first-level," "second-level," and "third-level" terms or the like could also be used). The textual hierarchy 1000 may in other arrangements include more or fewer than the three levels shown in FIG. 32. Returning to FIG. 31, step 908 may include identifying one or more instances of a child-level term 1004 such as "Paris" in the source code or object(s) 94 of one or more webpages or posts.

Upon identifying an instance of a term of the textual hierarchy, the protocol 900 may include first increasing 912 an intensity level of the term by a first value, second increasing 916 an intensity level of a parent term (e.g., "France") by a product of the first value and a first weight percentage, and third increasing 920 an intensity level of a grandparent term (e.g., Europe) by a product of the first value and a second weight percentage. Turning briefly now to FIG. 33, a representative data structure 1100 is shown illustrating the relationship between the various terms of the textual hierarchy 1000 of FIG. 32 in addition to the relative values and weight percentages to be afforded to the various terms upon identification of an instance of at least one of the terms.

For instance, the data structure 1100 may include a number of columns 1104 for terms, term values (i.e., the value to be attributed to the term for each instance of the term), parents, parent weight percentage (i.e., the percentage by which the value of a child term is to be multiplied by upon an instance of the child term to obtain an intensity increase for the parent term), grandparent, and/or grandparent weight percentage (i.e., the percentage by which the value of a child term is to be multiplied by upon an instance of the child term to obtain an intensity increase for the grandparent term). The data structure 1100 may also include a number of rows 1108, each of which may represent one of the terms of the textual hierarchy 1000 of FIG. 32.

In the above example, an instance of the term "Paris" may cause an increase in the intensity level of "Paris" by a value of $V_1$ (e.g., 1), an increase in the intensity level of "France" by the amount of $V_1*80\%$, and an increase in the intensity level of "Europe" by the amount of $V_1*50\%$ (to reflect that an instance of a first term such as "Paris" has a decreasing effect on the indirect occurrence of higher-level terms related to the first term as one moves away from the first term in the textual hierarchy). However, an instance of the term "Nice" may only equate to an increase in the intensity level of "France" by the amount of $V_1*60\%$ and an increase in the intensity level of "Europe" by the amount of $V_1*20\%$. The latter example shows how users may be able to customize the relative increase in intensity of the same parent term upon the instances of two different child level terms of the same parent term. For instance, a user who believes that an instance of "Paris" is more representative of the country of "France" as a whole than an instance of "Nice" may set the weight percentage of France for Paris to be higher than that for Nice (e.g., 80% versus 60%). Similar discussion applies to weight percentages for grandparent terms and other higher-level terms.

With continued reference to FIG. 33, it can be seen that each child level term (e.g., Paris, Nice, Pisa, Milan) has been associated with a value of $V_1$, each parent level term (e.g., France, Italy) has been associated with a value of $V_2$, and the grandparent level term (e.g., Europe) has been associated with a value of $V_3$. While some embodiments envision that $V_1=V_2=V_3$ (e.g., a value of 1), other embodiments envision that an instance of one term may equate to a larger increase in intensity in the term than does an instance of another term. For instance, a user may prefer that an instance of the child term "Paris" increases the intensity of Paris by a value of one unit while an instance of the child term "Milan" increases the intensity of Milan by a value of two units. As another example, a user may prefer that an instance of the child term "Paris" increases the intensity of Paris by a value of one unit while an instance of the grandparent term "Europe" increases the intensity of Europe by a value of two units. Numerous other arrangements are contemplated and encompassed within the scope of the present disclosure.

Figure 34:
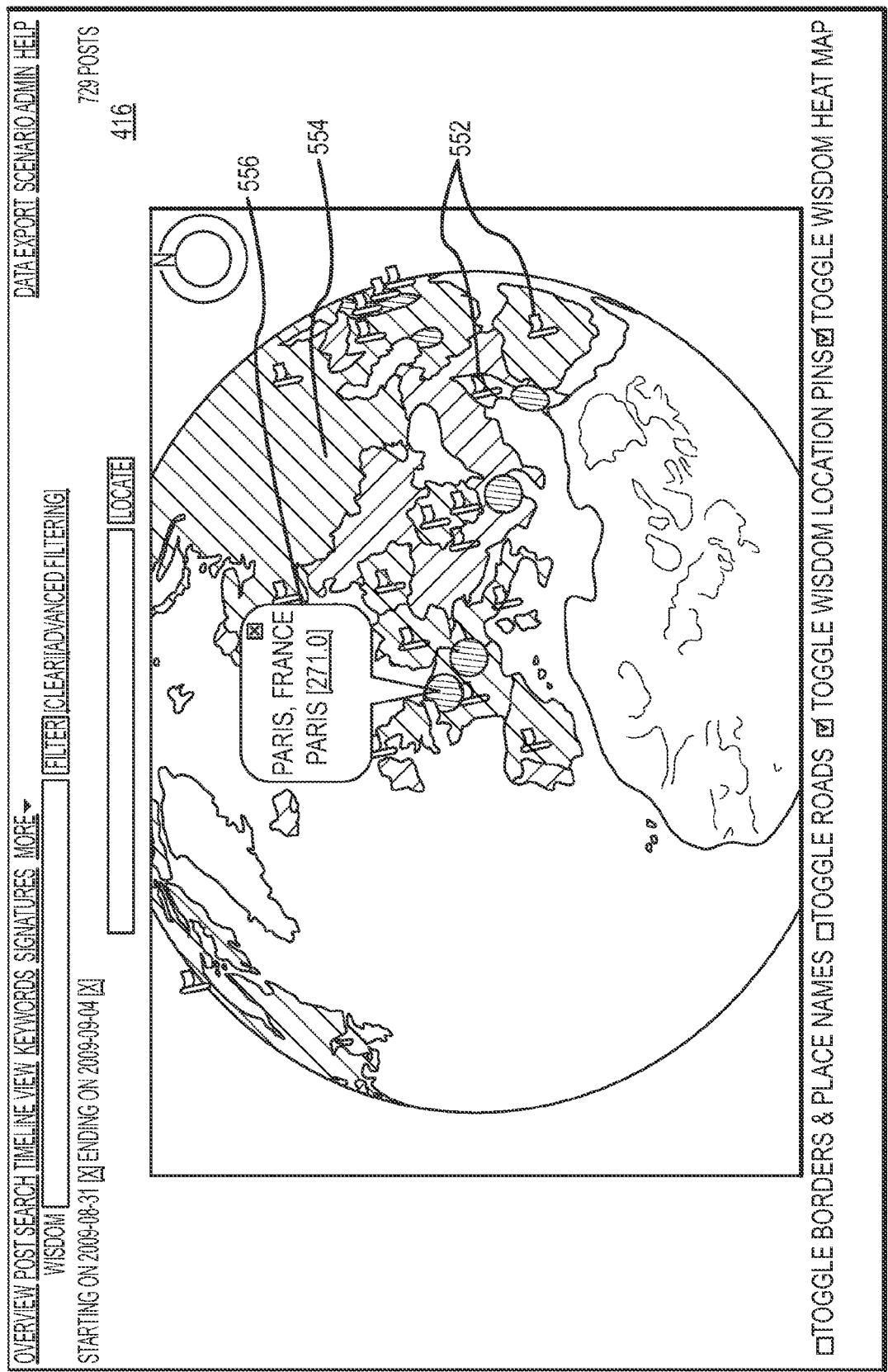
FIG. 34 illustrates another screenshot of the dashboard of FIG. 4.

Returning to FIG. 31, the protocol 900 may include presenting 924 a graphical representation of the increased intensity levels on a display. In one arrangement, and turning now to FIG. 34, another screenshot 548 of the dashboard 400 may be presented to a user upon manipulation of a "Geo-Visualization" button (not shown). For instance, geo-visualization module 374 of the dashboard 346 may function to retrieve intensity level information for geo-location data of a number or websites or posts (as generated by mixed granularity visualization engine 176 of WISDOM server 14) from data store 46 of WISDOM server 14 and present a graphical representation of such intensity levels on a user's display.

The presentation section 416 of this screenshot 548 may include a graphical representation 554 of a portion of the earth including one or more features for use in conveying geo-location intensity levels in relation to the posts of a particular dataset. In one arrangement, various portions of the graphical representation 554 (e.g., cities, regions, countries, and/or other locations) may be appropriately colored (e.g., via a color gradient) or textured in a manner that indicates a relative degree of "heat" of such portions (i.e., the relative intensities of such portions as discussed above in relation to FIGS. 31-33). For instance, darker shades of red may indicate an increased intensity of the terms/locations associated with such darker shades (and vice versa).

In other arrangements, one or more types of graphical icons 552 may be overlaid on top of the graphical representation 554 to convey additional types of information in relation to geo-locations. For instance, "flag" graphical icons 552 may be associated with those countries that are referenced more than other countries in the particular dataset under consideration (e.g., top 50 or 100 referenced countries). As another example, "pin" graphical icons 552 may be used to indicate referenced locations other than countries (e.g., cities). As a further example, moving a cursor or other user manipulable feature over one of the graphical icons 552 may cause the display of a tooltip 556 that provides geo-location information associated with the particular graphical icon 552. For instance, the tooltip 556 illustrated in FIG. 34 indicates that there were 271 instances of "Paris" in the particular dataset under consideration (each of which may contribute heat or intensity to higher level hierarchical terms, such as, with reference to FIGS. 32-33, "France" and "Europe").

While screenshot 548 presents a graphical illustration of the Earth illustrating various intensity levels of a number of location terms of a textual hierarchy, the present disclosure is not limited to the multi-scale visualization of mixed granularity geo-location data. Rather, the present disclosure of such mixed granularity data visualization may be utilized in numerous contexts and presented via graphical representations of numerous forms. Furthermore, any of such textual hierarchies may be manually configured by a user (e.g., to allow a user to create custom terms or the like) or may be automatically available for selection by a user.

As with many of the other features and tools disclosed herein, the geo-visualization feature may be used in relation to one or more filtered or unfiltered datasets of a larger "scenario" dataset (e.g., using control panel 412 shown in screenshot 404 of FIG. 15). For instance, and turning briefly to FIG. 4, a user may select the scenario "Libya Instability" in the area 401 of screenshot 400 (which is defined by a particular number and arrangement of keywords) for which there are about 23,000 posts available in this example. The user may then choose to filter the 23,000 posts (e.g., using control panel 412 in FIG. 14) in a number of manners and perform numerous analyses on the filtered results. For instance, a user may wish to observe the geo-location references and/or intensity levels in posts or articles having a specific French domain name in the context of Libyan instability versus those in posts or articles having a specific American domain name (and/or other country domain name(s)) in the same context of Libyan instability. In this regard, the user could filter the 23,000 posts a first time for ".fr" posts and a second time for ".com" and ".org" posts. After each filtering step, the user could access the geo-visualization feature and then compare the results. In the above example, the user may be provided with at least a general idea of the geographical locations (e.g., cities or regions within Libya) in which France and the United States consider Libyan instability to exist and/or have an influence (which could be similar or vastly different).

Returning to FIG. 17, it is envisioned that the toolbox 62 may additionally or alternatively include one or more other analytical tools 182. Furthermore, some of the engines and modules of the toolbox 62 may be able to communicate and/or share information. For instance, the sentiment analysis engine 166 and the signature engine 170 may be able to share word/term frequency metrics for use in their respective analyses.

The dashboard 346 may also additionally or alternatively include a number of other engines or modules 382 operable to obtain particular information from the WISDOM server 14 and/or perform additional analytics on such obtained information. See FIG. 3. Furthermore, the dashboard 346 may include a data export manager 358 operable to coordinate with the WISDOM server 14 and/or other components/processes of the system 10 to export any desired data and/or analytics to any appropriate storage location (e.g., storage module 334 of client device 22) and/or analytical modules or processes.

Figure 36:
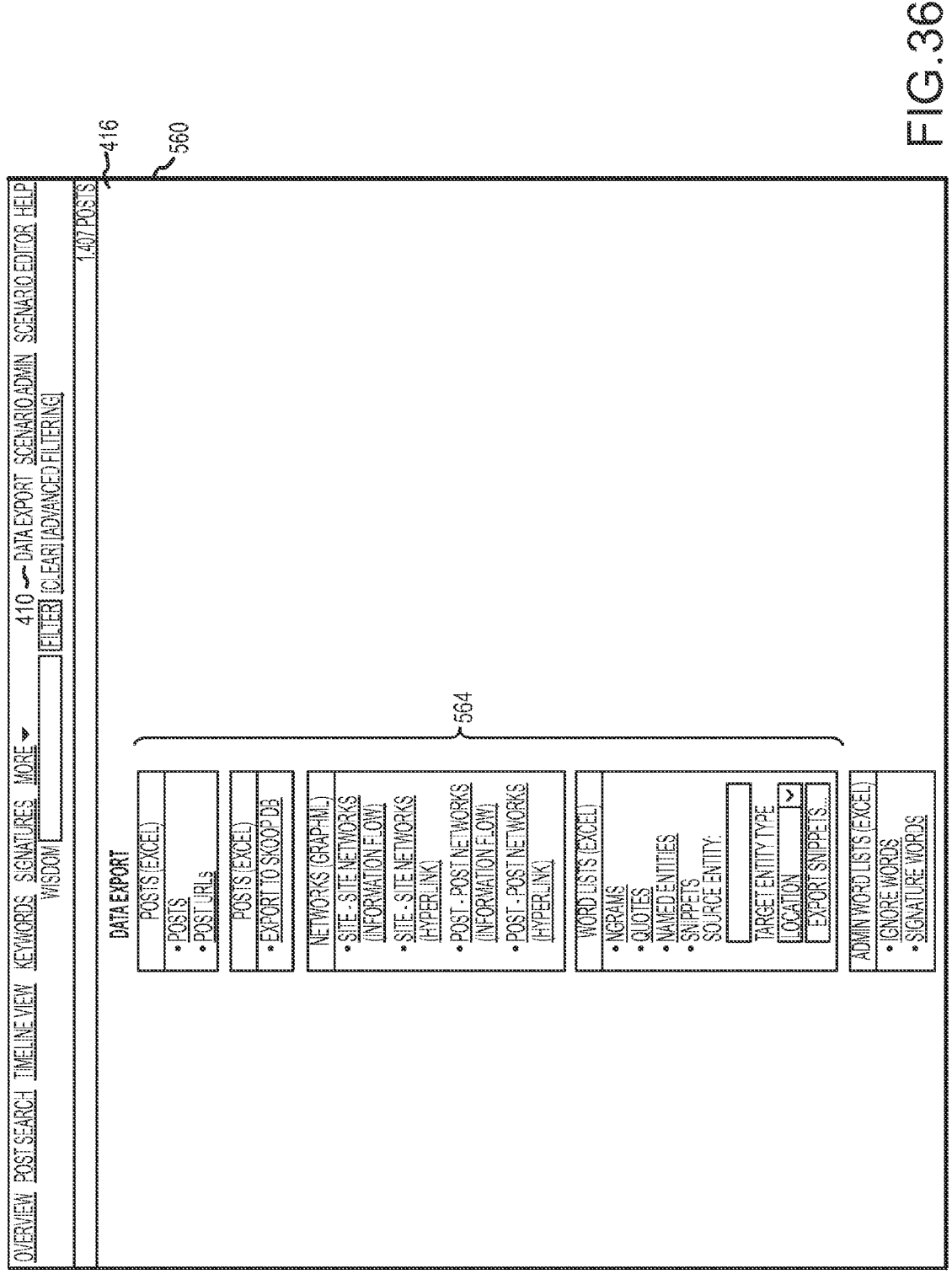
FIG. 36 illustrates another screenshot of the dashboard of FIG. 4.

Turning now to FIG. 36, another screenshot 560 of the dashboard 346 may be presented to a user upon manipulation of a "Data Export" button 410. Here, the data export manager 358 of the dashboard 346 may coordinate with data access layer 54 of WISDOM server 14 to cause the export of any objects 94, the original source code of such objects 94, analytical information, and/or any additional related information to one or more external applications (e.g., Excel) or into one or more file formats (e.g., GraphML) for subsequent use and/or storage by a user (e.g., on storage module 334 of client device 22). For instance, the presentation section 416 of this screenshot 560 may include a number of user manipulable features 564 (e.g., buttons, links) that allow a user to export any desired data (e.g., post URLs, post-post networks, signature words, etc.) to or into a desired application, data format, storage location, and/or the like.

Deviations may be made from the specific embodiments disclosed in the specification without departing from the spirit and scope of the invention. For example, at least some of the functionalities performed by many of the processes and modules discussed herein may be performed by other modules, devices, processes, etc. The illustrations and discussion herein has only been provided to assist the reader in understanding the various aspects of the present disclosure.

Furthermore, the various utilities disclosed herein (e.g., the "content extraction" utility, the "sentiment analysis" utility, the "hierarchical signature determination" utility, and the "information flow network" utility) are not limited to being used in the context of open source information collected via the WISDOM server 14. As previously discussed, numerous other contexts for use and/or implementation of such utilities are envisioned (e.g., data obtained via internal networks, other large volumes of searchable data, and the like).

As also discussed previously, the various engines, managers, modules, and the like disclosed herein may be in the form of any appropriate combination of hardware, software, middleware, firmware and/or the like operable to carry out the various functionalities disclosed herein. For instance, such software, middleware and/or firmware may be implemented as one or more computer program products, i.e., one or more modules of computer program instructions encoded on a computer-readable medium for execution by one or more processors or processing modules, or to control the operation of, one or more data processing apparatuses. For example, the engines and tools in the toolbox 62 of backend processing engine 50 of the WISDOM server 14 may be provided in such computer-readable medium and executed by a processor or the like. The computer-readable medium can be a machine-readable storage device (e.g., memory module 26 of WISDOM server 14), a machine-readable storage substrate, a memory device, a composition of matter affecting a machine-readable propagated signal, or a combination of one or more of them. In addition to hardware, the system 10 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various online, open source information collection and analysis functionalities disclosed herein) may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the system 10 (i.e., the WISDOM server 14, client devices 22, etc.) may include one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer (e.g., client device 22) having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A system for use in determining an influence of sentiment of an author of a post in an online information flow network on the posts of one or more other authors in the network, the system comprising:
    a processor; and
    a memory logically connected to the processor and comprising a set of computer readable instructions executable by the processor to:
        receive information related to a plurality of online posts, wherein each of the online posts is associated with at least one author;
        obtain, from the information, a listing of online posts that refer to one or more other online posts, wherein any online post that refers to another online post comprises a "secondary post" and wherein any online post that is referred to by another online post comprises a "primary post";
        build an information flow network that includes a plurality of information flow links that connect and represent information flows from primary posts to secondary posts;
        first determine a sentiment of each of a primary post and one or more secondary posts of the primary post;
        second determine a sentiment influence of the at least one author of the primary post in the information flow network using the sentiment of the primary post and the sentiments of the one or more secondary posts by:
        determining a first average sentiment of the one or more secondary posts;
        determining a second average sentiment of other posts in the information flow network initiated by the at least one author of the primary post; and
        determining a quotient of the first average sentiment and the second average sentiment to obtain the sentiment influence of the at least one author of the primary post in the information flow network; and
        present, on a display, a graphical representation of the sentiment influence of the at least one author of the primary post in the information flow network.

2. The system of claim 1, wherein the primary post, one or more secondary posts, and other posts in the information flow network associated with the at least one author of the primary post relate to a common topic or discussion.

3. The system of claim 1, wherein the sentiments of the posts are normalized.

4. The system of claim 3, wherein the sentiment of each post is normalized by way of executing the computer readable instructions by the processor to:

identify a quantity of at least one of positively or negatively charged terms in the post;

identify a total number of terms in the post; and divide the quantity of the at least one of positively or negatively charged terms in the post by the total number of terms in the post to obtain a normalized sentiment of the post.

5. The system of claim 1, wherein the computer readable instructions are further executable by the processor to:

use the sentiment influence of the at least one author to determine at least one online role of the at least one author in the information flow network.

6. The system of claim 5, wherein the at least one online role comprises a provocateur role.

7. A method for use in determining an influence of sentiment of an author of a post in an online information flow network on the posts of one or more other authors in the network, the method comprising:

receiving information related to a plurality of online posts, wherein each of the online posts is associated with at least one author;

obtaining, from the information, a listing of online posts that refer to one or more other online posts, wherein any online post that refers to another online post comprises a "secondary post" and wherein any online post that is referred to by another online post comprises a "primary post";

building an information flow network that includes a plurality of information flow links that connect and represent information flows from primary posts to secondary posts;

first determining, using a processor, a sentiment of each of a primary post and one or more secondary posts of the primary post;

second determining, using the processor, a sentiment influence of the at least one author of the primary post in the information flow network using the sentiment of the primary post and the sentiments of the one or more secondary posts by:

determining a first average sentiment of the one or more secondary posts;

determining a second average sentiment of other posts in the information flow network initiated by the at least one author of the primary post; and determining a quotient of the first average sentiment and the second average sentiment to obtain the sentiment influence of the at least one author of the primary post in the information flow network; and presenting, on a display, a graphical representation of the sentiment influence of the at least one author of the primary post in the information flow network.

8. The method of claim 7, wherein the primary post, one or more secondary posts, and other posts in the information flow network associated with the at least one author of the primary post relate to a common topic or discussion.

9. The method of claim 7, wherein the sentiments of the posts are normalized.

10. The method of claim 9, wherein the sentiment of each post is normalized by way of:

identifying a quantity of at least one of positively or negatively charged terms in the post;

identifying a total number of terms in the post; and dividing the quantity of the at least one of positively or negatively charged terms in the post by the total number of terms in the post to obtain a normalized sentiment of the post.

11. The method of claim 7, further comprising:

using the sentiment influence of the at least one author to determine at least one online role of the at least one author in the information flow network.

12. The method of claim 11, wherein the at least one online role comprises a provocateur role.

* * * * *